(12) United States Patent
Menon et al.

(10) Patent No.: US 8,703,032 B2
(45) Date of Patent: Apr. 22, 2014

(54) BIOMIMETIC DRY ADHESIVES AND METHODS OF PRODUCTION THEREFOR

(75) Inventors: Carlo Menon, Burnaby (CA); Daniel Elliot Sameoto, Edmonton (CA)

(73) Assignee: Simon Fraser University, Burnaby (CA)

(*) Notice: Subject to any disclaimer, the term of this patent is extended or adjusted under 35 U.S.C. 154(b) by 333 days.

(21) Appl. No.: 12/905,065

(22) Filed: Oct. 14, 2010

(65) Prior Publication Data

US 2011/0117321 A1 May 19, 2011

Related U.S. Application Data

(60) Provisional application No. 61/251,667, filed on Oct. 14, 2009, provisional application No. 61/292,835, filed on Jan. 6, 2010.

(51) Int. Cl.
*B29C 39/34* (2006.01)

(52) U.S. Cl.
USPC .............. 264/227; 216/48; 264/318; 428/343

(58) Field of Classification Search
CPC .................................................. C09J 2201/626
USPC .......................................................... 264/227
See application file for complete search history.

(56) References Cited

U.S. PATENT DOCUMENTS

| | | | |
|---|---|---|---|
| 6,737,160 B1 * | 5/2004 | Full et al. ...................... | 428/397 |
| 6,872,439 B2 | 3/2005 | Fearing et al. | |
| 7,011,723 B2 | 3/2006 | Full et al. | |
| 7,074,294 B2 | 7/2006 | Dubrow | |
| 7,132,161 B2 | 11/2006 | Knowles et al. | |
| 7,175,723 B2 | 2/2007 | Jones et al. | |
| 7,229,685 B2 | 6/2007 | Full et al. | |
| 7,335,271 B2 | 2/2008 | Autumn | |
| 7,368,860 B2 | 5/2008 | Wood et al. | |

(Continued)

FOREIGN PATENT DOCUMENTS

| | | |
|---|---|---|
| EP | 1241930 B1 | 9/2002 |
| WO | WO0149776 A2 | 7/2001 |

(Continued)

OTHER PUBLICATIONS

Parness, A et al. A microfabricated wedge-shaped adhesive array displaying gecko-like dynamic adhesion, directionality and long lifetime. Journal of the Royal Society Interface, Mar. 18, 2009, pp. 1223, 1225 [online], [retrieved on Feb. 20, 2013]. Retrieved from the Internet <URL: http://intl-rsif.royalsocietypublishing.org/content/6/41/1223.full>.*

(Continued)

*Primary Examiner* — Christina Johnson
*Assistant Examiner* — David Schmerfeld
(74) *Attorney, Agent, or Firm* — Laurence C. Bonar; Graeme A. Herring; IProperty Inc.

(57) ABSTRACT

The effectiveness of biomimetic dry adhesives at different ambient pressures is investigated. Biomimetic dry adhesives have great potential for space applications but there have been few studies on how these adhesives perform in low-pressure environments. Various geometrical configurations for cap and fiber structures of dry adhesive materials are disclosed. Various methods for manufacturing dry adhesive materials including a silicone rubber negative mold are disclosed. Various methods of manufacturing directly molded anisotropic dry adhesive structures with anisotropic peel strengths are also provided.

5 Claims, 43 Drawing Sheets

(56) References Cited

U.S. PATENT DOCUMENTS

| | | | |
|---|---|---|---|
| 7,476,982 | B2 | 1/2009 | Autumn et al. |
| 8,524,092 | B2 * | 9/2013 | Sitti et al. ................. 216/11 |
| 2003/0124312 | A1 | 7/2003 | Autumn |
| 2003/0208888 | A1 | 11/2003 | Fearing et al. |
| 2004/0005454 | A1 | 1/2004 | Full et al. |
| 2005/0072509 | A1 | 4/2005 | Full et al. |
| 2005/0092414 | A1 | 5/2005 | Jones et al. |
| 2005/0119640 | A1 | 6/2005 | Sverduk et al. |
| 2005/0148984 | A1 | 7/2005 | Lindsay et al. |
| 2005/0181170 | A1 | 8/2005 | Fearing et al. |
| 2005/0271869 | A1 | 12/2005 | Jackson |
| 2006/0068195 | A1 | 3/2006 | Majumdar et al. |
| 2006/0078725 | A1 | 4/2006 | Fearing et al. |
| 2006/0130294 | A1 | 6/2006 | Adams |
| 2006/0131265 | A1 | 6/2006 | Samper et al. |
| 2006/0180953 | A1 | 8/2006 | Wood et al. |
| 2006/0181179 | A1 | 8/2006 | Wood et al. |
| 2006/0202355 | A1 | 9/2006 | Majidi et al. |
| 2006/0204473 | A1 | 9/2006 | Blatt et al. |
| 2006/0237126 | A1 | 10/2006 | Guffrey et al. |
| 2007/0251648 | A1 | 11/2007 | Northen et al. |
| 2007/0289696 | A1 | 12/2007 | Jones et al. |
| 2007/0289786 | A1 | 12/2007 | Cutkosky et al. |
| 2008/0014465 | A1 | 1/2008 | Fearing et al. |
| 2008/0070002 | A1 | 3/2008 | Majidi et al. |
| 2008/0073323 | A1 | 3/2008 | Full et al. |
| 2008/0113147 | A1 | 5/2008 | Jagota et al. |
| 2008/0308953 | A1 | 12/2008 | Autumn et al. |
| 2009/0041986 | A1 * | 2/2009 | Zhang et al. ................. 428/156 |
| 2009/0146320 | A1 | 6/2009 | Autumn et al. |
| 2009/0269560 | A1 | 10/2009 | Dhinojwala et al. |
| 2010/0021647 | A1 | 1/2010 | Sitti et al. |
| 2010/0062208 | A1 | 3/2010 | Majidi et al. |

FOREIGN PATENT DOCUMENTS

| | | | |
|---|---|---|---|
| WO | WO03097702 | A2 | 11/2003 |
| WO | WO03095190 | A2 | 3/2005 |
| WO | WO2005033237 | A2 | 4/2005 |
| WO | WO2006060149 | A2 | 6/2006 |
| WO | WO2008076391 | A2 | 6/2006 |
| WO | WO2006094025 | A2 | 9/2006 |
| WO | WO2006130864 | A2 | 12/2006 |
| WO | WO2007040563 | A2 | 4/2007 |
| WO | WO2007061854 | A2 | 5/2007 |
| WO | WO2008024885 | A2 | 2/2008 |
| WO | WO2008076390 | A2 | 6/2008 |
| WO | WO 2008076390 | A2 * | 6/2008 |
| WO | WO2009067482 | A1 | 5/2009 |

OTHER PUBLICATIONS

HS II RTV High Strength Moldmaking Silicone Rubber Base. Material Safety Data Sheet [online]. Dow Corning Corporation, Jul. 5, 2011 [retrieved on Feb. 20, 2013]. Retrieved from the Internet: <URL: http://www1.dowcorning.com/DataFiles/090007b281812b31.pdf>.*

Final Program, Hilton Head Workshop 2010: A Solid-State Sensors, Actuators and Microsystems Workshop, Jun. 6-10, 2010, Hilton Head Island, SC, p. 15 [online], [retrieved on Dec. 19, 2013]. Retrieved from the Internet: <URL: http://www.transducer-research-foundation.org/archive/hh2010><follow "Final Program" hyperlink>.*

A Large-Scale Flexible Molding Technology for Producing Biomimetic Dry Adhesives in Mutliple Materials ing a Commerical Acrylic Master, Sameoto, Menon.

"Gecko-Like Adhesive That Lets Go", Jan. 22, 2009, available at http://www.impactlab.com/2009/01/22/gecko-like-adhesive-that-lets-go.

"Professor's super adhesive inspired by the gecko", Sep. 12, 2009, available at http://www.pittsburghlive.com/x/pittsburghtrib/b iness/s_642851.html.

Properties Validation of an Anisotropic Dry Adhesion Designed for Legged Climbing Robots by Y. Li, D. Sameoto, and C. Menon.

"Biologically Inspired Synthetic Gecko Adhesives, Gecko-inspired Synthetic Adhesive (GSA)" available at http://robotics.eecs.berkeley.edu/~ronf/Gecko/index.html.

Deep-UV patterning of commercial grade PMMA for low-cost, large-scale microfluidics, IOP Publishing Journal of Micromechanics and Microengineering, by M Haiducu1, M Rahbar1, I G Foulds1,2, RW Johnstone1,3, D Sameoto1,4 and M Parameswaran1, Oct. 15, 2008.

Deep UV Patterning of Commercial Grade PMMA as a Mold for Large Scale Casting of Biomimetic Dry Adhesives, by Dr. Dan Sameoto, Sep. 4, 2008.

Micromask Generation for Polymer Morphology Control: Nanohair Fabrication for Synthetic Dry Adhesives, Dan Sameoto1,a, , Yasong Li1,b and Carlo Menon.

Fabrication and Integration of Multi-Scale Compliant Elastomer Dry Adhesives with Climbing Robot Designs, Dan Sameoto(1), Yasong Li(1), Carlo Menon(1), Johan Köhler.

Adhesion and anisotropic friction enhancements of angled heterogeneo micro-fiber arrays with spherical and spatula tips, J. Adhesion Sci. Technol., vol. 21, No. 12-13, pp. 1281-1296 (2007), also available online—www.brill.nl/jast, Aug 8, 2007.

Multi-Scale Compliant Foot Designs and Fabrication for e with a Spider-Inspired Climbing Robot, by Dan Sameoto, Yasong Li, Carlo Menon, 2008, available at www.sciencedirect.com.

Adhesion of Biologically Inspired Vertical and Angled Polymer Microfiber Arrays, by Burak Aksak, Michael P. Murphy, and Metin Sitt, Langmuir 2007, 23, 3322-3332, Dec. 4, 2006.

Specification of mechanical support structures to prevent SU-8 stiction in high spect ratio structures, Institute of Physics Publishing Journal of Micromechanics and Microengineering, Feb 16, 2005.

Adhesion Testing of Mushroom Shaped Biomimetic Dry Adhesives Under Low Pressure Conditions, Sameoto, Helia & Menon, Submitted Apr. 14, 2010 to J. Adhesion Science and Technology.

Biomimetic Climbing Technology Progress Report: Robotic Climber Conceptual Design and Critical Features, Oct. 10, 2008.

Survey of Biomimetic Climbing Technology, Mar. 7, 2008, European Space Agency.

Direct molding of dry adhesives with anisotropic peel strengthening an offset lift-off photoresist mold, Institute of Physics Publishing Journal of Micromechanics and Microengineering, vol. 19, Issue 11, Nov. 2009.

Biomimetic Climbing Technology Progress Report, May 20, 2008, Internal Report for European Space Agency.

Biomimetic Climbing Technology Progress Report, Mar. 31, 2009, Internal Report for European Space Agency.

Biomimetic Climbing Technology Progress Report, May 21, 2009, Internal Report for European Space Agency.

A low-cost, high-yield fabrication method for producing optimized biomimetic dry adhesives, IOP Publishing Journal of Micromechanics and Microengineering, vol. 19, Issue 11, Nov. 2009.

Direct molding of dry adhesives with anisotropic peel strengthing an offset lift-off photoresist mold, IOP Publishing Journal of Micromechanics and Microengineering, vol. 19, Issue 11, Nov. 2009.

Biomimetic Climbing Technology Progress Report: Robotic Climber Conceptual Design and Critical Features, Mar. 31, 2009, Internal Report for European Space Agency.

Attaching mechanisms and strategies inspired by the spiders' leg, by Alessandro Gasparetto, Renato Vidoni with the cooperation of Vanni Zanotto and Eugenio Br a, Jan. 2008, ESA—UNIUD, available at http://www.esa.int/act.

Biomimetic Climbing Technology Progress Report: Robotic Climber Conceptual Design and Critical Features, Sep. 10, 2008, Internal Report for European Space Agency.

R. W. Johnstone, I. G. Foulds, and M. Parameswaran, "Deep-UV exposure of poly(methyl methacrylate) at 254 nm using low-pressure mercury vapor lamps," Journal of Vacuum Science and Technology B: Microelectronics and Nanometer Structures, vol. 26, pp. 682-285, 2008.

Biomimetic Climbing Technology Progress Report: Robotic Climber Conceptual Design and Critical Features, Oct. 31, 2008, Internal Report for European Space Agency.

(56) References Cited

OTHER PUBLICATIONS

Biomimetic Climbing Technology Progress Report: Robotic Climber Conceptual Design and Critical Features, May 21, 2009, Internal Report for European Space Agency.
Tae-il Kim, Changhyun Pang, and Kahp Y. Suh, "Shape-Tunable Polymer Nanofibrillar Structures by Oblique Electron Beam Irradiation", Langmuir 2009, 25(16), 8879-8882, Jul. 2, 2009.
Hoon Eui Jeong, Sung Hoon Lee, Pilnam Kima, Kahp Y. Suha, "High aspect-ratio polymer nanostructures by tailored capillarity and adhesive force", Physicochem. Eng. Aspects 313-314 (2008) 359-364, Nov. 1, 2006.
Hyunsik Yoona, Hoon Eui Jeong, Tae-il Kim, Tae June Kang, Dongha Tahka, Kookheon Chara, Kahp Y. Suh, "Adhesion hysteresis of Janus nanopillars fabricated by nanomolding and oblique metal deposition", Nano Today (2009) 4, 385-392, Aug. 31, 2009.
D. Sameoto and C. Menon, "A Large-Scale Flexible Molding Technology for Producing Biomimetic Dry Adhesives in Mutliple Materials Using a Commerical Acrylic Master".
D Sameoto and C Menon, "Recent advances in the fabrication and adhesion testing of biomimetic dry adhesives", Smart Mater. Struct. 19 (2010) 103001 (18pp), Aug. 6, 2010.
Paul Glass, Hoyong Chung, Newell R. Washburn, and Metin Sitti, "Enhanced Reversible Adhesion of Dopamine Methacrylamide-Coated Elastomer Microfibrillar Structures under Wet Conditions", Langmuir 2009, 25(12), 6607-6612, May 20, 2009.
M Haiducu, M Rahbar1, I G Foulds, RW Johnstone, D Sameoto, and M Parameswaran, "Deep-UV patterning of commercial grade PMMA for low-cost, large-scale microfluidics", J. Micromech. Microeng. 18 (2008) 115029 (7pp), Oct. 15, 2008.
Hoon Eui Jeong, Jin-Kwan Lee, Hong Nam Kim, Sang Heup Moon, and Kahp Y. Suha, "A nontransferring dry adhesive with hierarchical polymer nanohairs", PNAS Apr. 7, 2009 vol. 106 No. 14 5639-5644 Proceedings of the National Academy of Sciences, Seoul Korea, Apr. 7, 2009.
Eugene Cheung and Metin Sitti, "Adhesion of Biologically Inspired Polymer Microfibers on Soft Surfaces", Langmuir 2009, 25(12), 6613-6616, Pittsburgh, Pennsylvania, Mar. 21, 2009.
Edwin P. Chan, Christian Greiner, Eduard Arzt, and Alfred J. Crosby, "Designing Model Systems for Enhanced Adhesion", MRS Bulletin • vol. 32 • Jun. 2007.
Bharat Bhushan, Robert A. Sayer "Surface characterization and friction of a bio-inspired reversible adhesive tape", Microsyst Technol (2007) 13:71-78, May 25, 2006.
J. Davies, S.Haq, T.Hawke, J.P.Sargent, "A practical approach to the development of a synthetic Geckotape", International Journal of Adhesion & Adhesives, BAE Systems Limited, United Kingdom, Jul. 11, 2008.
M. Lamblet, E. Verneuil, T. Vilmin, A. Buguin, P. Silberzan, and L. Leger, "Adhesion Enhancement through Micropatterning at Polydimethylsiloxane-Acrylic Adhesive Interfaces", Langmuir 2007, 23, 6966-6974, France, Oct. 23, 2006.
Christian Greiner, Ara'nzazu del Campo,* and Eduard Arzt, "Adhesion of Bioinspired Micropatterned Surfaces: Effects of Pillar Radius, Aspect Ratio, and Preload", Langmuir 2007, 23, 3495-3502, Max Planck Institute for Metals Research, Heisenbergstrasse 3, 70569 Stuttgart, Germany, Nov. 22, 2006.
Burak Aksak, Michael P. Murphy, and Metin Sitti, "Adhesion of Biologically Inspired Vertical and Angled Polymer Microfiber Arrays", Langmuir 2007, 23, 3322-3332, NanoRobotics Laboratory, Department of Mechanical Engineering, Carnegie Mellon University, Pittsburgh, Pennsylvania, Sep. 14, 2006.
Burak Aksak, Michael P. Murphy, and Metin Sitti, "Gecko Inspired Micro-Fibrillar Adhesives for Wall Climbing Robots on Micro/Nanoscale Rough Surfaces", Carnegie Mellon University, Pittsburgh, Pennsylvania, IEEE International Conference on Robotics and Automation (ICRA), May 2008.
Michael P. Murphy, Burak Aksak, and Metin Sitti, "Adhesion and Anisotropic Friction Enhancements of Angled Heterogeneous Micro-Fiber Arrays with Spherical and Spatula Tips", Mechanical Engineering Department, Carnegie Mellon University Pittsburgh, PA, Jul. 30, 2007.
Shravanthi Reddy, Eduard Arzt, and Aranzazu del Campo, "Bioinspired Surfaces with Switchable Adhesion", Adv. Mater. 2007, 19, 3833-3837, Germany, 2007.
Seok Kim and Metin Sitti, "Biologically inspired polymer microfibers with spatulate tips as repeatable fibrillar adhesives", Applied Physics Letters 89, 261911, 2006.
S. Gorb, M. Varenberg, A. Peressadko and J. Tuma, "Biomimetic mushroom-shaped fibrillar adhesive microstructure", J. R. Soc. Interface (2007) 4, 271-275, Germany, Oct. 17, 2006.
Aranzazu del Campo, Christian Greiner, and Eduard Arzt, "Contact Shape Controls Adhesion of Bioinspired Fibrillar Surfaces", Langmuir 2007, 23, 10235-10243, Germany, Apr. 11, 2007.
K. A. Daltorio, S. Gorb, A. Peressadko, A. D. Horchler, R. E. Ritzmann and R. D. Quinn, "A Robot that Climbs Walls using Microstructured Polymer Feet," Proceedings of the Eighth International Conference on Climbing and Walking Robots and the Support Technologies for Mobile Machines, London, UK (2005) pp. 131-138.
Aranzazu del Campo,* Eduard Arzt, "Design Parameters and Current Fabrication Approaches for Developing Bioinspired Dry Adhesives", Macromolecular Journals, Macromol. Biosci. 2007, 7, 118-127, Germany, 2007.
Daniel Santos, Matthew Spenko, Aaron Parness, Sangbae Kim & Mark Cutkosky, "Directional adhesion for climbing: theoretical and practical considerations", Journal of Adhesion Science and Technology, Apr. 2, 2012.
Daniel Santos, Sangbae Kim, Matthew Spenko, Aaron Parness, Mark Cutkosky, "Directional Adhesive Structures for Controlled Climbing on Smooth Vertical Surfaces", 2007 IEEE International Conference on Robotics and Automation Roma, Italy, Apr. 10-14, 2007.
Seok Kim, Metin Sittia, Chung-Yuen Hui and Rong Long, and Anand Jagota, "Effect of backing layer thickness on adhesion of single-level elastomer fiber arrays", Applied Physics Letters 91, 161905, 2007.
Michael P. Murphy, Seok Kim, and Metin Sitti, "Enhanced Adhesion by Gecko-Inspired Hierarchical Fibrillar Adhesives" , vol. 1 • No. 4 • 849-855 • 2009, American Chemical Society, Applied Materials & Interfaces, Mar. 20, 2009.
Seok Kim, Burak Aksak, and Metin Sittia, "Enhanced friction of elastomer microfiber adhesives with spatulate tips", Applied Physics Letters 91, 221913, 2007, Jun. 13, 2007.
Seok Kim, Metin Sitti, Ji-Hyun Jang, & Edwin L. Thomas, "Fabrication of Bio-Inspired Elastomer Nanofiber Arrays with Spatulate Tips using Notching Effect", IEEE, 2008.
Michael P. Murphy, Burak Aksak, and Metin Sitti, "Gecko-Inspired Directional and Controllable Adhesion", small 2009, 5, No. 2, 170-175, Germany, 2009.
Christian Greiner, Eduard Arzt, and Aranzazu del Campo, "Hierarchical Gecko-Like Adhesives", Adv. Mater. 2009, 21, 479-482, Germany, 2009.
Stanislav N Gorb, Mitali Sinha, Andrei Peressadko, Kathryn A. Daltorio, and Roger D. Quinn, "Insects did it first: a micropatterned adhesive tape for robotic applications", Bioinsp. Biomim. 2 (2007) S117-S125, Aug. 20, 2007.
M Varenberg and S Gorb, "A beetle-inspired solution for underwater adhesion", J. R. Soc. Interface 2008 5, Mar. 6, 2008.
M Varenberg and S Gorb, "Close-up of mushroom-shaped fibrillar adhesive microstructure: contact element behaviour", J. R. Soc. Interface 2008 5, Jul. 6, 2008.
Dan Sameoto, Yasong Li, Carlo Menon, "Multi-Scale Compliant Foot Designs and Fabrication for Use with a Spider-Inspired Climbing Robot", Journal of Bionic Engineering 5 (2008) 189-196, 2008.
Stanislav N. Gorb & Michael Varenberg, "Mushroom-shaped geometry of contact elements in biological adhesive systems", Journal of Adhesion Science and Technology, Apr. 2, 2012.
Aránzazu del Campo,* Christian Greiner, Irma Álvarez, and Eduard Arzt, "Patterned Surfaces with Pillars with Controlled 3D Tip Geometry Mimicking Bioattachment Devices", Adv. Mater. 2007, 19, 1973-1977, 2007.
Nicholas J. Glassmaker, Anand Jagota, Chung-Yuen Hui, William L. Noderer, and Manoj K. Chaudhury, "Biologically inspired crack

(56) References Cited

OTHER PUBLICATIONS trapping for enhanced adhesion", 10786-10791 PNAS Jun. 26, 2007 vol. 104 No. 26, Proceedings of the National Academy of Sciences, Jun. 26, 2007.

Ralph Spolenak, Stanislav Gorb, Huajian Gao and Eduard Arzt, "Effects of contact shape on the scaling of biological attachments", Proc. R. Soc. A (2005) 461, 305-319, Nov. 2, 2004.

W.L Noderer, L Shen, S Vajpayee, N. J Glassmaker, A Jagota and C.-Y Hui, "Enhanced adhesion and compliance of film-terminated fibrillar surfaces", Proc. R. Soc. A 2007 463, Oct. 8, 2007.

D Sameoto and C Menon, "A low-cost, high-yield fabrication method for producing optimized biomimetic dry adhesives", J. Micromech. Microeng. 19 (2009) 115002 (7pp), 2009.

D Sameoto and C Menon, "Direct molding of dry adhesives with anisotropic peel strength using an offset lift-off photoresist mold", J. Micromech. Microeng. 19 (2009) 115026 (5pp), 2009.

M Varenberg and S Gorb, "Shearing of fibrillar adhesive microstructure: friction and shear-related changes in pull-off force", J. R. Soc. Interface 2007 4, Aug. 22, 2007.

Lulin Shen, Nicholas J. Glassmaker, Anand Jagota and Chung-Yuen Hui, "Strongly enhanced static friction using a film-terminated fibrillar interface", Soft Matter, Jan. 28, 2008.

A.V. Spuskanyuk, R.M. McMeeking, V.S. Deshpande, E. Arzt, "The effect of shape on the adhesion of fibrillar surfaces", Acta Biomaterialia 4 (2008) 1669-1676, Nov. 3, 2007.

* cited by examiner

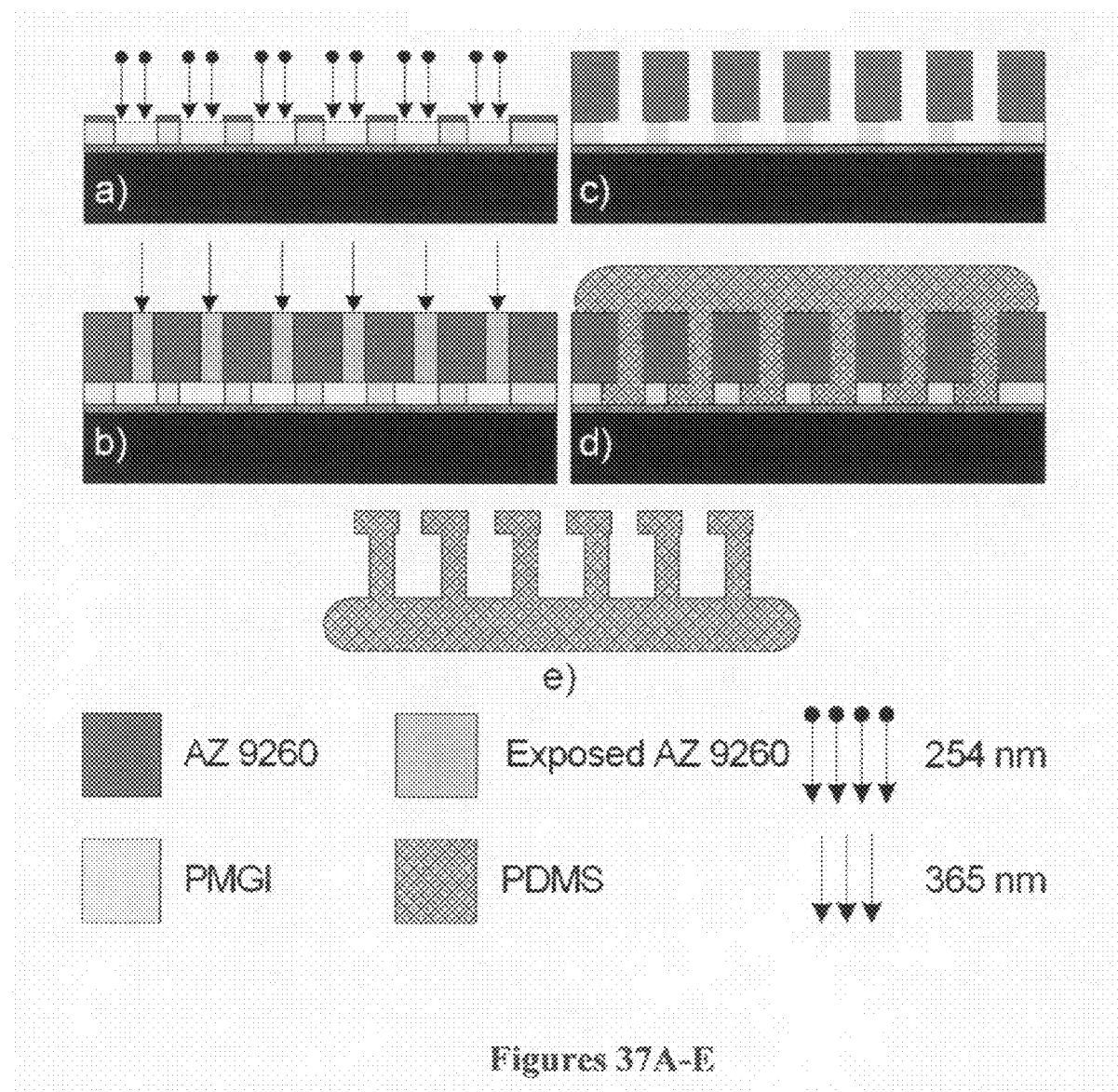
Figures 37A-E

BIOMIMETIC DRY ADHESIVES AND METHODS OF PRODUCTION THEREFOR

1. CROSS-REFERENCE TO RELATED APPLICATIONS

The present application claims priority to the following previously filed patent applications:

U.S. Provisional Patent Application No. 61/251,667 filed Oct. 14, 2009 and entitled DIRECT MOLDING OF DRY ADHESIVES WITH ANISOTROPIC PEEL STRENGTH USING OFFSET LIFT-OFF PHOTORESIST MOLD; and U.S. Provisional Patent Application No. 61/292,835 filed Jan. 6, 2010 and entitled BIOMEMETIC DRY ADHESIVES AND METHODS OF PRODUCTION THEREFOR.

The contents of the two above-noted previously filed patent applications are hereby incorporated by reference in their entirety.

2. FIELD OF THE INVENTION

The present invention relates generally to dry adhesive materials. More particularly, the present invention relates to biomimetic dry adhesives and methods of production therefor involving photolithographically formed molds.

3. BACKGROUND TO THE INVENTION

Biomimetic dry adhesives are inspired by the fibrillar structures found on the feet of geckos and certain spiders. These adhesives have been investigated by multiple research groups for use in applications ranging from climbing robots, to use in surgical tools or bandages, for example. Microstructuring surfaces into fibers has been shown to allow relatively stiff materials to be more compliant in order to make intimate contact with substrates so that van der Waals interactions can produce significant adhesion for exploitation in dry adhesive structures. One application is to develop biomimetic dry adhesives for use in space applications. Potential advantages of these types of adhesives for use in space is that dry adhesives may provide for operation in vacuum without problems of out-gassing encountered with traditional pressure sensitive adhesives (PSAs), and could potentially be used on almost any surface. While the structures of gecko feet have been confirmed to operate in vacuum, there have been conflicting reports on the effectiveness of synthetic dry adhesives in vacuum conditions. This is partially due to the higher number of synthetic dry adhesive designs that use mushroom shaped fibers—an innovation that could potentially introduce a suction cup effect which may fail in low-pressure environments.

Biomimetic dry adhesives with mushroom shaped fibers have been found to be far more effective than their flat tipped counterparts for loading in the normal direction. While multiple groups have tested high aspect ratio fibers made of stiff polymers or carbon nanotubes, these adhesives generally perform much better in shear than with normal loads. In contrast, softer materials with mushroom shaped fibers demonstrate normal adhesion that is much greater than unstructured surfaces, and can have a high ratio of adhesion strength to preload. Multiple research groups have developed methods of producing mushroom shaped adhesive geometry, with fiber diameters ranging from <5 to >50 µm. In theory, these fibers operate primarily on van der Waals interactions between surfaces, and may operate effectively under vacuum. In practice, several groups have reported on performance degradation under low pressure conditions, or adhesion underwater—an unexpected occurrence if van der Waals forces are the primary cause of adhesion. In some such reports, the caps on the pillars were large (>40 µm) but no systemic investigation on the effectiveness of fibers with different cap sizes and at different pressures has been demonstrated before now. In an embodiment of the present invention, the microscale adhesion properties of elastomer based synthetic dry adhesives with a variety of cap diameters are examined.

In other applications which do not require adhesion of the dry adhesive in low-pressure environments, effective adhesives made of relatively soft materials (E~1-10 MPa) have shown in experimental results that the shape of the fiber tip itself is dominant when determining maximum adhesion pressure, with mushroom shaped tips demonstrating the greatest effectiveness. Offset caps have been demonstrated such as by dipping and smearing flat fiber tips in fresh silicone, but their measured adhesion was less than that of aligned mushroom caps. More recently, angled tips have been used by different research groups to replicate some anisotropic behavior but these methods have required complex lithography or dipping techniques to define the molds or produce the final directional dry adhesives.

4. SUMMARY OF THE INVENTION

According to one embodiment of the present invention, a method of manufacturing a dry adhesive structure comprising overhanging cap and undercut fiber structures is provided. Such method comprises:
  applying a photoresistive material to a photosensitive mold substrate comprising polymethyl methacrylate;
  patterning and developing the photoresistive material to form a mask comprising overhanging cap structures corresponding to the dry adhesive structure, wherein the mask is substantially opaque to UV light;
  exposing the mask and mold substrate to UV light to pattern the mold substrate;
  developing the mold substrate with the substrate developer to remove an exposed portion of the mold substrate to form undercut fiber structures substantially aligned with and supporting the overhanging cap structures corresponding to the dry adhesive structure;
  molding an elastomer rubber material in the mold substrate to form an elastomer rubber negative mold comprising the overhanging cap and undercut fiber structures; and
  molding a flexible polymer material in the elastomer rubber negative mold to form the dry adhesive structure comprising the overhanging cap and undercut fiber structures.

According to another embodiment of the present invention, a dry adhesive structure consisting of a flexible polymer material is provided. The flexible polymer dry adhesive comprises:
  a base structure;
  a plurality of fiber structures extending from said base structure and having an aspect ratio of at least 1:1; and
  a plurality of cap structures corresponding to and situated atop said fiber structures wherein said cap structures substantially overhang said fiber structures on at least one side.

According to yet a further embodiment of the present invention, a method of manufacturing an anisotropic dry adhesive structure is provided. The method of manufacturing an anisotropic dry adhesive structure comprises:
  applying a metallic layer to a silicon wafer mold substrate;
  applying a first photoresistive material to the mold substrate;

applying a second photoresistive material to the mold substrate;

patterning and developing the second photoresistive material to form a mask on the first photoresistive material defining cap structure shapes corresponding to the anisotropic dry adhesive structure;

exposing the second photoresistive material to a first UV light and developing to form cap mold structures corresponding to the anisotropic dry adhesive structure;

applying a third photoresistive material to the mold substrate;

exposing the third photoresistive material to a second UV light in a pattern defining fiber structure shapes corresponding to the anisotropic dry adhesive structure;

developing the third photoresistive material to form fiber mold structures corresponding to the anisotropic dry adhesive structure; and molding a flexible polymer material in the mold substrate to form the anisotropic dry adhesive structure comprising cap and fiber structures.

5. BRIEF DESCRIPTION OF THE DRAWINGS

FIG. 37 illustrates a schematic view of a manufacturing process for manufacturing anisotropic dry adhesive structures according to an embodiment of the present invention.

6. DETAILED DESCRIPTION OF SEVERAL EMBODIMENTS

In one embodiment of the present invention, a novel fabrication method is provided that uses deep UV exposures such as from germicidal lamps or other suitable UV sources to convert commercial acrylic substrates (such as polymethylmethacrylate or "PMMA" for example) into master molds for biomimetic dry adhesives. Such biomimetic dry adhesives are inspired by the fibrillar structures found on the feet of geckos and certain spiders, and may desirably provide for multiple adhesion surfaces (also referred to as "caps") which may conform and adhere to other surfaces primarily through van der Waals interactions. An advantage of the present fabrication method of such embodiment is in the scale of the patterning that it can achieve, with the capabilities of making repeatable and customizable adhesive structures for a variety of applications and potential mold sizes in excess of those produced in traditional silicon technologies (such as silicon photoresist fabrication), which may typically be limited by the size of the silicon, for example. Such traditional photoresist based fabrication processes have been used to investigate methods of improving yield, adhesion strength, and anisotropic behavior of silicone based dry adhesives. In the present embodiment, the dry adhesive molding technology may be used to scale up to dozens of square feet per individual mold, or may optionally also be appropriate for continuous casting by combining multiple molds.

The use of 254 nm UV light exposures have previously been made for thin polymethylmethacrylate (PMMA) lithography and MEMS. However, in an embodiment of the present invention, PMMA lithography by UV (such as 254 nm) light exposure may be implemented in a simple method to produce detailed structures on commercial acrylic substrates which may comprise primarily PMMA and additives, and optionally also other suitable known acrylic materials. By using bulk acrylic (such as PMMA) to produce positive molds for subsequent dry adhesive designs, this process of the present embodiment may be used to design a master mold in a relatively stiff material that may be used for optimizing the geometry of subsequently cast dry adhesives. The basic process according to an embodiment of the present invention is outlined in FIG. 1.

Figure 2:
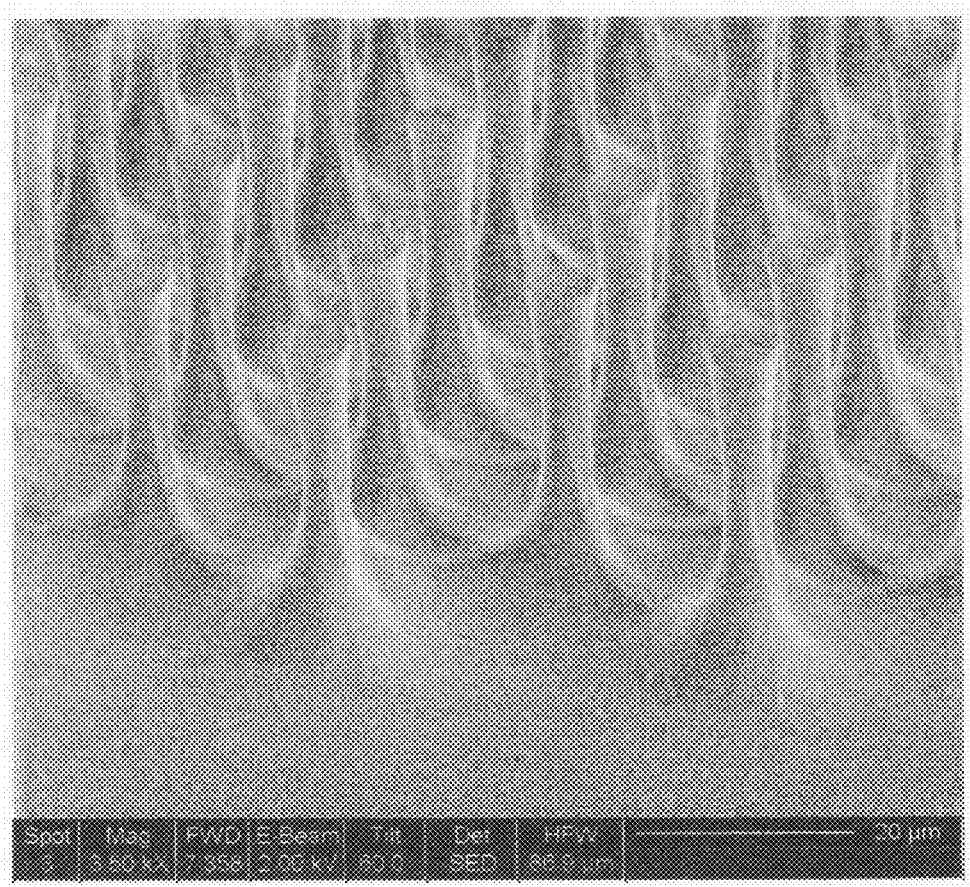
FIG. 2 illustrates a scanning electron microscope (SEM) image of an acrylic mold substrate according to an embodiment of the present invention.
Figure 3:
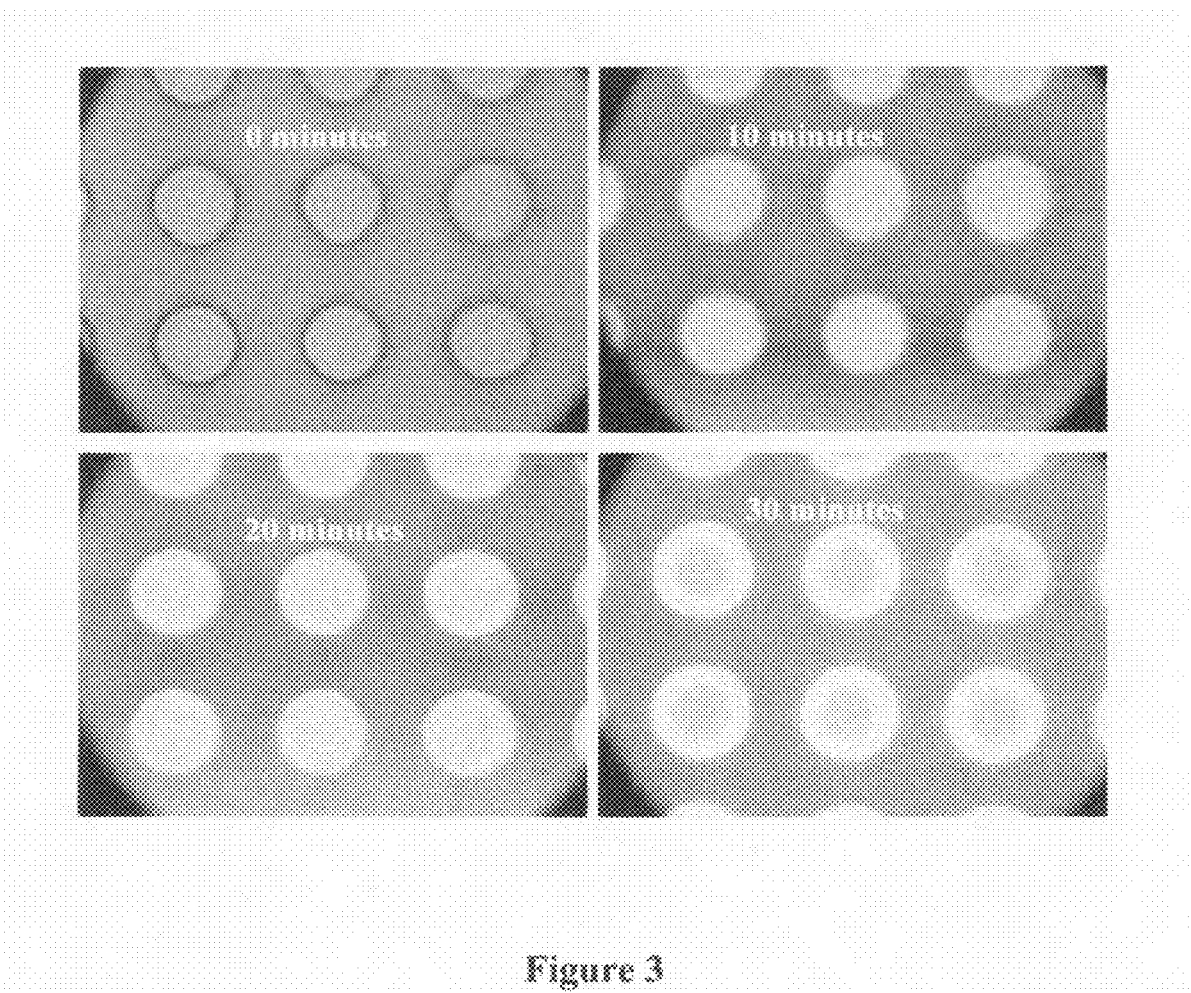
FIG. 3 illustrates optical microscope images of an acrylic mold substrate according to an embodiment of the present invention.
Figure 4:
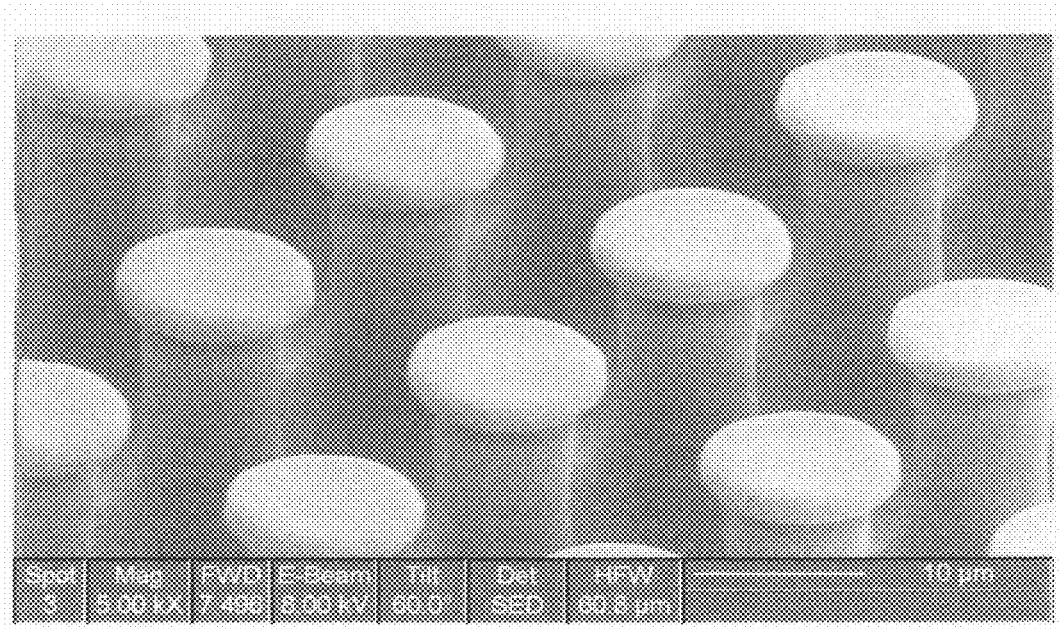
FIG. 4 illustrates an SEM image of a dry adhesive structure manufactured according to an embodiment of the present invention.
Figure 5:
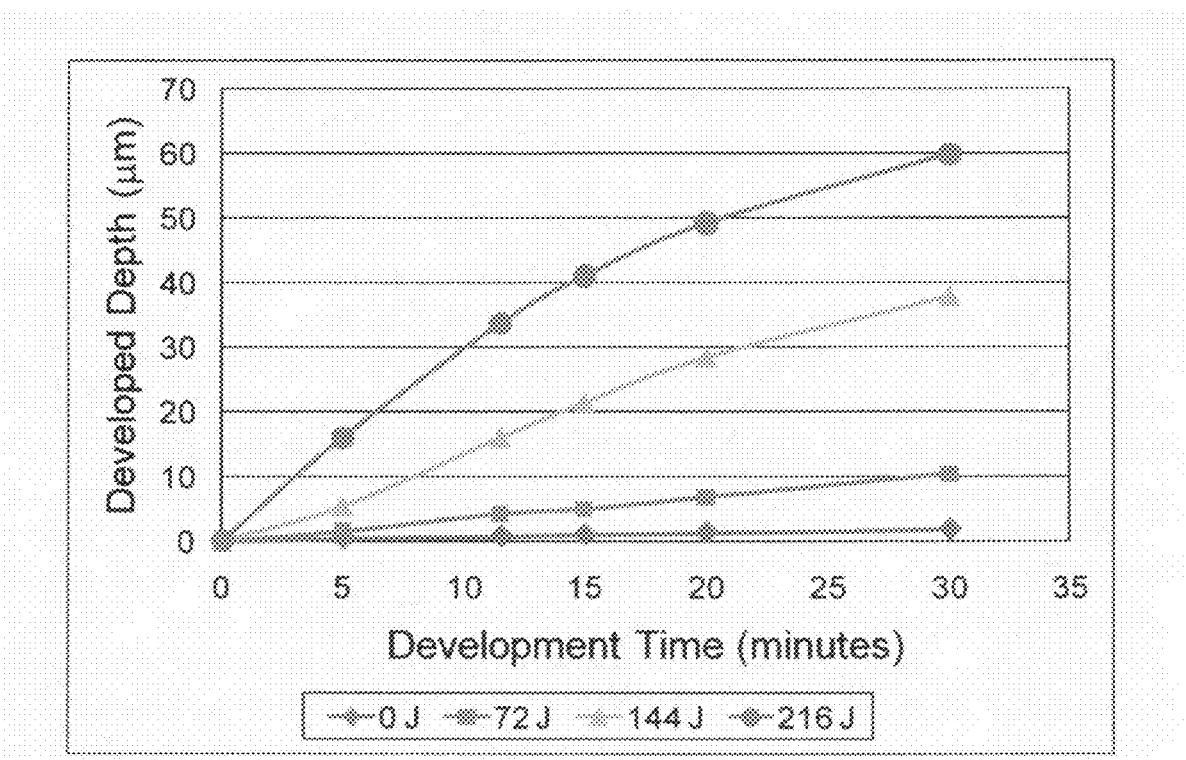
FIG. 5 illustrates a graph of development depth vs. development time for an acrylic mold substrate according to an embodiment of the invention.

In such method, a thin layer of SU-8 (or optionally another suitable photoresist material) is spun on a commercial acrylic substrate (such as OPTIX® from Plaskolite™), pre-baked, exposed, post-baked and developed. SU-8 is nearly opaque to 254 nm light, and serves as a deep UV mask and as a cap on the top of acrylic fibers. A Stratagene™ 2400 DNA crosslinker or other suitable 254 nm light source may then be used optionally in combination with anti-scatter grids which may desirably have aspect ratios of between about 1:1 and 2:1. Acrylic samples are placed on a rotating turntable during exposure to equalize the UV light dose received through the anti-scatter grids. This system combined with the natural reduction of angle by Snell's Law may desirably produce elongate acrylic fibers, such as fibers with aspect ratios desirably above about 4:1 for example (see FIG. 2) substantially evenly across large areas. Such optional use of anti-scatter grids may desirably reduce the negative sidewall angles and improve the aspect ratio of fibers produced in acrylic. Semi-collimation of large-area 254 nm exposures may be achieved by the introduction of a such simple anti-scatter grids between the light bulbs and the acrylic substrate. Anti-scatter grids have been extensively used for X-ray collimation purposes where traditional optics are not appropriate, but this method has not previously been widely used in UV lithography due to the relatively severe reduction in exposure intensity. For large-area exposures in certain embodiments of the present invention however, an anti-scatter grid with an aspect ratio as small as 1:1 can produce a much diminished negative sidewall angle with an acceptable increase in exposure time compared to uncollimated exposures. This is partially due to the effect of Snell's law aiding in the reduction in sidewall angle by reducing the light angle as it passes from air to the higher index of refraction acrylic substrate. For higher aspect ratio anti-scatter grids, the further improvement of sidewall angle due to Snell's law is reduced, and the ultimate aspect ratio of features will approach that of the anti-scatter grid. The anti-scatter grids used in embodiments of the present invention may be made of plastic grating commonly found in industrial or commercial lighting over fluorescent bulbs. On exemplary single level grating was approximately 12.5 mm thick, with square holes 12×12 mm in size and ~1 mm thick walls providing a ~1:1 aspect ratio grid. Two such gratings may be stacked to form a 2:1 aspect ratio grid.

In one embodiment, the UV exposure may desirably lower the molecular weight of the acrylic substrate so that it may be removed rapidly in developers, such as known acrylic and/or photoresist developing solutions, for example. In embodiments of the present inventive method, it has been have found that SU-8 developer provides a suitable combination of convenience, speed, and natural undercutting of the SU-8 structures on the surface of the substrate when used to develop the exposed acrylic. Because OPTIX® acrylic material has a relatively low molecular weight the unexposed acrylic material will preferentially dissolve at approximately 60 nm per minute—forming desirably mushroom shaped acrylic fibers, for example.

In such embodiment, once the required master shapes (such as the mushroom shaped acrylic fibers and caps) are completed out of acrylic and SU-8 materials, a negative mold may be made of the structure by casting of a suitable silicone-based or other suitable pliable molding material. After such negative silicone mold is made, multiple materials may be cast from this mold in the shape of the original fiber designs to produce the desired dry adhesive structure. In one embodiment, exemplary such materials which may be cast to form dry adhesive structures include silicones, polyurethanes, siloxanes, polyamides, polyethylenes, or other suitable known dry adhesive materials. In an alternative embodiment, such potentially suitable dry adhesive materials may also comprise substantially stiffer and less pliable materials such as substantially rigid or partially flexible polymer materials, for example. In an exemplary embodiment, a Sylgard® 184 polydimethylsiloxane (PDMS) such as is available from Dow Chemical may be used to form the dry adhesive structure. Sylgard® 184 is an exemplary platinum catalyzed silicone material. Preferably, the photoresist materials selected for use in embodiments of the present invention do not significantly inhibit the cure of the Sylgard® 184 or other materials used to produce the dry adhesive structure.

Figure 6:
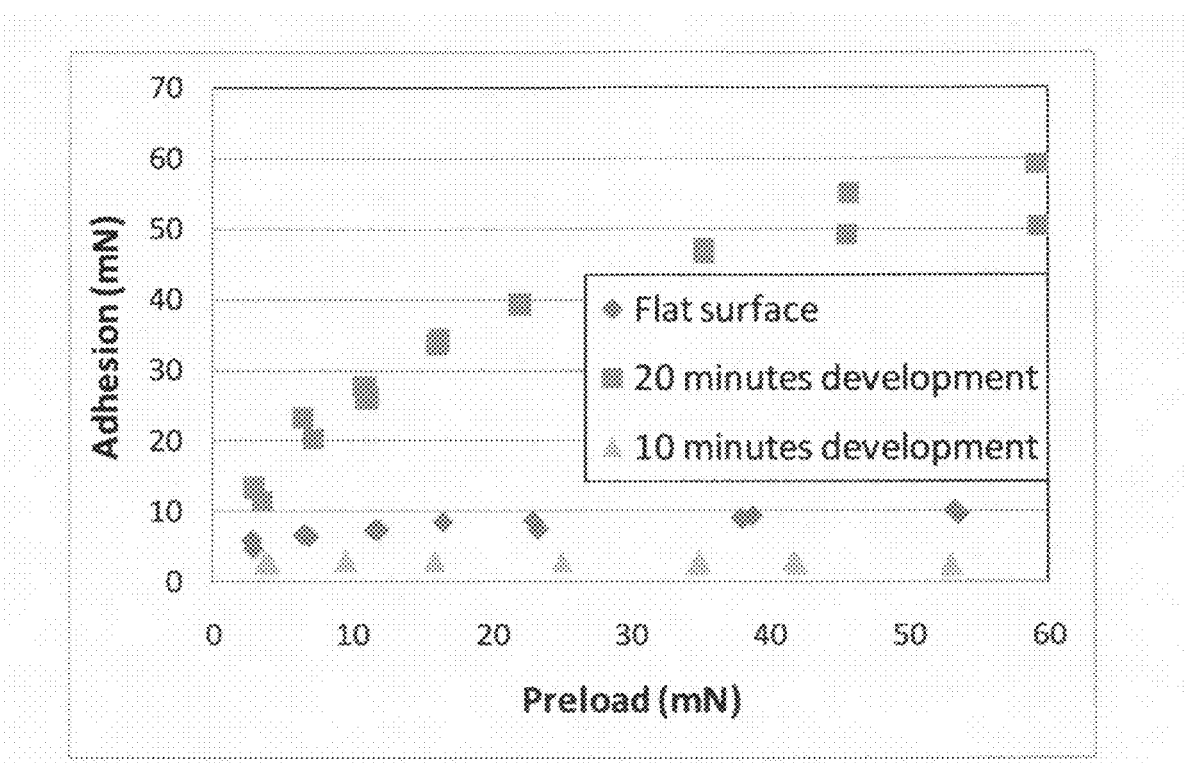
FIG. 6 illustrates a graph of adhesion force vs. preload force for a dry adhesive structure according to an embodiment of the present invention.

In one embodiment, negative silicone molds may be taken of acrylic master molds for different exposure doses after various stages of development to desirably vary or customize the fiber survival rate, fabrication yield and the effectiveness of polyurethane dry adhesives in the resulting geometries (see FIG. 6). Adhesion between SU-8 and acrylic may be strongly influenced by processing conditions and may dominate the lifetime of master acrylic molds. Optimizing process parameters may desirably provide both high yield reusable acrylic master molds and dry adhesive structures with high adhesive strength. Such optimized embodiments may desirably represents a significant improvement in the manufacturability of large areas of microscale dry adhesive structures and as a method to produce high aspect ratio, micro-scale dry adhesive structures over areas limited in theory only by the size of the acrylic substrate.

Dry Adhesive Structures Adapted to Low Pressure Applications

In a further embodiment of the present invention directed to dry adhesive structures for use in low-pressure environments and adapted to evaluate the microscale adhesion capabilities of relatively small radius fibers, a custom dry adhesive molding system that can be operated within a bell jar to provide adhesion data under a variety of environmental conditions (such as low pressure conditions, for example) was developed. In such embodiment, a polymer molding technology, which is described in further detail below, to produce mushroom shaped fibers of Sylgard® 184 polydimethylsiloxane (PDMS), and provides an easy method of producing fibers with a large number of potential geometries. The general process steps are outlined in FIG. 7.

Figures 7A, 7B, 7C, 7D, 7E:
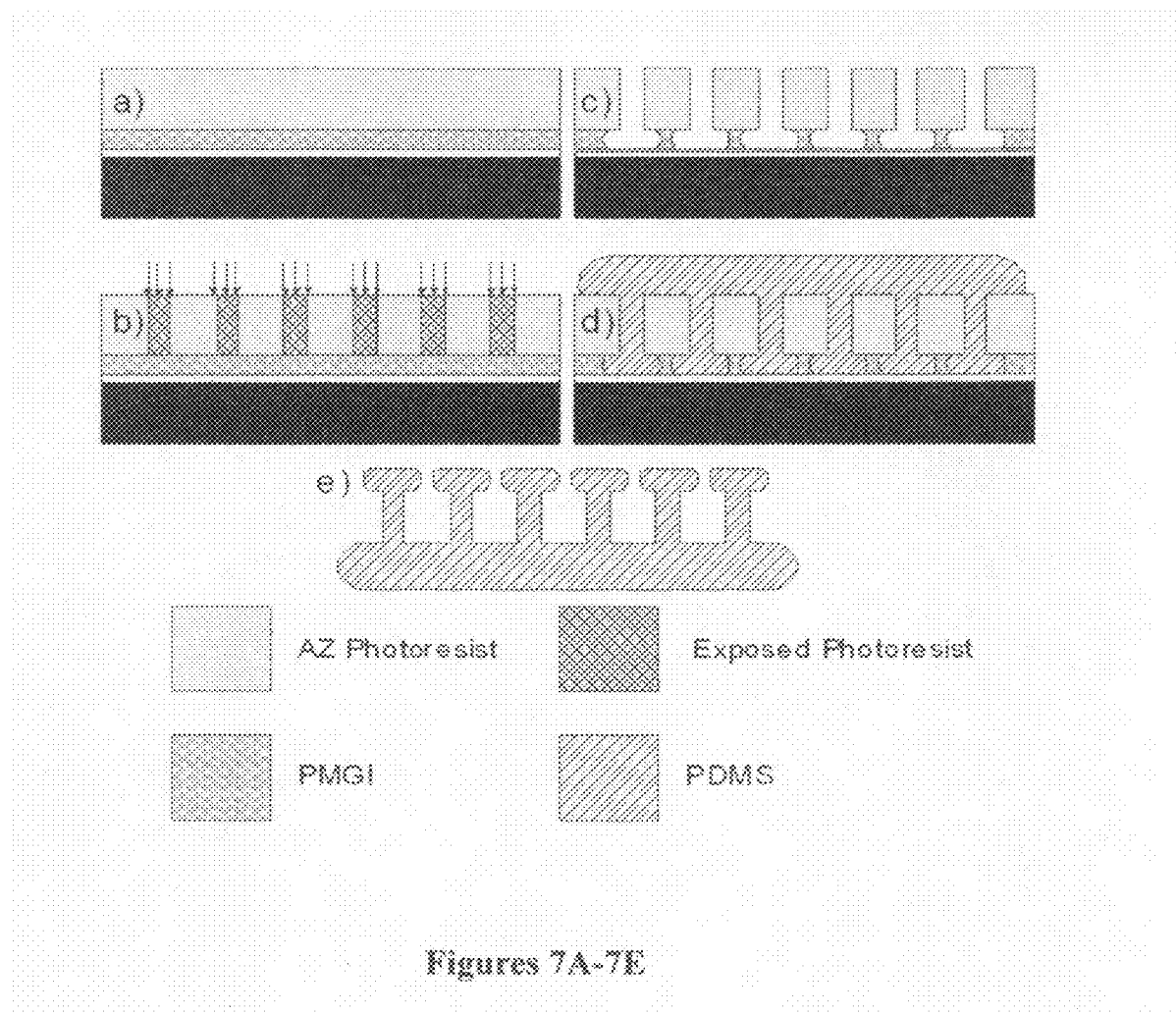
FIG. 7 illustrates a schematic view of a manufacturing process for manufacturing dry adhesive structures according to an embodiment of the present invention.

In such an embodiment as illustrated in FIG. 7, a gold-coated silicon wafer may be used as a base because the PDMS material may typically not adhere to the gold, and a surface modification step may be avoided. Then, a deep UV sensitive photoresist, such as polymethylglutarimide (PMGI), is applied to the wafer to be used as an undercutting layer, such as by being spun onto the wafer. This photoresist material may preferably have good adhesion to gold, may desirably promote adhesion of subsequent spin-on layers, and exposure to 254 nm UV light may desirably increase its dissolution rate in a suitable photoresist developer, such as a developer solution, for example. In one embodiment, a final layer of AZ 9260 photoresist may be applied, which is desirably positive acting and may be patterned in thicknesses up to 100 µm, for example. This final layer photoresist may desirably work well because the positive sloping sidewalls may improve demolding yield and a dry adhesive material, such as PDMS may be easily released from this material without requiring a silanization step.

In such an embodiment, a single wafer may be used to mold the dry adhesives, and the cap size of the dry adhesive structure may be altered by exposing the PMGI through a shadow mask to several doses of 254 nm UV light prior to application of AZ 9260 material such as by spin coating. This may desirably allow different fiber geometries to be produced using one mold under identical processing conditions. After the molds are completed, PDMS or another suitable dry adhesive material may be prepared (such as PCMS mixed up at a ratio of 10:1 pre-polymer to catalyst), optionally degassed under light vacuum and applied to the wafer, such as by being spun onto the wafer to get an even film. The wafer may then be degassed again such as for 1 hour before curing such as at 50° C. for 16 hours, for example. The dry adhesive structures may then be demolded, and baked such as for 1 hour at 120° C. to improve their strength, and stabilize the cure.

Figure 8:
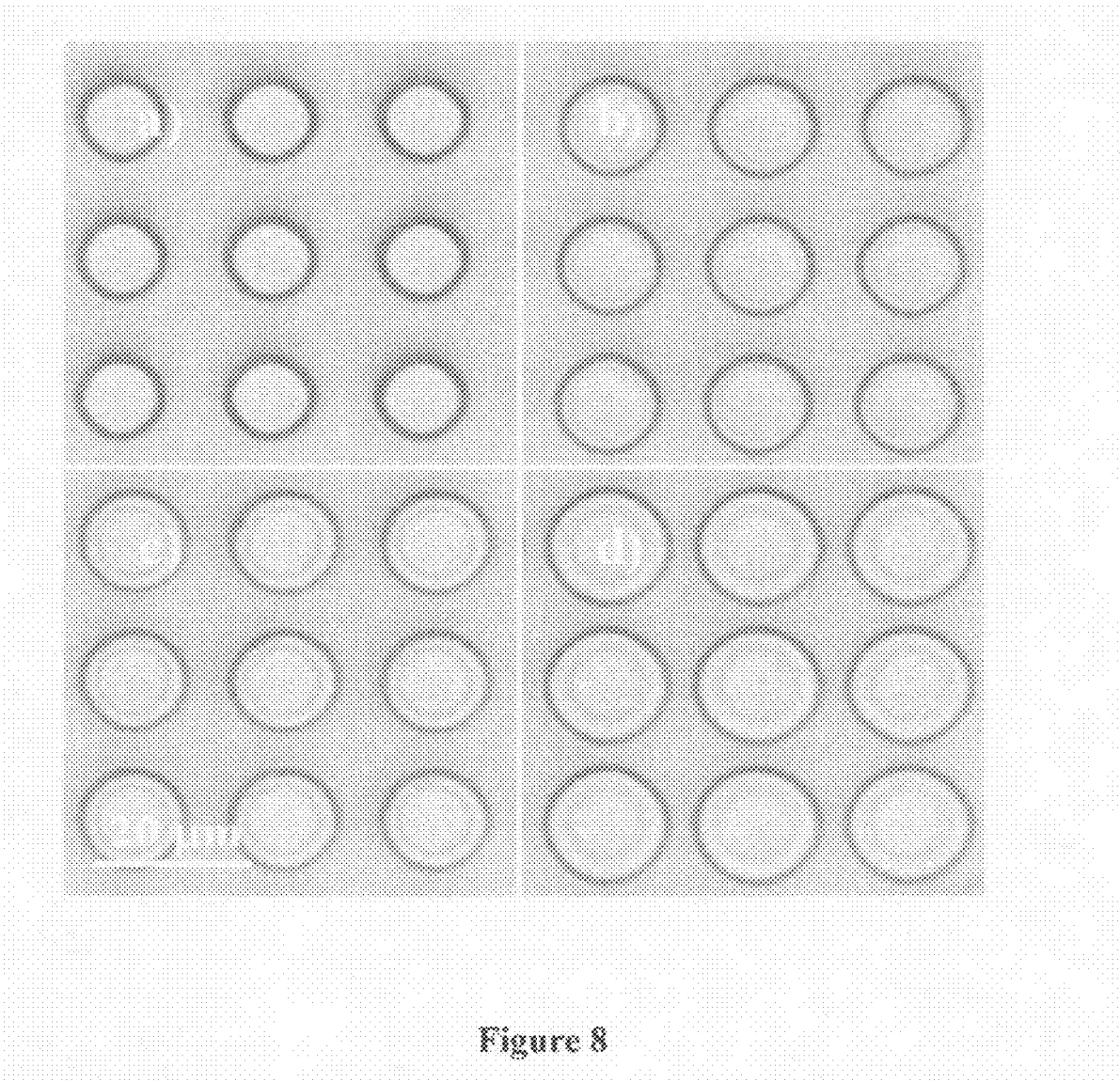
FIG. 8 illustrates optical microscope images of dry adhesive structure cap tips according to an embodiment of the present invention.

FIG. 8 shows optical images of four cap sizes of dry adhesive structures which were manufactured according to the method illustrated in FIG. 7, according to an exemplary embodiment of the present invention. The average cap diameters were measured with an eyepiece micrometer and are considered accurate to ±0.2 µm based on multiple measurements across each sample. The posts or fibers of the dry adhesive structure were defined with approximately 10 µm diameter pillars with a center-to-center spacing of approximately 20 µm in a square array. Each post was approximately 20 µm tall including the cap thickness of approximately 1.5 µm.

Adhesion forces of dry adhesive structures produced according to the embodiments described above in reference to FIGS. 7 and 8 were measured using a custom test system consisting of a sensitive load cell (Transducer Techniques GSO-25), connected to a vacuum compatible linear stage (Zaber Technologies T-LS28-M) that was controlled using custom software written in LabView 8.2. The load cell was connected to a 6 mm diameter sapphire hemisphere lens (Edmund Optics, NT49-556), which would contact the adhesive and minimize the effect of misalignments. Pull off speeds were limited to 5 µm/s and the force sensor was moved in displacement control with multiple tests at each indentation depth. The load cell, linear stage, and adhesive were all fixed to a steel plate that formed the base of a Nalgene® bell jar vacuum chamber that could be pumped down to ~10 kPa pressure.

Figure 9:
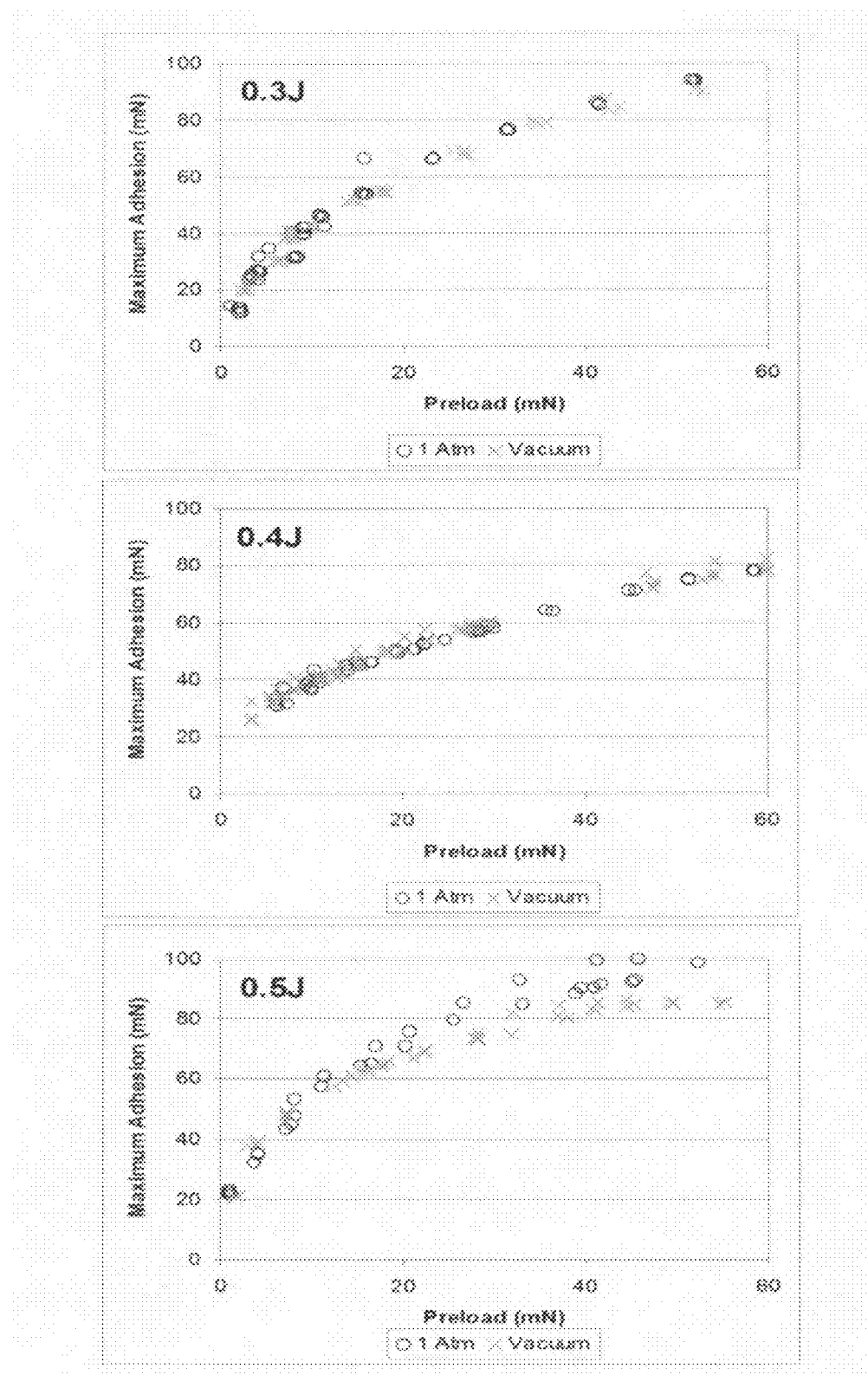
FIG. 9 illustrates graphs of adhesion force vs. preload force for three dry adhesive structure cap sizes according to embodiments of the present invention.

A series of adhesion tests were performed at atmospheric conditions, with varying preloads to test the base adhesive response of the dry adhesive structures. Tests on a flat PDMS surface at different pressures displayed no apparent change in adhesion vs. preload, despite the relative humidity dropping within the chamber under vacuum, suggesting that the adhesion performance of dry adhesive structures according to the present embodiments are insensitive to the effects of relative humidity. Displacement control of the linear stage was used to provide an increasing series of preloads, and the maximum adhesion was measured for each point. The dry adhesive structure sample with the smallest caps was found to have very little adhesion relative to the caps defined using 0.3 J exposure dose, and was excluded from further analysis. Dry adhesive samples were first preloaded with large forces multiple times before adhesion data was collected. Typically, the adhesion strength of dry adhesives has been found to diminish with time, as surface contamination or fiber collapse becomes significant. In the dry adhesive samples according to the above embodiments, the equilibrium adhesion strength after multiple load cycles was considered a better representation of the long-term performance of these dry adhesives, and was therefore included with these measurements. For all dry adhesive structure fibers with the exception of those defined with the 0.5 J exposure dose, fibers remained uncollapsed after large preloads. The resulting curves of preload vs. adhesion strength are shown in FIG. 9. The low pressure or vacuum trials were completed with a −90 kPa gauge pressure.

Upon testing of the above-described dry adhesive structure embodiments, there was desirably no discernable effect of lower atmospheric pressures on the adhesion strength of mushroom shaped dry adhesive fibers at different preloads, and the general reduction of adhesion strength with repeated contact/pull-off cycles was a far larger component of the variation in adhesive strength observed. While a small difference in adhesion is observed for the fibers with the largest caps, this effect appeared most likely due to increased fiber collapse, and this sample had the highest variation in adhesion performance under both atmospheric and low pressure testing.

According to one embodiment of the invention, a variety of different fiber geometries with mushroom cap dry adhesive structures (such as described above in reference to FIGS. 7 and 8) were produced and tested to determine if there is any significant pressure sensitivity with adhesive structure caps greater than about 16 μm in diameter supported by approximately 10 μm diameter pillars. The polymer molding technology described above in reference to FIG. 7 was found to provide control over the physical dimensions of PDMS fibers and mushroom shaped fibers with caps diameters over 50% larger than that of the supporting pillar that have been successfully demolded to test for pressure sensitivity in the present embodiment. Despite the large cap to fiber size ratio of the dry adhesive structures produced and tested in the present embodiment, desirably no significant pressure sensitivity could be determined for these dry adhesive structures, indicating that these elastomer based dry adhesives primarily rely on van der Waals attractive forces as other potential attractive forces such as due to capillary forces, humidity related effects, and atmospheric pressure effects appear to be negligible in the adhesive performance of the present elastomer based dry adhesive embodiments. Therefore, the present elastomer based dry adhesive embodiments may also be suitable for applications involving low-pressure or substantial vacuum environments, such as for space applications, for example.

Further Dry Adhesive Structure and Production Method Embodiments

In the embodiments of the present invention directed to production of dry adhesive structures, SU-8 may be used as a suitable and useful cap producing material and photoresist in the production method, such as described above. However, in other embodiments, other materials such as photoresists, metals, UV insensitive polymers and others suitable materials may alternatively be employed. In one such embodiment, a commercially available mirrored acrylic (PMMA with aluminum already deposited on it) may be used, which may allow the production of dry adhesive structures having multiple levels of fibers through different UV light exposures, doses and patterns, without requiring an SU-8 layer to form the cap material, for example.

Additional advantages of the flexible molding process described above in reference to FIG. 1 may desirably include:

In further embodiments of the invention, substantially any suitable material that may be cast (either as polymer precursors, dissolved in a solvent or melted) may be formed as a dry adhesive structure according to an embodiment of the invention, such as by using the molding dry adhesive production method described above and illustrated in FIG. 1.

In a further embodiment, dry adhesive structure caps may be defined into almost any desired shape, thickness, or size such as through control and variation of one or more of the photoresist mask design or pattern, pre-exposure, exposure and development process steps, and UV light exposure dose. In an exemplary embodiment, the fiber and cap geometries may be configured with fiber heights such as from about 1 um to 100s of um, fiber aspect ratios from less than about 1:1, to more than about 5:1, and cap shapes and/or fiber cross-sections such as substantially round, oval, hexagonal, or rectangular, for example. Such configurability of the dry adhesive structure caps and/or fibers may desirably allow tailored adhesion strength properties across a single sheet of dry adhesive. In a further embodiment, such configurability of the caps may desirably provide for anisotropic adhesion behavior when desired, such as disclosed in further detail below. In yet a further embodiment, such configurability of the dry adhesive structure caps may desirably provide the ability to define the optimal dry adhesive fiber geometry for nearly any dry adhesive structural material or expected adhesion application or environment.

In another embodiment, dry adhesive structure fibers may be naturally formed with fillets on the base of the fibers, such as due to the diffraction angles and properties of the UV light source used to expose the dry adhesive mold substrate. In such an embodiment, the filleted shape of the base of the dry adhesive fibers may desirably provide increased survivability of the fibers during silicone demolding (removal of the dry adhesive structure from the mold) because there are few stress concentrators, and the smooth surfaces allow easy silicone removal with desirably less likelihood of damage or loss of dry adhesive fibers.

In a further embodiment, the dry adhesive fibers may optionally be defined with either collimated or uncollimated UV light sources. Such UV light sources may comprise light at 254 nm and lower wavelengths, for example. While in some embodiments the specific wavelength of UV light exposure may not be critical, a 254 nm light source may be the easiest to produce for exposure on large scales. In such embodiments, the exact shape of the dry adhesive fibers may be controlled by one or more of the light exposure dose, PMMA molecular weight, solvent used for the PMMA development and the total development time, for example.

In yet a further embodiment, PMMA molds may be produced in any size suitable for the process steps required for producing the dry adhesive. In a particular embodiment, PMMA mold sizes may be several dozen square feet, or may alternatively be quite small depending on the resources available to make the original master mold. In one embodiment, the PMMA master molds may comprise either a single or multiple level mold hierarchy, such as may be provided by using a single or multiple layers of photoresist or other suitable material for masking/forming the cap and/or fiber features of the dry adhesive structure. Such flexibility of using single or multiple level master mold hierarchies may desirably provide for direct casting of repeatable single or multiple hierarchal dry adhesive structures according to the invention.

Figure 10:
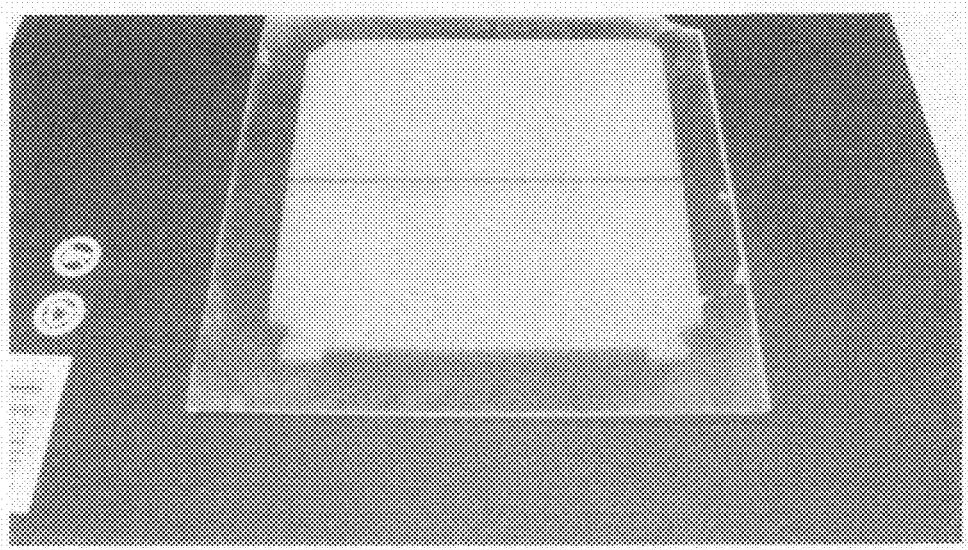
FIG. 10 illustrates a perspective photographic view of an acrylic master mold substrate according to an embodiment of the present invention.
Figure 11:
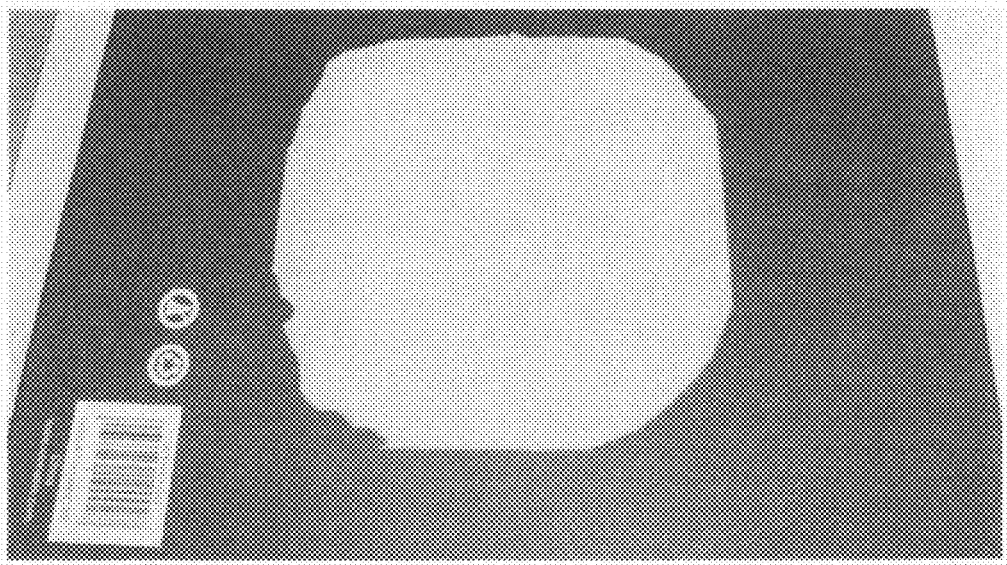
FIG. 11 illustrates a perspective photographic view of a silicone negative mold according to an embodiment of the present invention.
Figure 12:
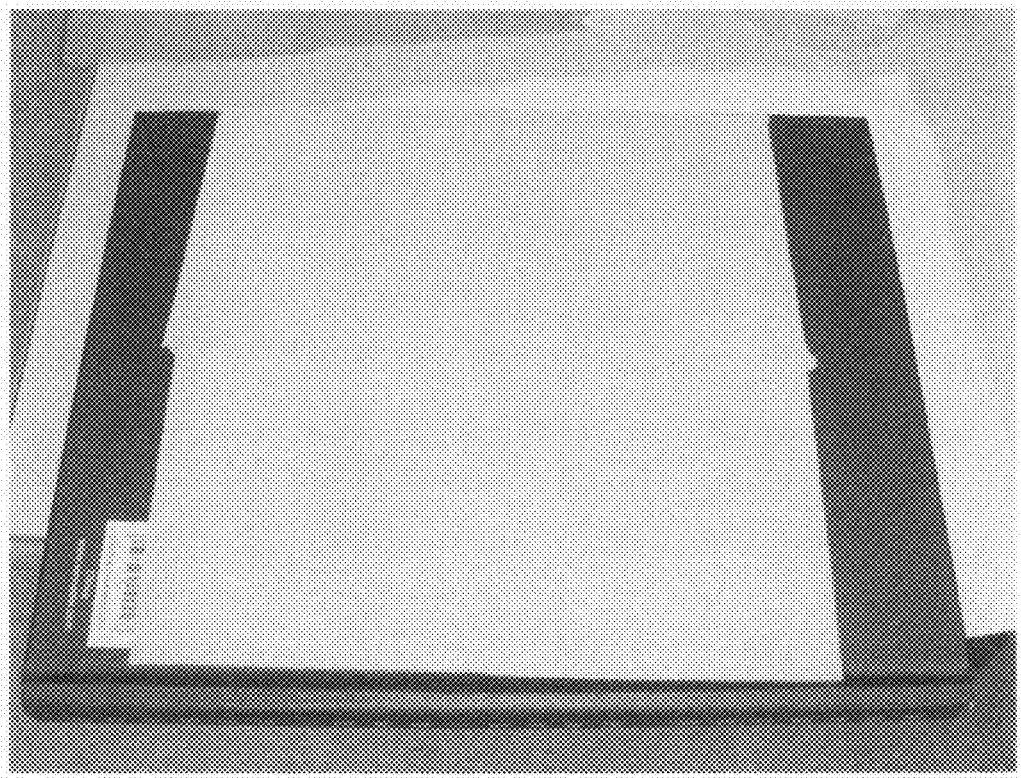
FIG. 12 illustrates a perspective photographic view of a large composite silicone negative mold structure according to an embodiment of the present invention.
Figure 13:
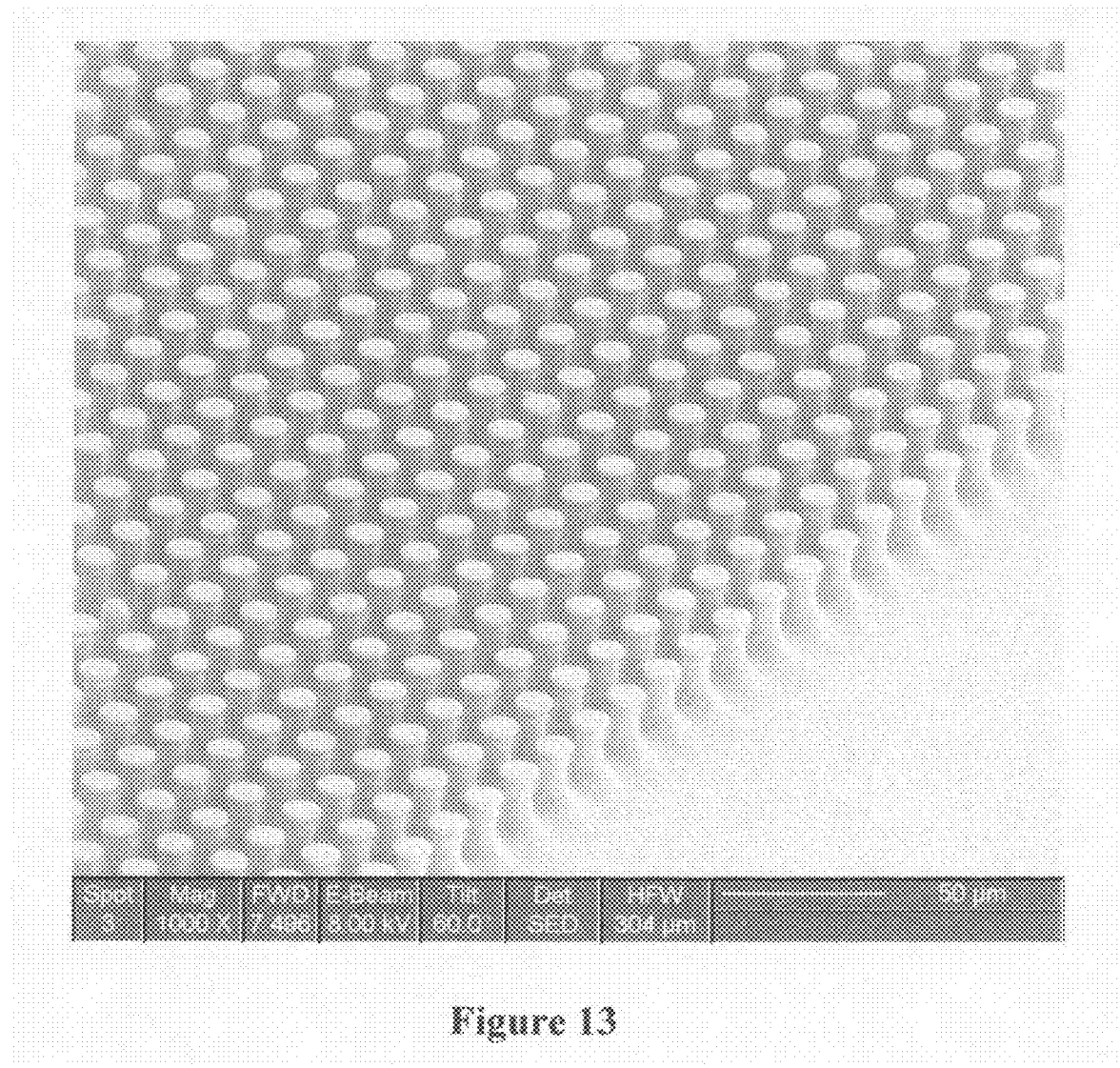
FIG. 13 illustrates an SEM image of a dry adhesive structure manufactured according to an embodiment of the present invention.
Figure 14:
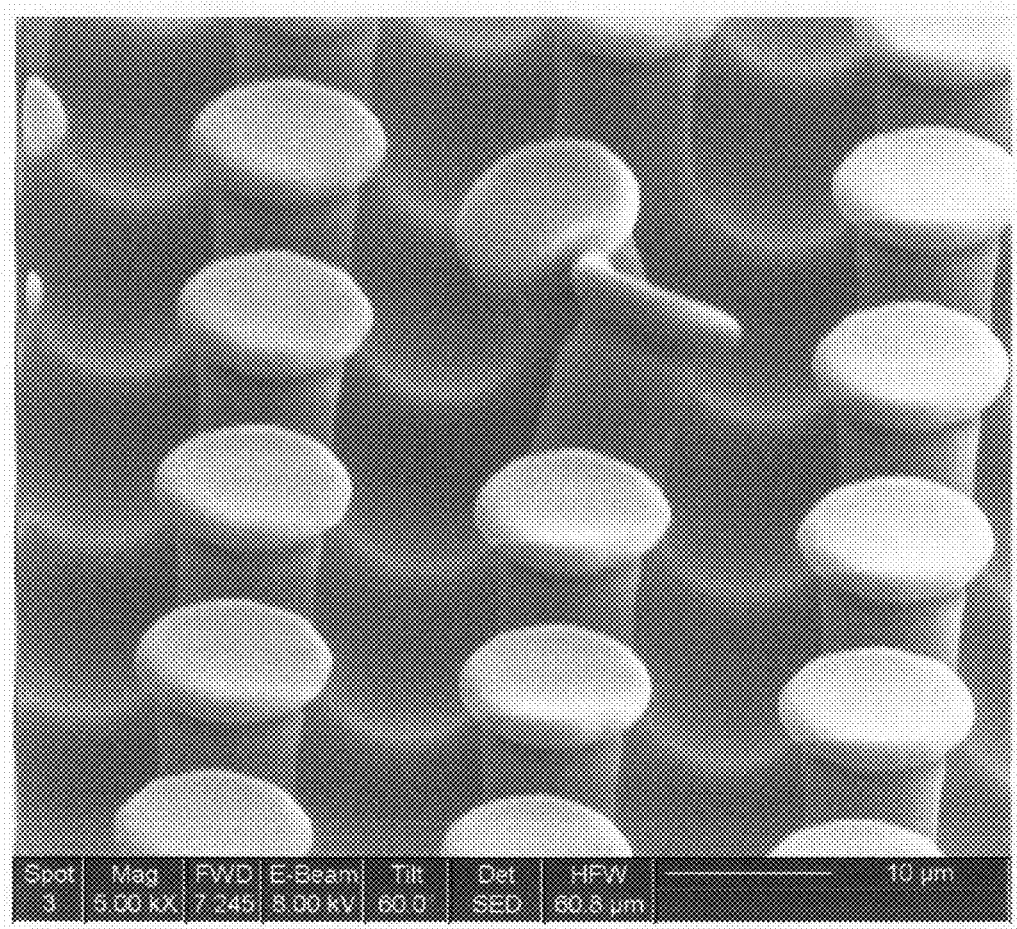
FIG. 14 illustrates an SEM image of a closeup view of the image of FIG. 13 according to an embodiment of the present invention.

In one embodiment, silicone molds may be created from the acrylic master molds desirably without requiring any prior surface treatments to the acrylic master molds. In such an embodiment, the silicone molds may desirably be tough and flexible, allowing even substantially rigid dry adhesive structural materials to be demolded successfully. In another such embodiment, once an original acrylic master mold is created, it may be duplicated in a suitable substantially rigid material, such as an exemplary hard polyurethane or plastic material to enable the making of sister molds as may be desirable for faster duplication of dry adhesive structures, and/or to provide backup molds. In yet anther such embodiment, the casting of a hard plastic or other substantially rigid material using the silicone mold and curing the small dry adhesive fiber structures on other surfaces may desirably allow the assembly of complex hierarchal dry adhesive structures that may be otherwise impossible using existing fabrication techniques. In one embodiment as described above, very large master molds may be made as a singular mold component, or alternatively, smaller versions of a master mold (such as <1'×1' for example) may be made, as illustrated in FIGS. 10 and 11. Subsequently, such smaller master mold components may optionally be assembled make a larger elastomer mold out of several smaller molds as illustrated in FIG. 12 for example. SEM images of exemplary elastomeric dry adhesive structure fibers and caps produced from the negative silicone molds of FIGS. 10-12 are shown in FIGS. 13 and 14.

In an alternative embodiment, surface treating either the acrylic master mold or subsequent elastomer (such as silicone for example) negative molds may provide for producing dry adhesive structures out of any suitable castable materials, including for example, epoxies, silicones, polyurethanes, natural and artificial rubbers and polyimides.

In one embodiment, exemplary final dry adhesive structures may be desirably formed from suitable materials which have substantially low surface energy, are substantially solvent tolerant and have Young's modulus values between ~1 MPa-1 GPa. Further desirable dry adhesive structural materials may also exhibit accelerated cure rates through the application of heat, radiation or other means, or rapid unaccelerated cure times of about a few minutes or less. In one exemplary embodiment, silicone rubbers without fillers (particles of silica etc.) may be used for dry adhesive structures intended for long-term use. In another embodiment, materials used for preparing negative molds for casting the dry adhesives may comprise addition cured silicones which may be surface treated with silanes for subsequent silicone molding, or left untreated for casting other non-silicone materials. In an alternative embodiment however, other suitable materials may be used to form the negative molds, which may desirably be pliable and easily released, and may further desirably be softer than the final dry adhesive material for best demolding results.

In a further embodiment, an optimal dry adhesive structure fiber shape may be created in PMMA for any dry adhesive materials with a Young's modulus lower than that of the PMMA. In such an embodiment, the fiber shape may thereby depend on the dry adhesive material stiffness, viscoelasticity, and strength, in addition to the fabrication limits when making the original master mold. In one embodiment, larger dry adhesive fibers with diameters greater than about 30 µm may be easily defined without requiring a collimated light source, due to the undercutting limits of PMMA. In another embodiment providing smaller fibers, a more collimated light source may be used to undercut into the fibers under the caps before the PMMA fiber falls off the substrate. In general, the most effective fiber size, spacing and cap dimensions may depend on the dry adhesive structural material chosen. In a further embodiment, the UV light source does not have to be 254 nm, and for example, a 184 nm light could also be used from the same light bulbs, which may provide a much faster exposure for small features but may require that the exposure be completed in a vacuum or under inert atmosphere (no O2), rather than the less stringent atmosphere requirements of the 254 nm light source.

Figure 1:
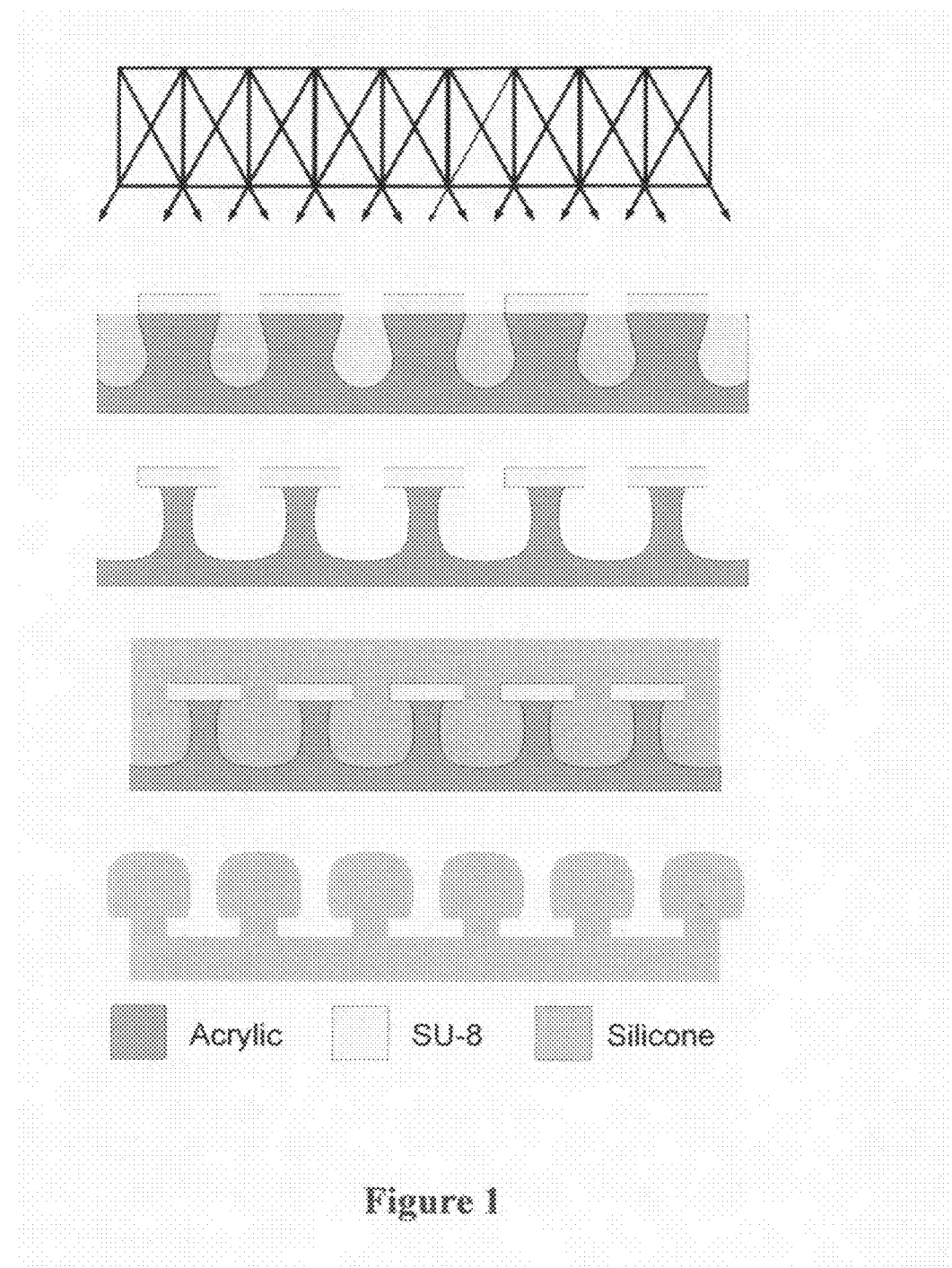
FIG. 1 illustrates a schematic view of a manufacturing process for manufacturing dry adhesive structures according to an embodiment of the present invention.

In embodiments utilizing an SU-8 layer such as illustrated in FIG. 1, the SU-8 caps may be patterned using a suitable patterning/printing process such as soft lithography prior to initial PMMA exposure to define even smaller fibers/caps or other features, for example.

In one embodiment, a high quality nanoscale mold in silicone for instance may be used to cure SU-8 in much smaller structures than can be accurately defined in normal lithography. In a further embodiment, additional levels may be added to dry adhesive structures such as by gluing multiple elastomer molds together. However, in such an embodiment, larger structures may typically take longer to fill in, and vacuum may required to fill in fibers or other features greater than a few hundred µm in size.

In many embodiments of the present invention wherein fiber and cap sizes are in the range of about 1-200 um in size, the application of uncured elastomeric dry adhesive structural materials to a negative mold to cast the dry adhesive structure may desirably be made without the application of vacuum. In such embodiments, the uncured dry adhesive structural material (such as PDMS, polyurethane, polyimide, for example) may be applied to the mold using a spreading technique, such as by using a spreading utensil to force the material into the mold, and/or optionally by also applying a kneading motion to the flexible mold to fill in the fibers/caps and other features of the dry adhesive structure. In one embodiment, such spreading and kneading techniques may be enabled by the unique shape of the dry adhesive fiber features such as the flared or filleted bottom of the fibers, and/or by the flexibility of the negative mold material. Such embodiments may desirably avoid the use of vacuum during casting, which may improve the speed, economics and simplicity of the dry adhesive manufacturing method as described above and in reference to FIG. 1. In a further embodiment, a dry adhesive fabrication method may be provided that uses one or more of physical agitation, electrostatic charge, mechanical scraping and applied pressure to a mold to assist in filling in the mold with castable dry adhesive material for fabrication of the dry adhesive structures.

In some embodiments of the present invention, one or more anti-scatter grids may be used between the UV light source and the acrylic mold substrate during exposure. In such embodiments, the anti-scatter grid may act to removes a substantial portion of the light from the light source and thereby to substantially lengthens the exposure time for producing the master acrylic mold. In further embodiments, one or more other mechanisms or techniques for providing collimation of the UV light source during exposure may also be used. Exemplary such exposure control light sources may comprise UV light emitting diodes, UV lasers with beam expanders and compact UV bulbs with parabolic reflectors for example. In a further embodiment, a lens, such as a hot embossed, cured or fresnel lens may be places between the acrylic mold substrate and the UV light source during exposure, such a to produce angled lithographic patterns due to the refraction effects of the lens on the UV light source, for example.

Figure 15:
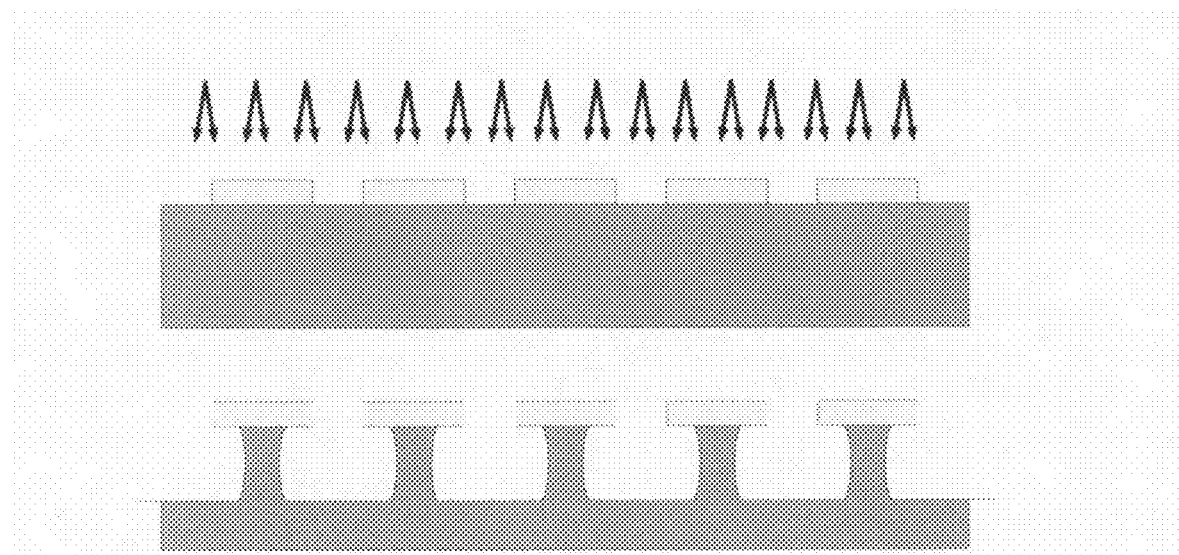
FIG. 15 illustrates a schematic view of a partially collimated light source exposure of an acrylic mold substrate according to an embodiment of the present invention.
Figure 21:
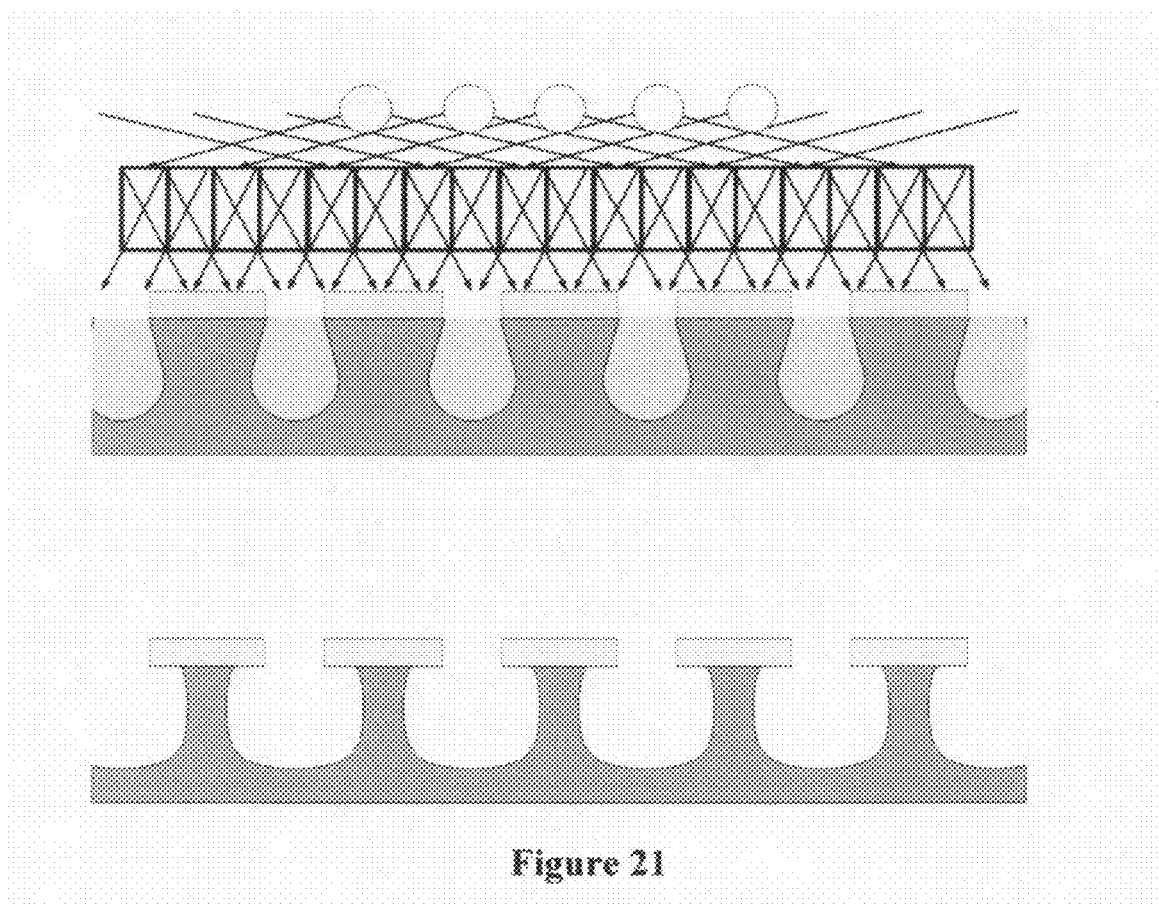
FIG. 21 illustrates a schematic view of a partially collimated light source exposure of an acrylic mold substrate through a diffraction grate according to an embodiment of the present invention.
Figure 22:
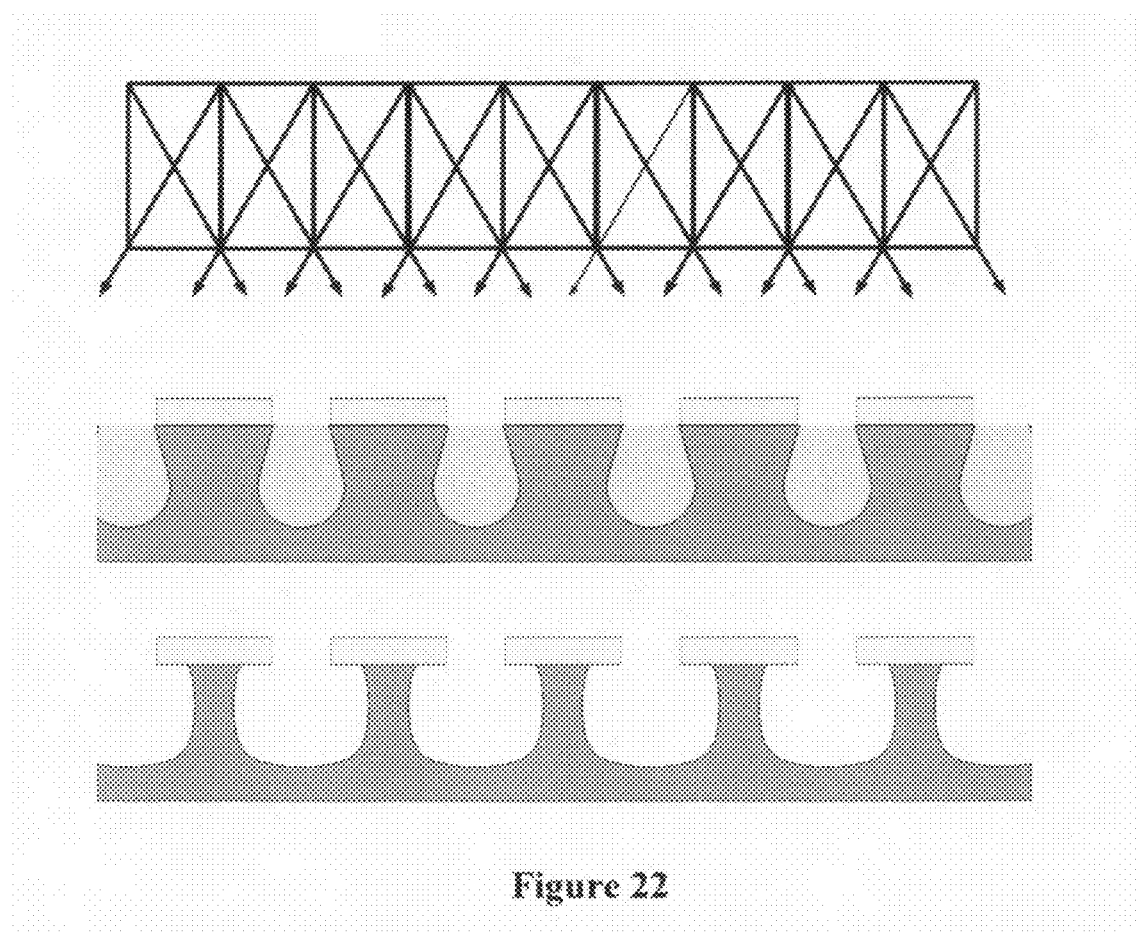
FIG. 22 illustrates a schematic view of a partially collimated light source exposure and development of an acrylic mold substrate according to an embodiment of the present invention.
Figure 23:
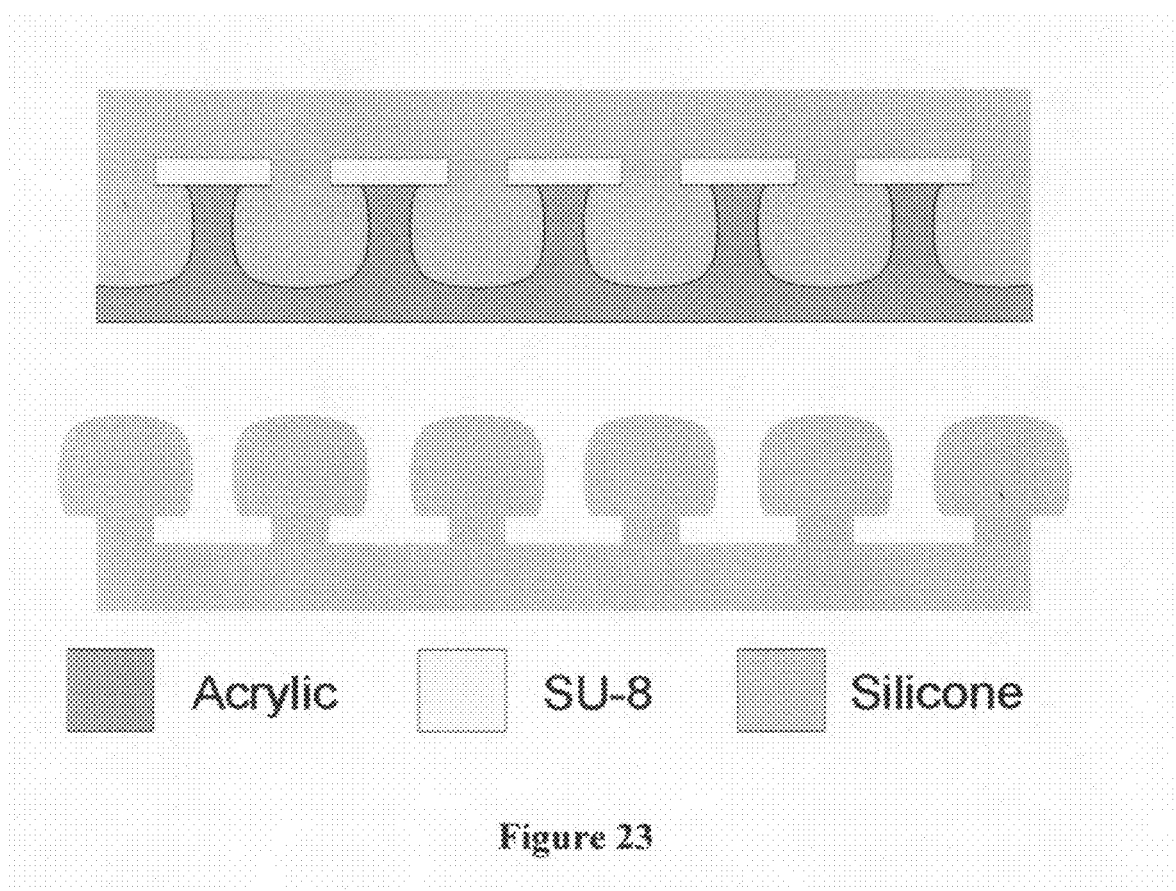
FIG. 23 illustrates a schematic view of a molding of a silicone negative mold according to an embodiment of the present invention.

In a further embodiment, a partially collimated exposure and/or light source may be used for producing molds comprising features such as relatively higher aspect ratio fibers, or alternatively to provide a more even and/or slower development rate of the mold substrate material, as illustrated in FIG. 15, in which the yellow features represent SU-8 material which forms caps, and blue features represent the mold substrate such as PMMA which forms the fibers or post features of the mold structure. A partially collimated light source exposure in a similar embodiment is also shown in FIG. 21, which further illustrates the exposed PMMA material margins between the posts and undercutting the SU-8 caps. FIGS. 22 and 23 respectively illustrate a partially collimated light source exposure of higher aspect ratio fibers in the PMMA substrate, and the production of a reverse mold of the structure in a flexible mold material, such as silicone, according to an embodiment of the present invention. Such silicone reverse mold as illustrated in FIG. 23 may then be used to cast a dry adhesive structure comprising the desired fiber (post) and cap features produced in the PMMA/SU-8 master mold according to an embodiment of the invention.

Figure 16:
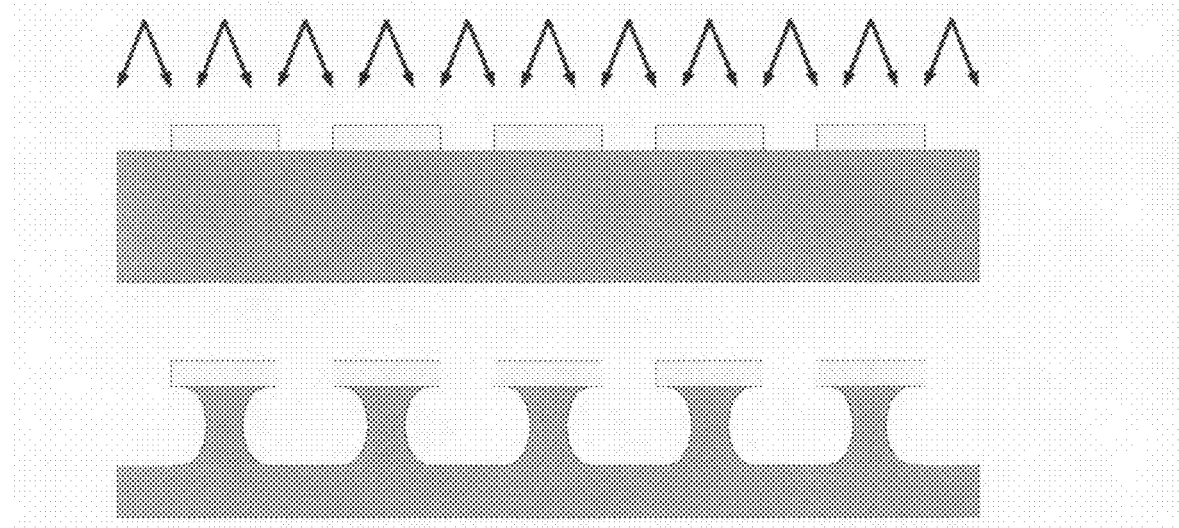
FIG. 16 illustrates a schematic view of an uncollimated light source exposure of an acrylic mold substrate according to an embodiment of the present invention.
Figure 24:
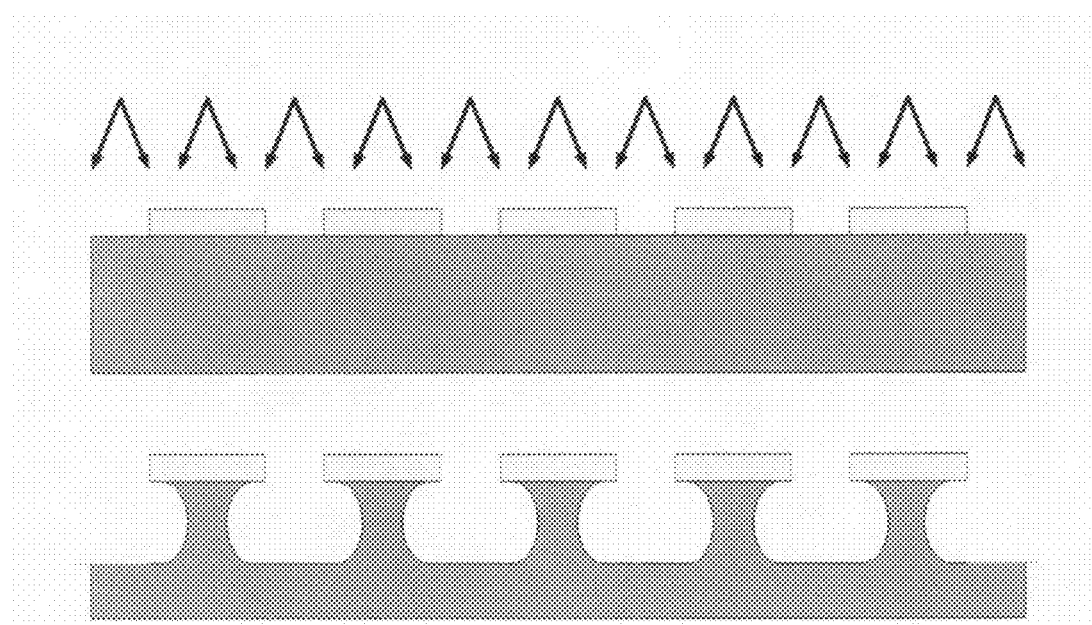
FIG. 24 illustrates a schematic view of an uncollimated light source exposure of an acrylic mold substrate with large fibers according to an embodiment of the present invention.

In another embodiment, a substantially uncollimated UV light source may be used to expose substantially low aspect ratio fiber features in the PMMA substrate, as illustrated in FIGS. 16 and 24, for example. In such embodiment, the uncollimated light exposure produces fibers with low aspect ratios of about 1:1 width to height under exposure, before the pillar may be undercut and the resulting fiber falling off during development. However, for embodiments where the PMMA substrate comprises substantially larger dimension fibers or posts such as about >20-30 um in diameter, such uncollimated exposure may comprise the easiest and fastest method of manufacturing. Such resulting dry adhesive structures may be desirably adapted for adhesion to relatively flat surfaces, for example.

Figure 17:
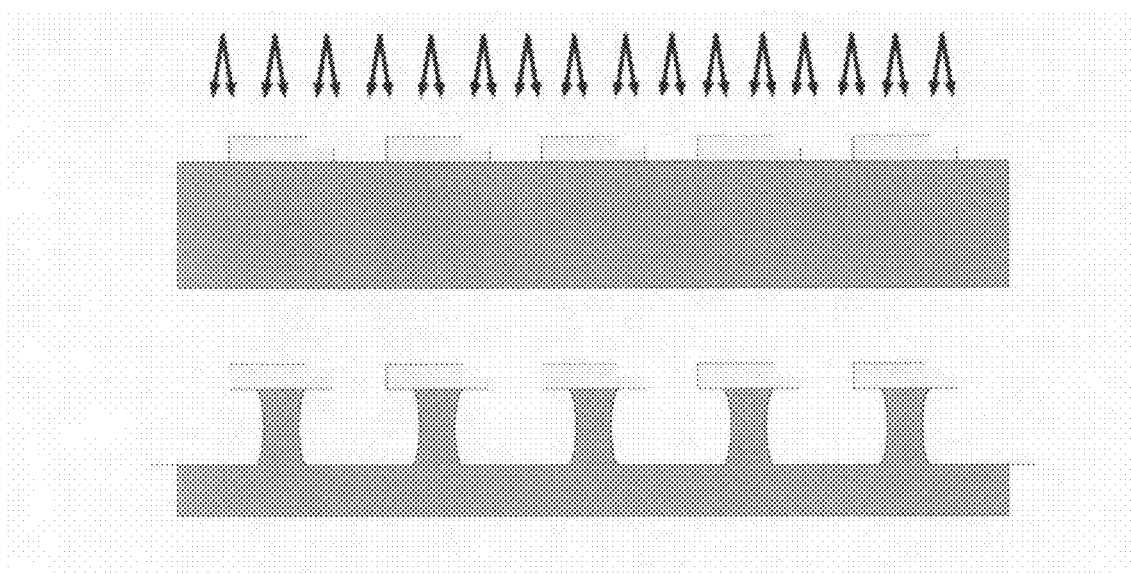
FIG. 17 illustrates a schematic view of an acrylic mold substrate with anisotropic caps according to an embodiment of the present invention.
Figure 25:
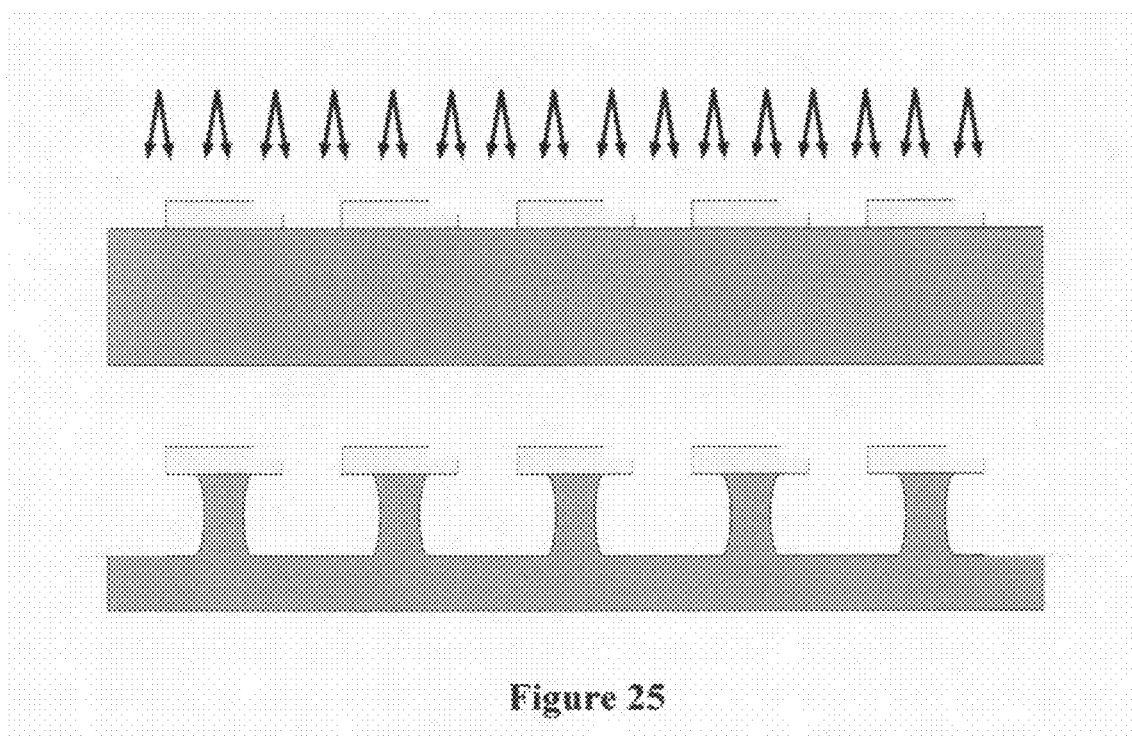
FIG. 25 illustrates a schematic view of a light source exposure of an acrylic mold substrate with directional caps according to an embodiment of the present invention.

In a further embodiment, SU-8 caps on the PMMA material may comprise two levels, or may have a small cavity in their upper surface, such as to produce a small defect in the same part of each cap on the fibers of the PMMA substrate after exposure and developing, as shown in FIGS. 17 and 25, for example. Such intentional cap defects may provide for fibers of the resulting dry adhesive structure that are vulnerable to peeling or losing adhesion in one direction, providing an anisotropic dry adhesive.

Figure 30:
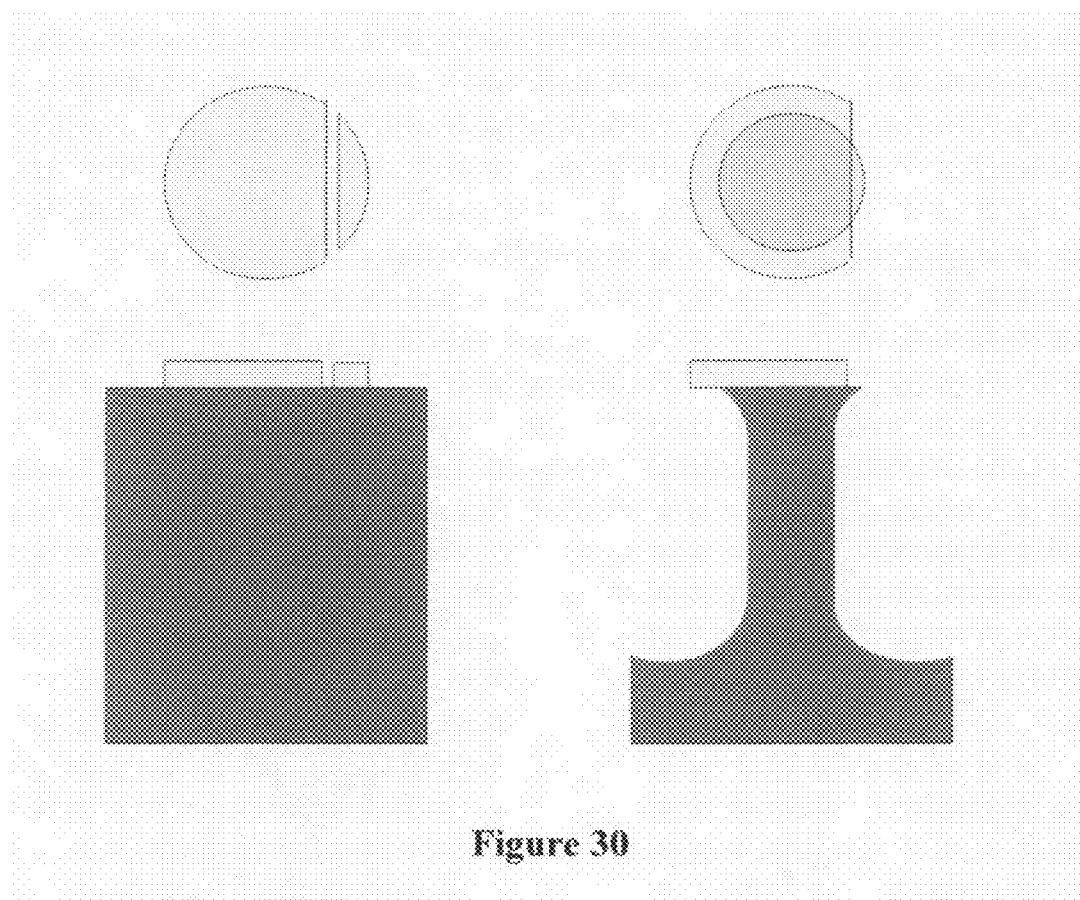
FIG. 30 illustrates top and side schematic views of a fiber of an acrylic mold substrate with a directional cap according to an embodiment of the present invention.
Figure 31:
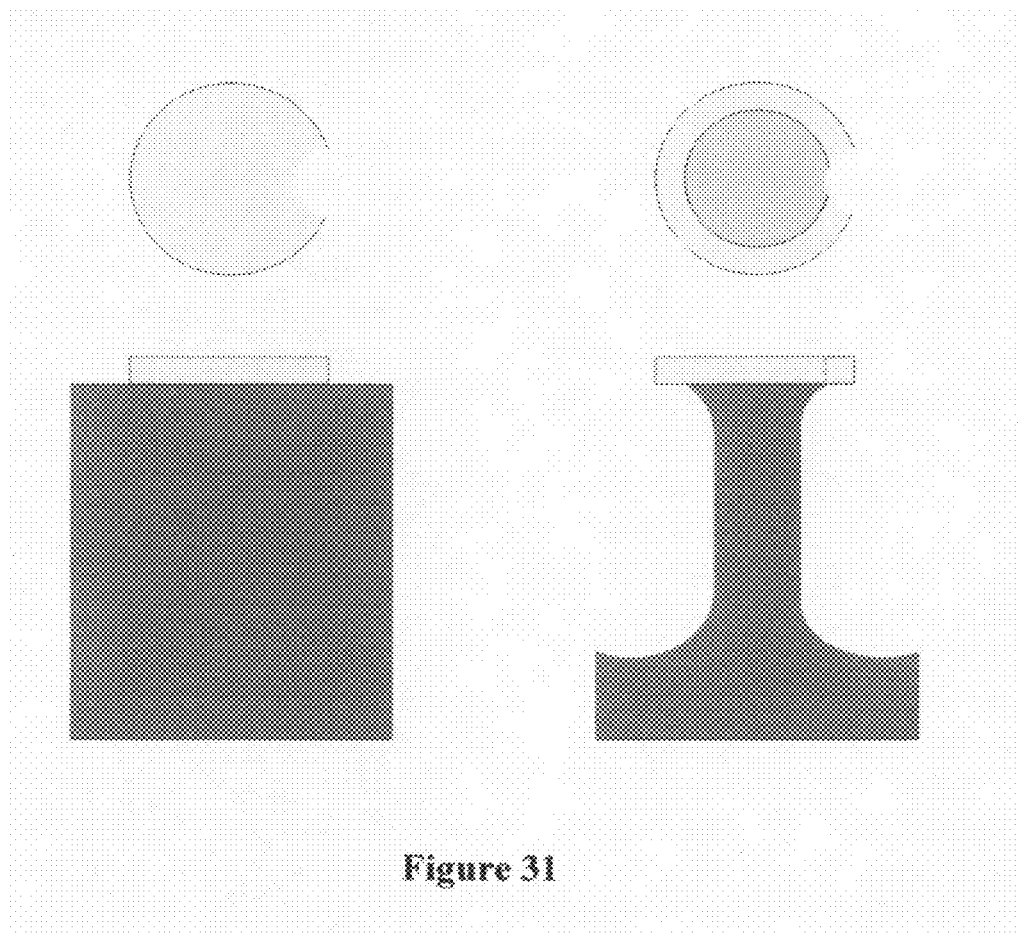
FIG. 31 illustrates top and side schematic views of a fiber of an acrylic mold substrate with a cap with divot according to an embodiment of the present invention.
Figure 32:
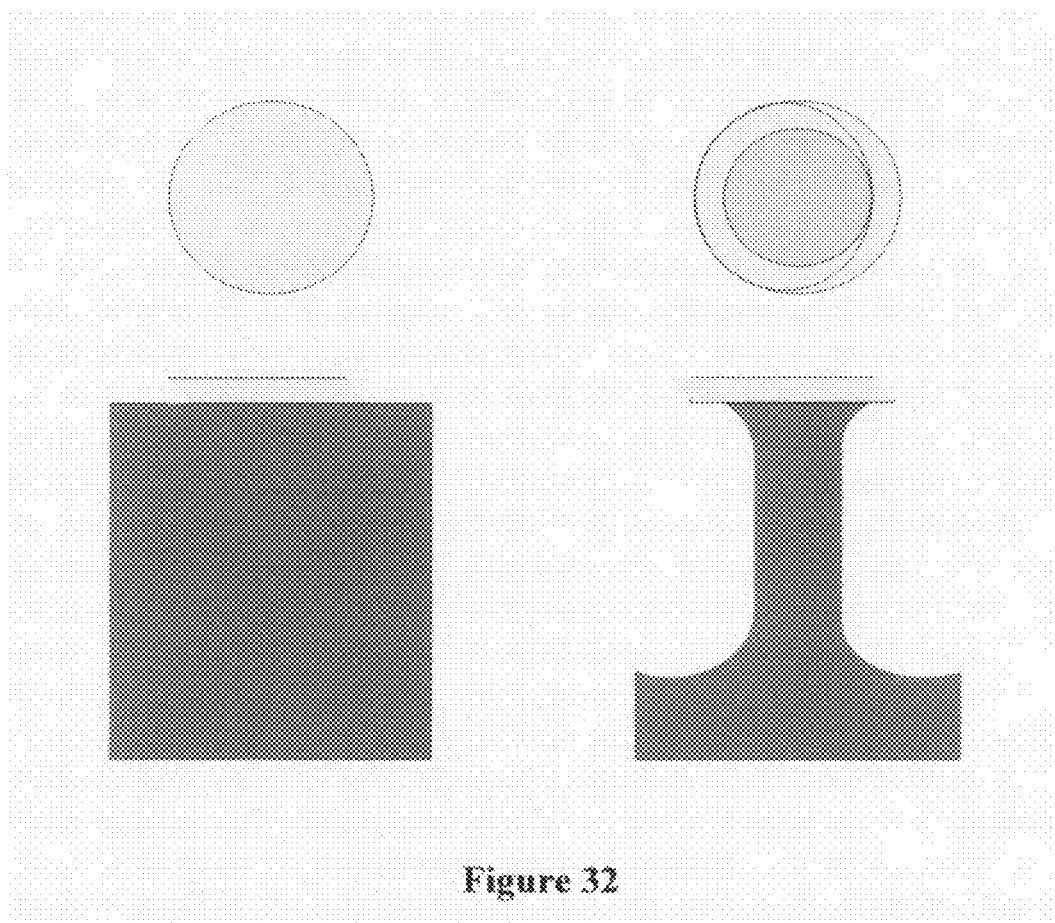
FIG. 32 illustrates top and side schematic views of a fiber of an acrylic mold substrate with a directional trapezoidal cap according to an embodiment of the present invention.
Figure 33:
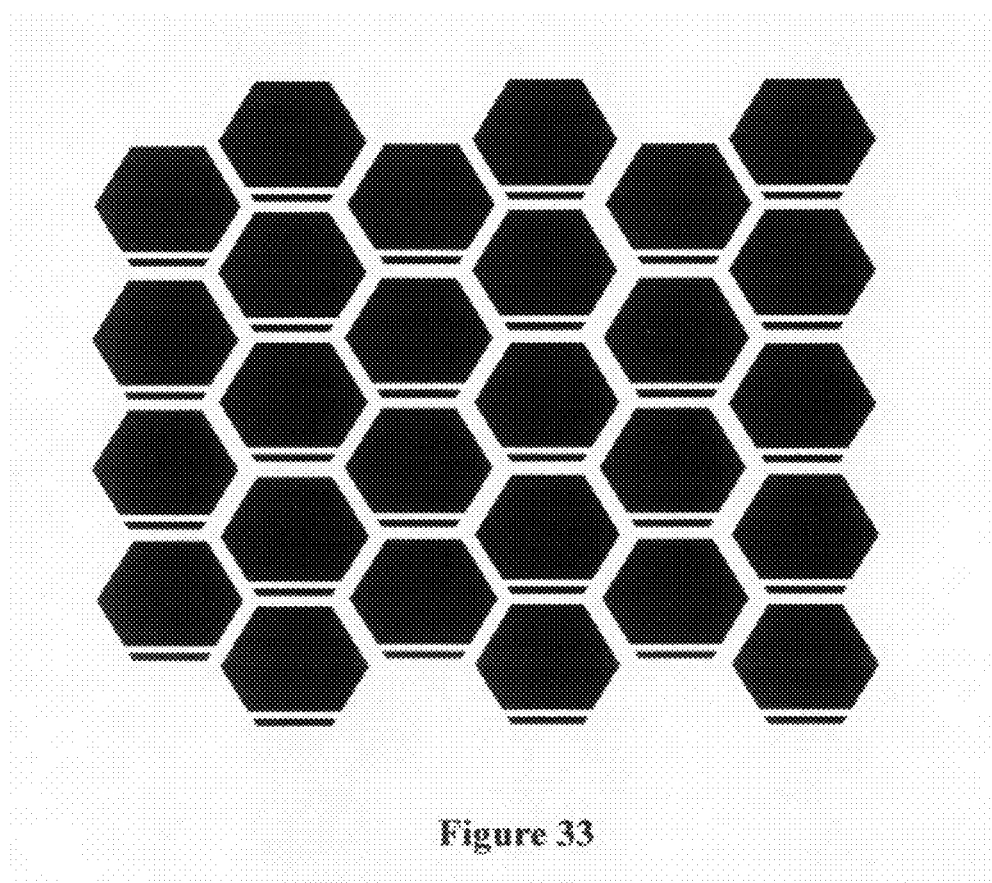
FIG. 33 illustrates a top schematic view of a portion of an acrylic mold substrate with directional hexagonal caps according to an embodiment of the present invention.

In another embodiment, a directional or anisotropic dry adhesive may be provided by providing single level SU-8 caps which comprise a linear gap across a portion of the cap, as illustrated in FIG. 30, for example, such that upon development of the PMMA mold, a consistent portion of the caps will fall off or will tear or otherwise fail during demolding, leaving an intentional truncated cap defect which results in a dry adhesive fiber prone to peeling in one direction. A further directional or anisotropic embodiment comprises providing single level SU-8 caps with a divot missing, to provide an intentional cap defect and result in a desired dry adhesive anisotropic peel characteristic, as illustrated in FIG. 31, for example. Yet a further directional or anisotropic embodiment comprises providing single level SU-8 caps with a trapezoidal cross-section, to provide an intentional cap defect and result in a desired dry adhesive anisotropic peel characteristic, as illustrated in FIG. 32, for example. Another directional or anisotropic embodiment comprises providing hexagonal shaped SU-8 caps with a linear cap defect, which may result in a desired dry adhesive anisotropic peel characteristic, as illustrated in FIG. 33, for example. Further such embodiments may comprise intentional cap defects in a single direction such as a shifted cap which overhangs only on one side of the fiber, or overhangs less on one side than the others, which may provide a consistent cap defect or lack of overhang resulting in a desired dry adhesive anisotropic peel characteristic.

Figure 18:
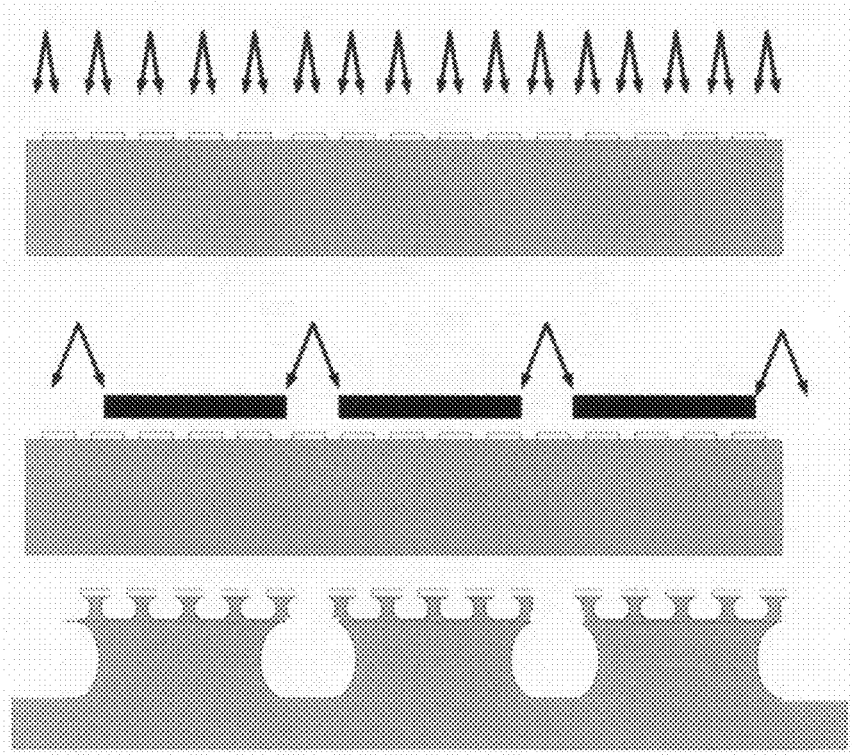
FIG. 18 illustrates a schematic view of a multi-level hierarchical acrylic mold substrate according to an embodiment of the present invention.
Figure 26:
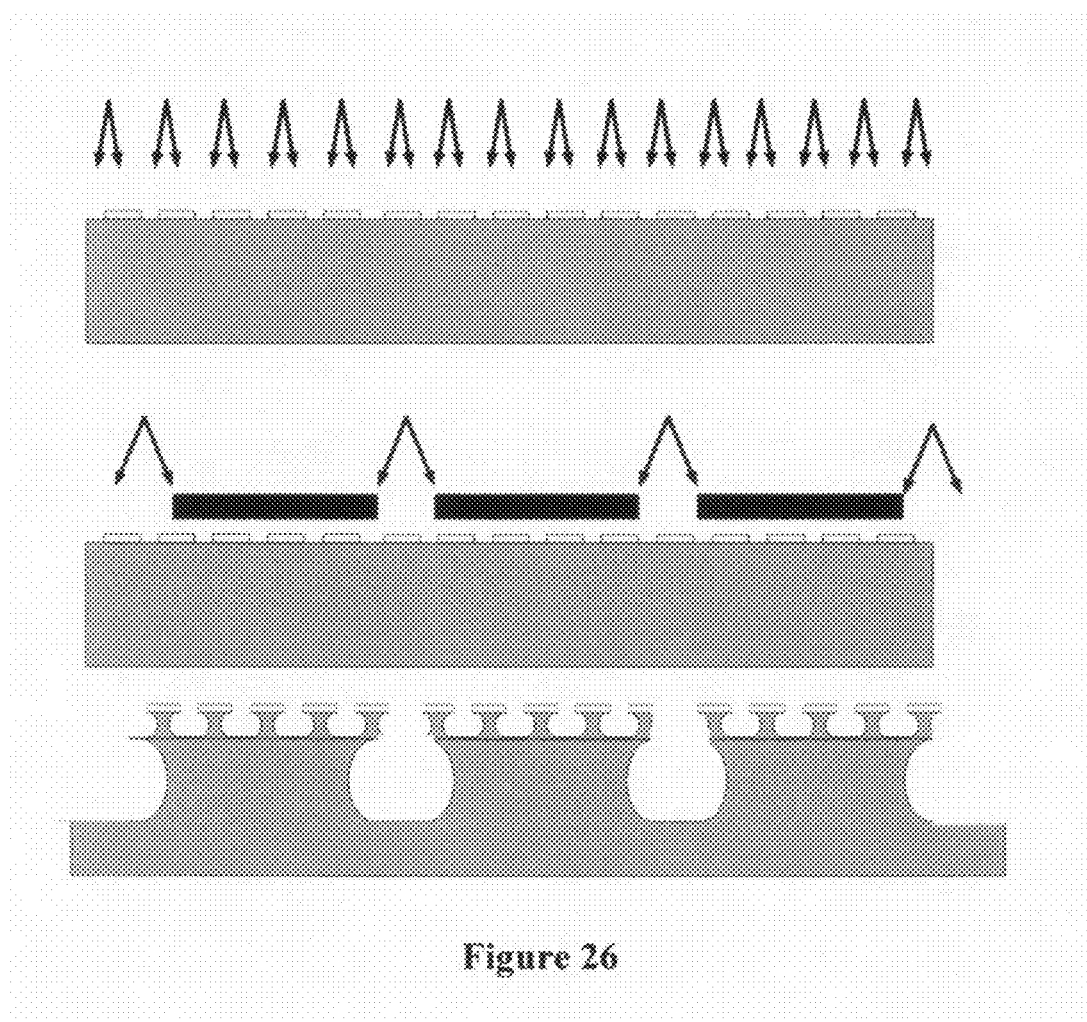
FIG. 26 illustrates a schematic view of a multistep light source exposure of an acrylic mold substrate with a multilevel hierarchical fiber structure according to an embodiment of the present invention.

In yet a further embodiment, a multi-level hierarchy may be provided in a PMMA substrate mold, to produce a resulting multi-level dry adhesive. A partially collimated UV light exposure may be used to define the small fibers in the upper level of the hierarchy, while a longer, uncollimated light exposure may be used to produce bigger pillars such as in the lower level of the hierarchy, as shown in FIGS. 18 and 26, for example. In such an embodiment, the mask used for the larger pillars in the lower hierarchy comprise any suitable material, such as a photoresist material, metal, or something as simple as dry erase marker ink directly on the PMMA/SU-8 material (water soluble ink may be preferable for easy removal), for example.

Figure 19:
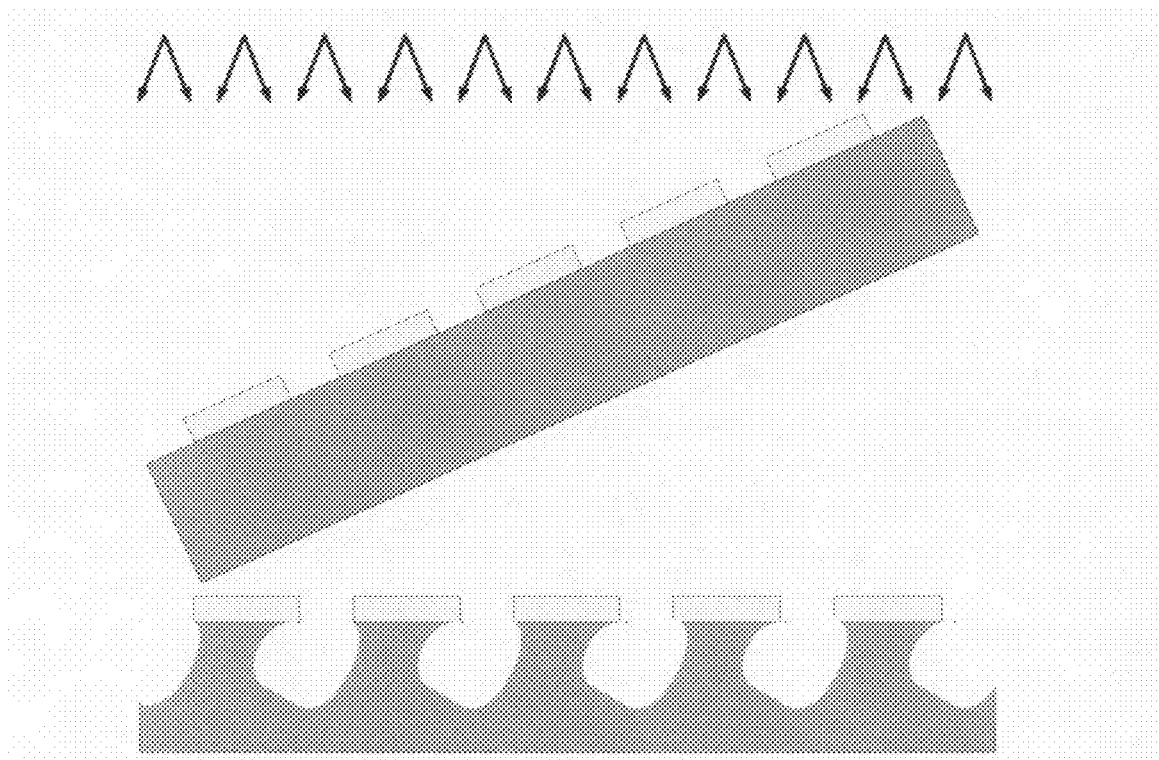
FIG. 19 illustrates a schematic view of an acrylic mold substrate with inclined fibers according to an embodiment of the present invention.
Figure 27:
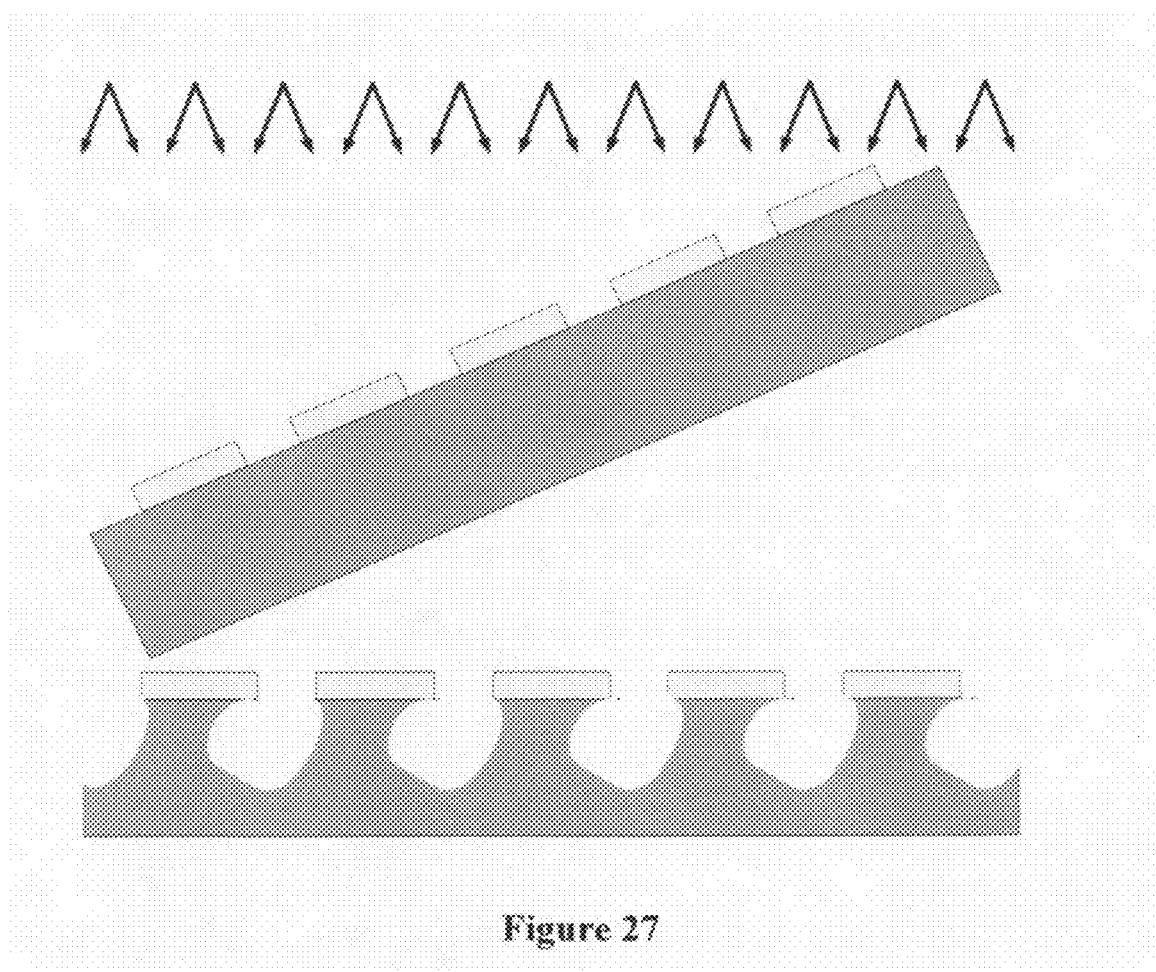
FIG. 27 illustrates a schematic view of an light source exposure of an acrylic mold substrate with inclined fibers according to an embodiment of the present invention.
Figure 34:
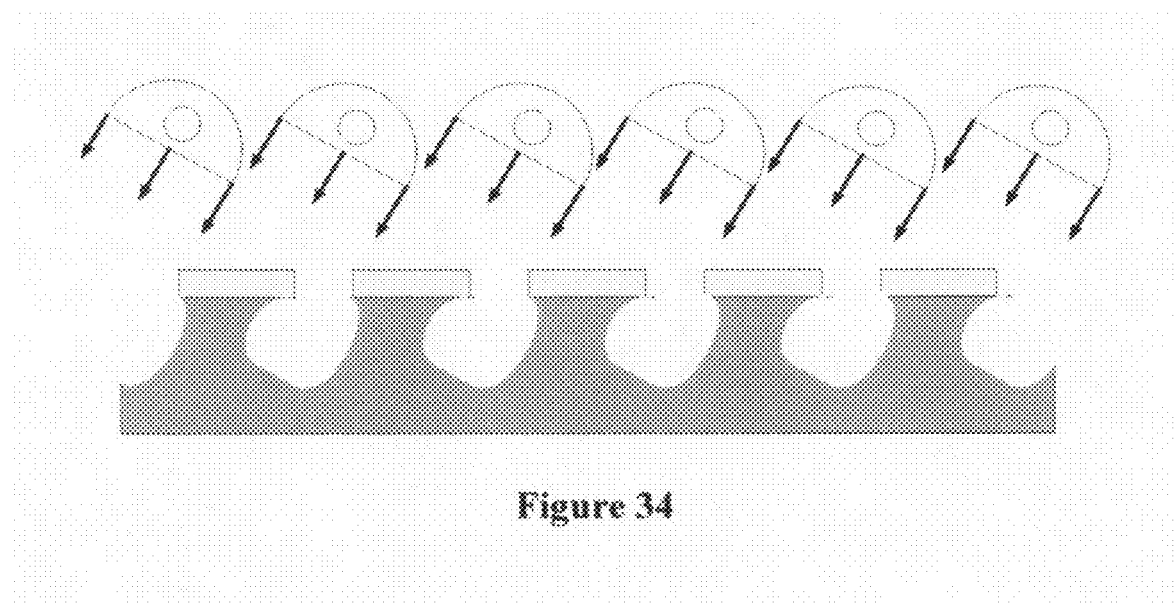
FIG. 34 illustrates a schematic view of a parabolic light source exposure of an acrylic mold substrate according to an embodiment of the present invention.
Figure 35:
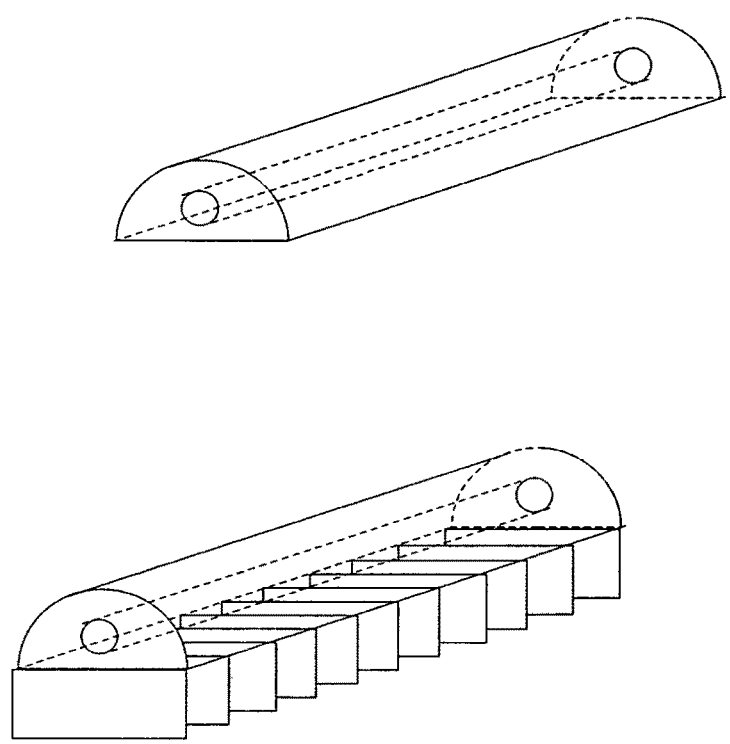
FIG. 35 illustrates schematic views of a parabolic light source reflector according to an embodiment of the present invention.

In another embodiment of the invention, an inclined exposure of UV light may be applied to the PMMA/SU-8 mold substrate such as by inclining the mold substrate with respect to the UV light source during exposure, as illustrated in FIGS. 19 and 27, for example. Such exposure may include collimated, partially collimated and/or un-collimated UV light, as may be desired. Such inclined exposure may desirably provide a feature where the cap is slightly offset relative to the center of its supporting fiber, as shown in FIGS. 19 and 27. Such arrangement of the inclined fiber may be desirable for relatively stiffer dry adhesive materials as the inclined fiber may provide greater flexibility to allow better conformance of the cap to a surface such as to provide improved adhesion, for example. In a further embodiment, an inclined exposure of light may be applied to the mold substrate by providing an inclined light source rather than inclining the substrate, as illustrated in FIG. 34. In one such embodiment, an inclined source of UV light may be provided by using substantially cylindrical parabolic light source reflectors which may be angled relative to the vertical to provide an inclined source of UV light. Two exemplary design of such cylindrical parabolic light source reflectors is illustrated in FIG. 35. In one design, the UV light source is collimated in one axis and uncollimated in the other. Such a design may desirably result in a dry adhesive structure with posts with substantially large overhanging caps, providing a strong adhesion peel strength in one axis, and small overhanging caps and a low adhesion peel strength in the orthogonal direction. Such a design may be desirably applied for dry adhesives having large posts where significant undercutting of the caps may occur. In the second design illustrated in FIG. 35, the parabolic reflector collimates light in one axis while a single axis anti-scatter grid under the reflector collimates light in the other axis to produce a higher intensity light than by using a two axis anti-scatter grid alone. Such a design may be desirably applied for dry adhesives having small fibers which may be better exposed using collimated UV light.

Figure 20:
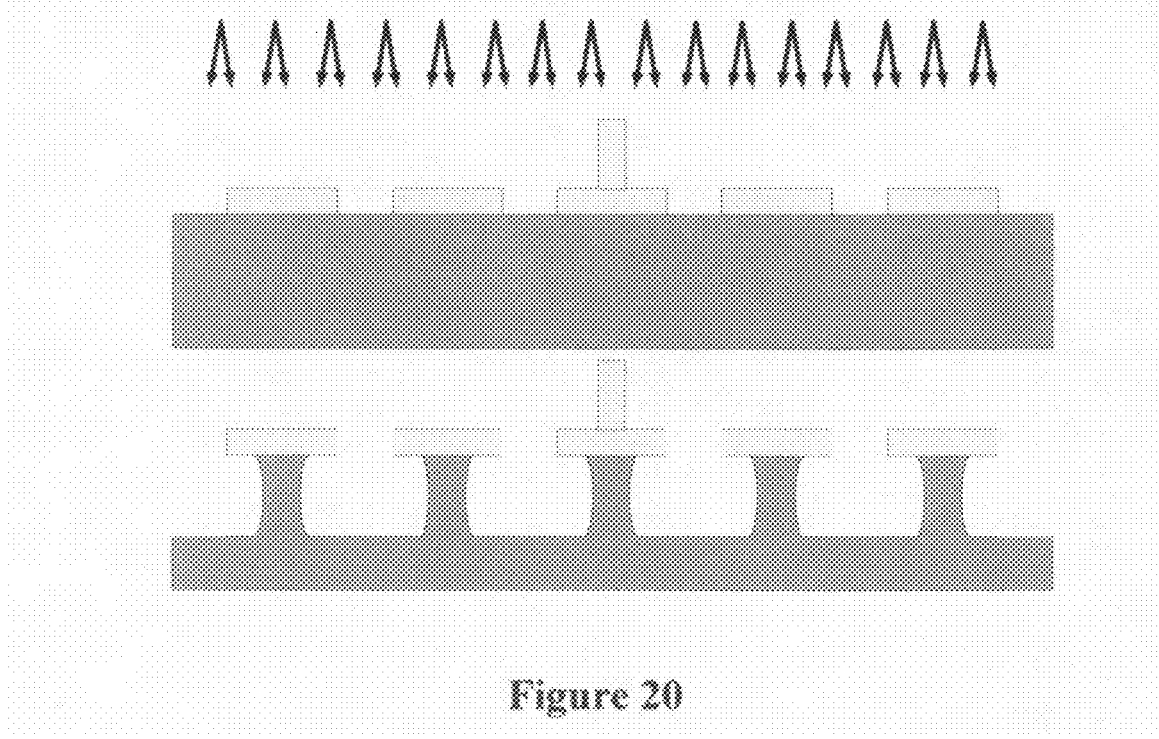
FIG. 20 illustrates a schematic view of an acrylic mold substrate with a thick cap according to an embodiment of the present invention.
Figure 28:
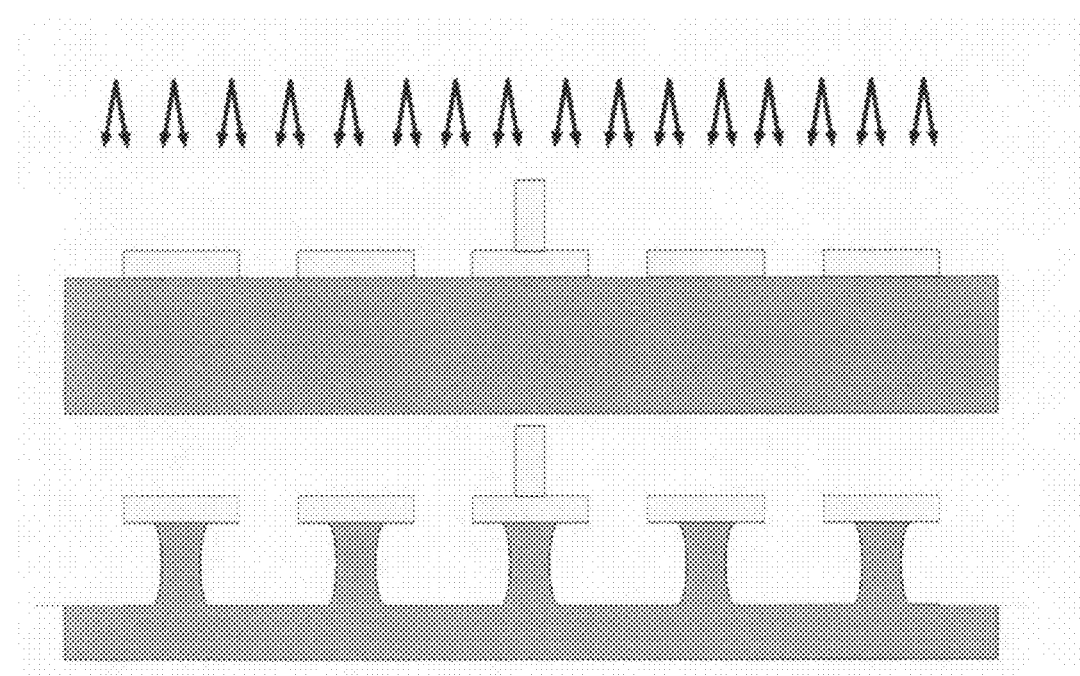
FIG. 28 illustrates a schematic view of a light source exposure of an acrylic mold substrate with a thick cap according to an embodiment of the present invention.

In one embodiment, one or more caps (and preferably a substantially evenly distributed portion of the caps) of a mold (and the resulting dry adhesive) may be made substantially thicker than the remaining caps, such as two or more times as thick as illustrated in FIGS. 20 and 28, for example. In such an embodiment, such thick caps may desirably prevent the dry adhesive from normally adhering to surfaces unless it is pressed against a surface with sufficient preload force so as to compress the fiber of the thicker caps, and bring the remaining caps into contact with the surface to adhere. In such an embodiment, the size, shape and density of the thicker "non-stick" fibers and caps may be varied to control the magnitude of preload force required in order to adhere the dry adhesive structure to a surface. In a similar alternative embodiment, alternatively, fibers without caps which are of similar height to capped fibers may be interspersed with the capped fibers in the mold and dry adhesive structure, such as to provide further resistance against adhesion of caps until a preload force is applied to press the caps into contact with the surface.

Figure 29:
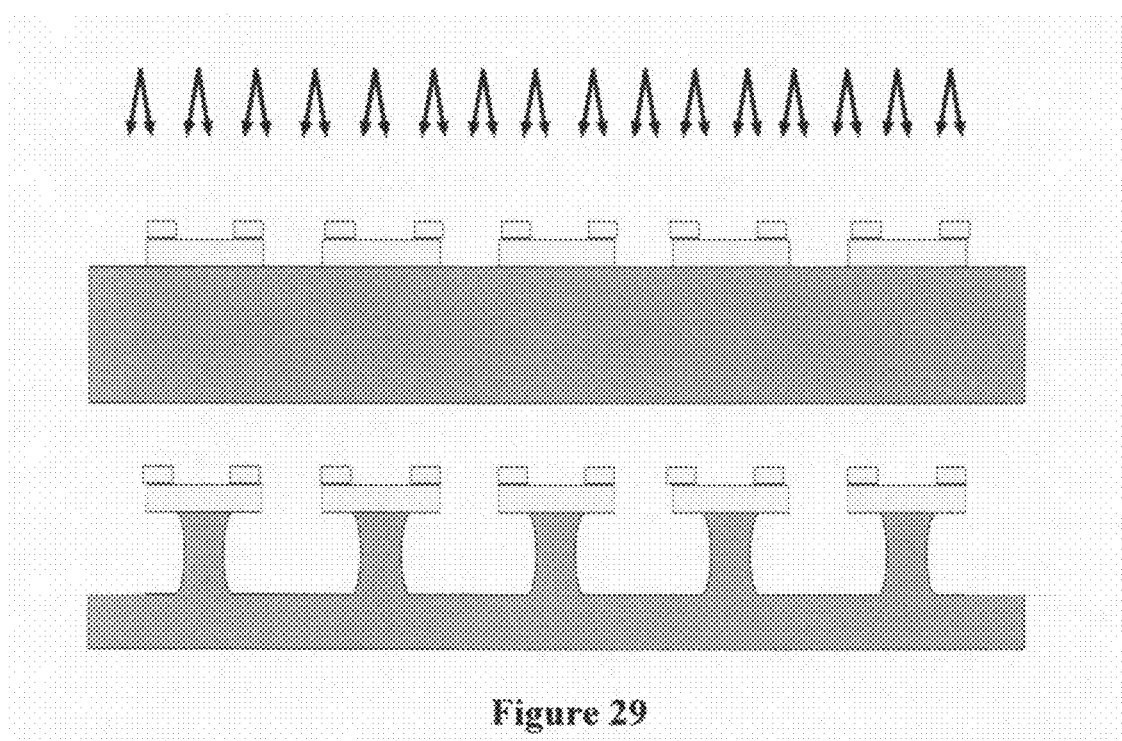
FIG. 29 illustrates a schematic view of a light source exposure of an acrylic mold substrate with suction cup shaped caps according to an embodiment of the present invention.

In another embodiment, one or more, or substantially all of the caps may be provided with an elevated rim around the cap, to provide a "suction-cup" shape to the SU-8 caps, as shown in FIG. 29. Such design may optionally provide another dry adhesive variant which requires the application of a preload force in order to adhere to a surface such as by pressing the central portion of the cap into contact with the surface, for example. In an optional embodiment, such "suction-cup"

design may also provide additional adhesion strength due to the effect of suction, or may optionally be modified such as having another substance placed or attached in the "suction-cup" center of the cap, such as a soft gel, oil, or tacky material such as to provide additional adhesion properties.

Figure 36:
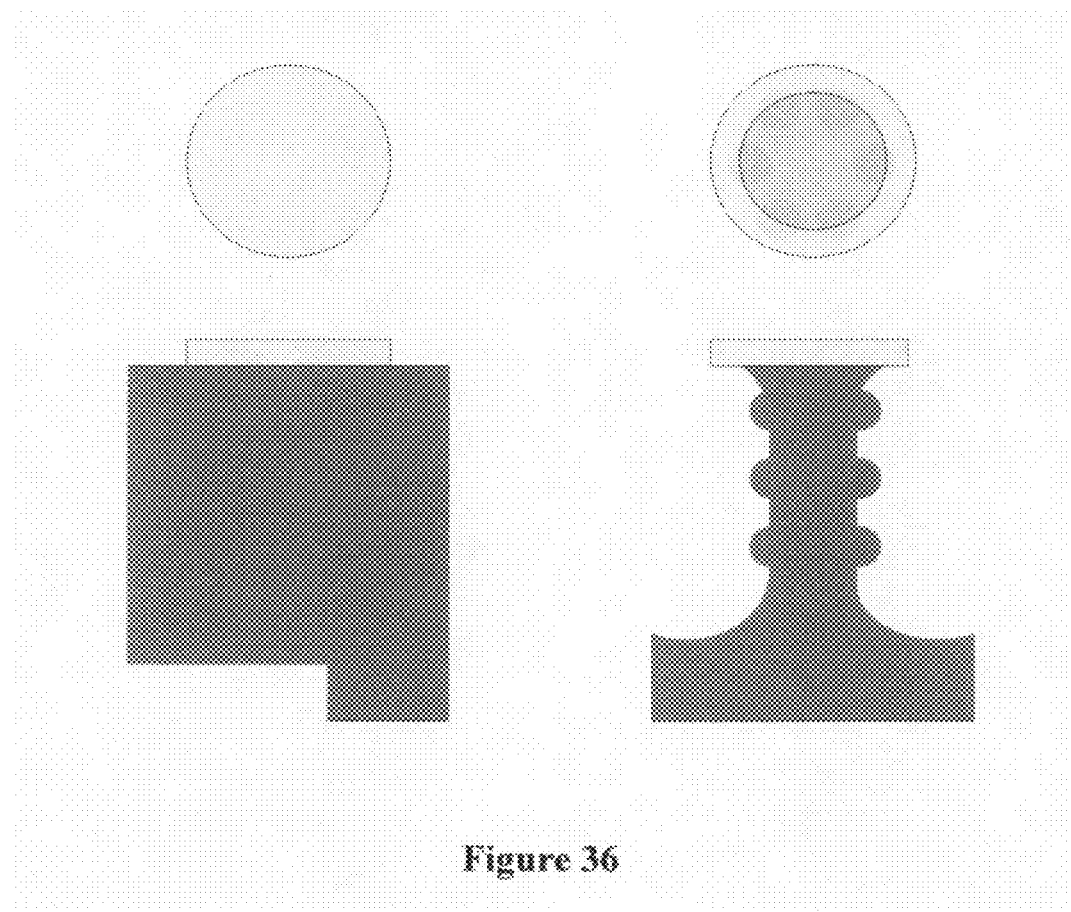
FIG. 36 illustrates top and side schematic views of a superhydrophobic fiber of an acrylic mold substrate according to an embodiment of the present invention.

In a further embodiment, such as for applications in environments where contamination with liquids such as water may occur, a superhydrophobic dry adhesive structure may be provided by using a fiber comprising one or more protrusions along its length, as illustrated in FIG. 36, for example. Such design may further desirably provide for resistance against fiber collapse such as by strengthening the fiber, and/or by reducing the potential for fibers to adhere to one another following collapse, which may provide more rapid recovery of collapsed fibers.

In another embodiment, a non-directional dry adhesive structure is provided with a cap shape that has a ratio of overhang to tip thickness sufficient to both preload the entire supporting fiber and distribute the load close to but not entirely to the perimeter of the cap when pulled off of a surface. This tip shape may desirably result in the maximum possible adhesion pressure and the lowest probability of encountering a defect on the tip (defined as an area that is not in contact with another surface) that reduces the adhesion significantly from the theoretical maximum. For low modulus dry adhesive materials, this cap shape may desirably be bounded by a ratio of approximately 1:1 for thickness to overhang, and with a maximum overhang for the material to spontaneously recover if the cap is folded into contact with the underlying fiber, or in contact with the top of the cap. The exact optimal dimension for this desired force condition to be achieved may be defined by the modulus of the material and its surface energy. Higher modulus and lower surface energy adhesive materials may have a smaller ratio of overhang to thickness for optimal dimensions. Every scale of fiber from nano/micro/macro scale may desirably have a shape that is optimal for both preloading the fiber and minimizing vulnerability to peeling that may be determined according to the stiffness/adhesion properties of the material.

In another embodiment, a dry adhesive material that is a composite with individual stiff particles larger than the minimum tip dimensions of an individual fiber may be used to produce a dry adhesive structure. This may desirably stiffen the fiber stalk and bulk material, yet keep the stiff particles embedded within the fiber away from the tip where they may negatively affect adhesion. In a further embodiment, a dry adhesive structure may be produced using a material to produce dry adhesive fibers where the material modulus at the fiber tip is significantly less than those of the underlying bulk material and remaining length of the fiber. Specifically a variation of this design may be provided where only the top surface of the cap is of a lower modulus material than the bulk material. Such a dry adhesive structure may desirably allow fibrillar surfaces to adhere better to lower modulus surfaces and materials such as skin, or organs, for example. One potential application of such an embodiment may be for use as an effective bandage material, for example, whereby unlike standard dry adhesives, such a material may be used only once but may still have the benefits of contact splitting and providing air access to the underlying skin/flesh such as for more rapid healing.

In another embodiment, a dry adhesive structure may be provided which comprises an adhesive material with at least one integrated smart material which may be adapted to alter one or more of the mechanical stiffness, surface energy, viscoelasticity or geometry of the dry adhesive structure during use to desirably increase or reduce adhesion properties. Such incorporated smart materials may desirably provide for control of the adhesion properties of dry adhesive structure such as by varying temperature, magnetic or electric fields, electrical current, pneumatic or hydraulic pressure, or other control means. Alternatively, in a further embodiment, the mold used to cast the dry adhesive structure may be modified such as by electrically charging the mold to impart a permanent electrostatic charge on cast adhesive materials to help bring individual fibers into contact with a surface. Similarly, in another embodiment, a mold may be provided in which the curing of the cast dry adhesive material may be selectively inhibited, such as by use of an inhibiting agent which may reduce the crosslinking density of the cured adhesive material at the tops/caps of fibers, as may be desirable to provide a tacky adhesion surface of the dry adhesive structure without affecting the quality and/or strength of the bulk adhesive material, for example.

Direct Molding Embodiment for Dry Adhesive Structures with Anisotropic Peel Strength The following several embodiments of the present invention relate to the direct molding of dry adhesive structures on a photoresist mold, and to dry adhesive structures exhibiting anisotropic peel strengths which may be manufactured by such direct molding methods.

The structural material used to produce dry adhesives according to several embodiments of the present invention as described below is Sylgard® 184 silicone from Dow Chemical which is a platinum catalyzed silicone that has been used in a wide variety of MEMS applications. To produce the mold for direct molding of this silicone, a two level photoresist stack was used, based on an undercutting layer of polymethylglutarimide (PMGI) such as available from Microchem, and AZ 9260 photoresist. Both materials are positive acting photoresists, although the PMGI is insensitive to i-line (365 nm) exposures. AZ 400K developer diluted 1:4 in water was primarily used for developing the AZ 9260, followed by MF-319 developer to produce the desired undercut in PMGI. These photoresist materials may be desirably used because they are compatible with one another, easily spin coated in a variety of thicknesses, and most importantly, neither significantly inhibit the cure of the Sylgard® 184 when it is molded in the photoresist mold. Additionally, the PMGI can have its dissolution rate altered by exposing it to 254 nm light, allowing an undercut size and shape to be well defined using lift-off processing techniques. In an embodiment of the present invention, patterned areas are exposed to define general undercut shape and location in the PMGI and may be used to define the undercut shape and location independently of the shape or size of the photoresist holes. A diagram showing the basic fabrication procedure is shown in FIG. 37.

A general fabrication process according to an embodiment of the present invention allows a very large number of variations for PMGI and photoresist thickness, which in turn require fine-tuning of process parameters. The following is a description of a manufacturing process according to an embodiment of the present invention, which may be used to produce an exemplary anisotropic dry adhesive according to another embodiment of the invention, whose behavior is detailed in the later sections:

1. A 4" silicon wafer is coated with a bi-layer of chrome/gold such as by using a Corona Vacuum Systems sputterer. The gold may prevent silicone adhesion to the substrate, but PMGI adheres well to it. In another alternative embodiment, another metal or coating other than chrome/gold and which is suitable to reduce silicone adhesion to the substrate may be used.

2. A suitable PMGI material, such as PMGI SF slow series 19 (such as may be purchased from Microchem) may be diluted 1:1 by weight in PMGI thinner. The combined mixture may be spun on the wafer (such as to form a PMGI material thickness of about 1-2 μm). In one embodiment, the mixture may be spun onto the wafer at 900 rpm for 30 seconds, and then followed by a 1 minute softbake at 100° C. and a 3 minute hardbake at 190° C. on a hotplate, for example. In one such embodiment, the resulting final PMGI thickness may desirably be approximately 1.5 μm.
3. A thin layer of S1813 photoresist may be spun on the PMGI layer, such as at 3000 rpm for 30 seconds, followed by baking such as for one minute at 100° C. Following spin coating, the photoresist layer may then be exposed to any suitable features that define the cap size and shape for the desired dry adhesives. It may then be developed such as for 30 seconds in MF-319 to produce a mask for subsequent 254 nm exposure.
4. The wafer may be exposed to 254 nm light (such as from a Stratalinker 2400 light source), and with a suitable exposure such as a dose of 0.5 J. Afterwards, the photoresist may be stripped in acetone, and the wafer may be dried off.
5. AZ 9260 or another suitable photoresist material may then be spun onto the wafer, such as at 3000 rpm for 30 seconds, and left to sit such as for at least 5 minutes to relax the film. After relaxing, the wafer may be baked such as at 100° C. for 90 seconds on a hotplate. The total resulting thickness may be approximately 10.5 μm on average.
6. The wafer may be rehydrated for 30 minutes such as in de-ionized water. This may be desirable for complete development of the AZ9260 photoresist.
7. The wafer may be dried off such as in $N_2$ gas, and then exposed to i-line UV light, such as for 50 seconds at a nominal power of 23 mW/cm$^2$.
8. Development of the wafer may be completed by immersing it in AZ 400K developer diluted 1:4 with deionized water such as for 6 minutes at 18° C. ambient temperature, followed by a rinse, such as in de-ionized water and a transfer to MF-319 developer for 3 minutes.
9. After the desired undercut is formed, the wafer may be rinsed again in de-ionized water, followed by an $N_2$ dry. The mold may be left at least 1 hour before PDMS may be used for molding.
10. Sylgard® 184 may be mixed at a ratio of 10:1 prepolymer to catalyst, and degassed such as for 30 minutes under vacuum. Afterwards, it may be poured on the photoresist mold and spun on slowly such as until the PDMS is spread to the edge of the wafer. The mold may then be degassed such as for 1 hour under vacuum.
11. Curing of PDMS may be done such as for at least 12 hours at 50° C., followed by demolding. After the PDMS is demolded, a post-cure bake such as at 120° C. for 60 minutes may be used to increase the strength of the PDMS before adhesion tests.

Careful alignment of the two photoresist layers is desirably achieved for fabrication according to the methods of the present invention. PMGI is nearly transparent, and exposed features are not typically visible under high magnification on the aligner. Although it is possible to have previously patterned alignment markers such as in the Au/Cr layer, which has been used in earlier work with transparent structural layers according to one embodiment, in another embodiment an alternative solution may be to leave the wafer in MF-319 developer a little longer than 30 seconds when patterning the thin photoresist prior to 254 nm exposure. In such embodiment, the small developed depth of the PMGI (~50-100 nm) may then visible under the AZ 9260 photoresist for future alignment to features. Because the strength of the adhesive is so dependent on the exact placement of the caps, the collimation of the aligner is a significant factor in achieving a large field of adhesives with equal properties using the fabrication methods and technologies according to the present invention. If collimation is not good, high aspect ratio features may be radially misaligned and adhesive properties may be consistent over a much smaller portion of the wafer. Once fabricated, the mold can be used multiple times. If alignment is not acceptable, the mold may be stripped in acetone and MF-319 and the wafer may be reused as necessary.

Several Embodiments with Varied Geometries

Figure 38A:
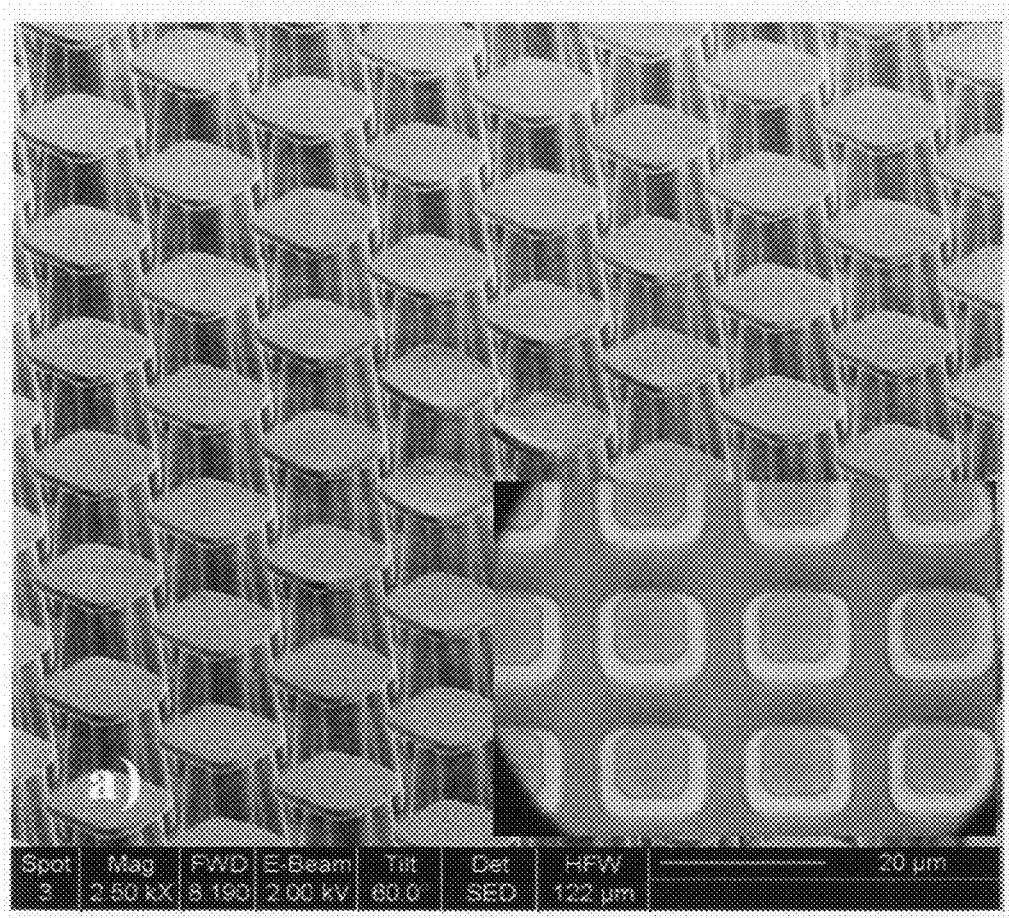
FIG. 38 illustrates SEM images of dry adhesive structures with offset caps according to an embodiment of the present invention.
Figure 38B:
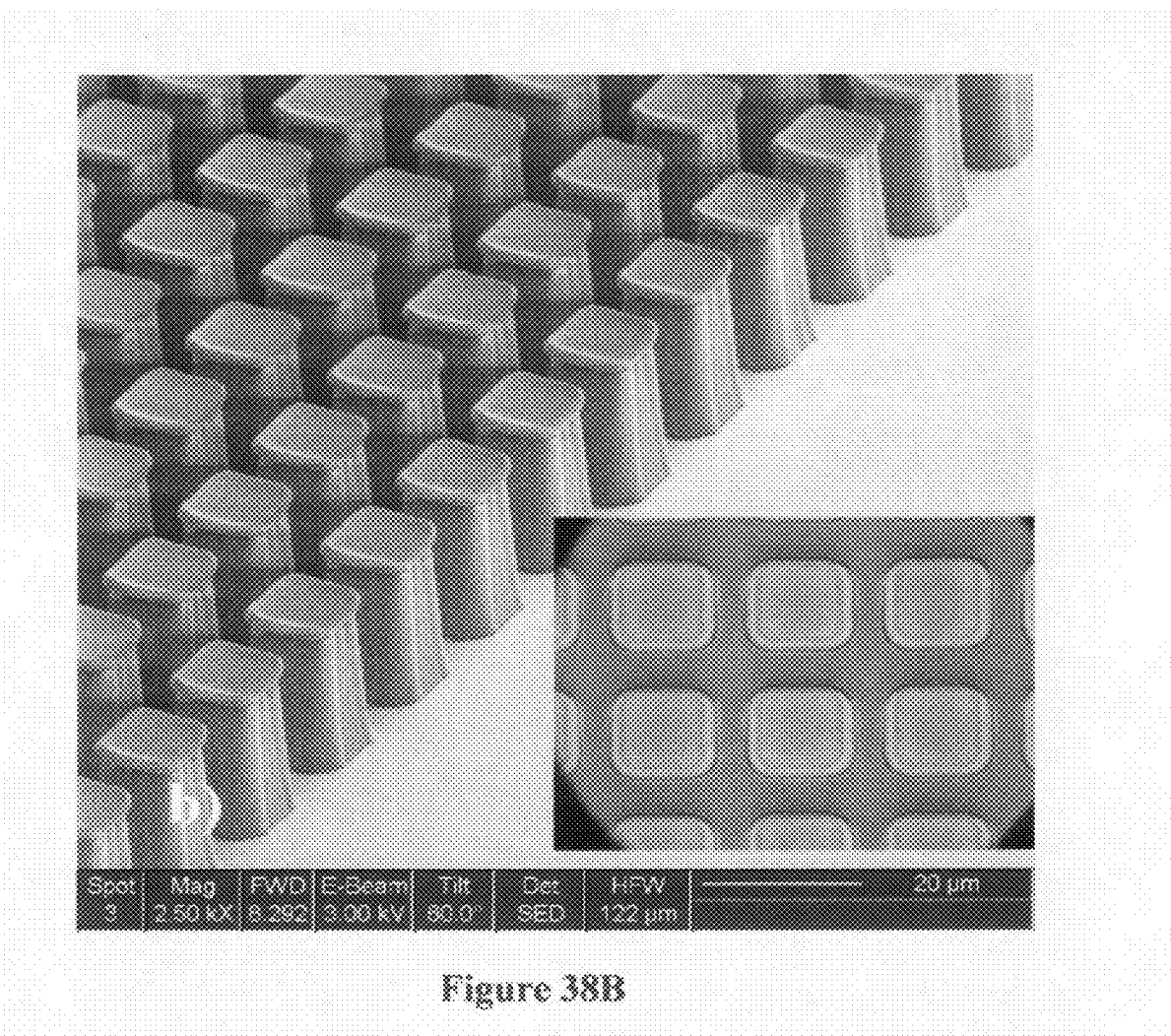
Figure 39:
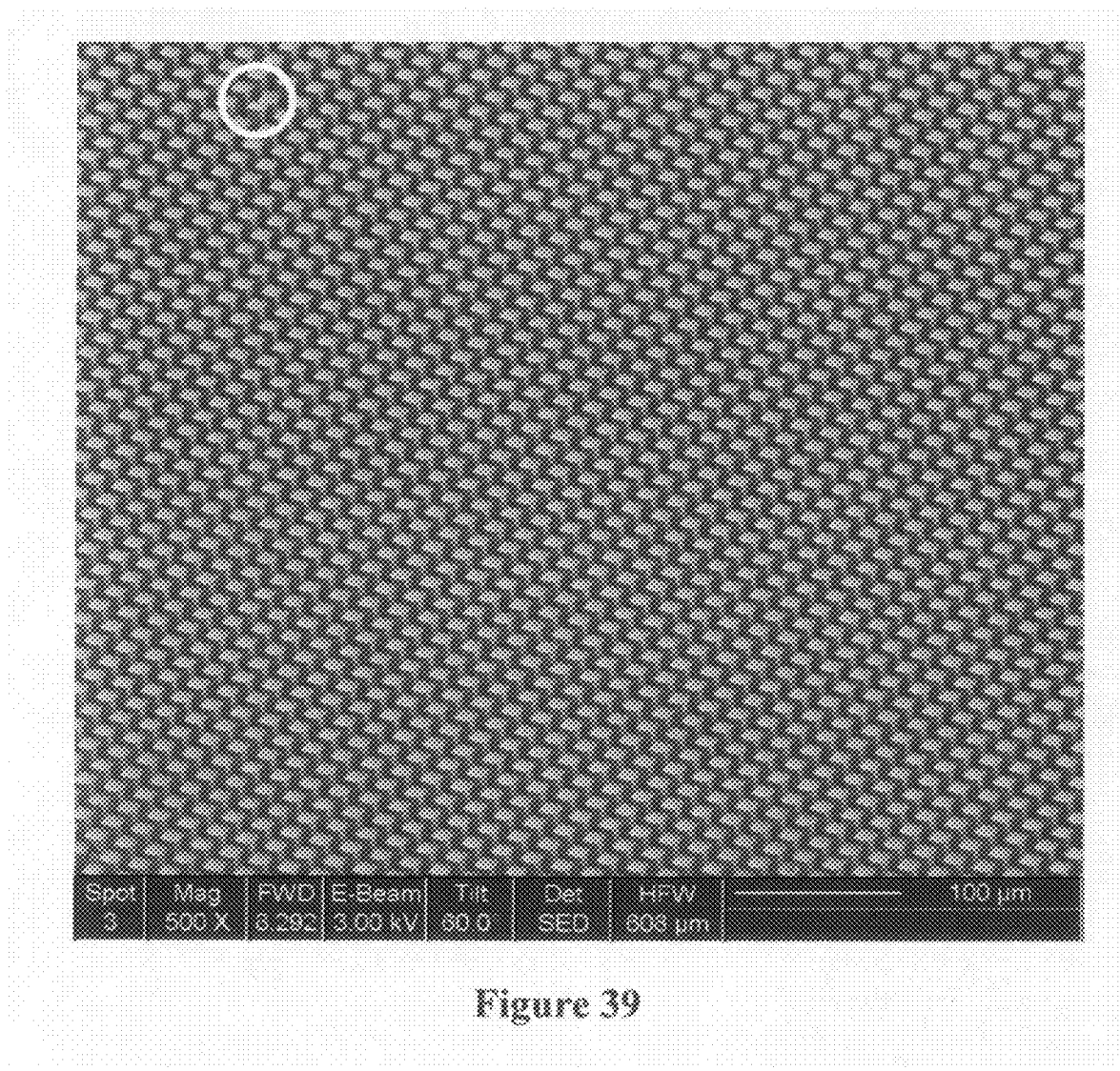
FIG. 39 illustrates an SEM image of an anisotropic dry adhesive structure according to an embodiment of the present invention.

To test a wider variety of anisotropic dry adhesive geometry variations, the two masks according to embodiments of the invention were produced using either square or rectangular geometries. The primary purpose of this geometry was to ensure that one side would have a very long interface with minimal cap overhang to maximize the differences between adhesion when loading in different directions. Additionally, the cap geometry was rectangular, while the post geometry was set as a square, so that selective misalignments in different directions would result in a much larger range of potential fiber geometries than simply two circles. Another potential benefit to the square post designs is that fill factors of the adhesives can be much higher than for circular posts which should increase the total adhesion. Although there may be an increased likelihood of fiber collapse while using square fibers, earlier theoretical work has indicated that there would be negligible benefits for using a circular fiber rather than a rectangular fiber with equal cross-sectional dimensions. Although the structures fabricated in this work had 10 μm fiber heights, the mold thickness may be increased for other variations. FIG. 38 shows optical and SEM images of 20 μm tall fibers with equal cap size but different post dimensions that were fabricated on the same wafer, according to an embodiment of the invention. The cap size, and top post dimensions may be found from the optical images such as by using an optical micrometer (an Olympus OSM-D4 for example). In both these variations one side has a relatively smaller and preferably substantially no overhang which provides a large perimeter that is vulnerable to peeling. Demolding of the fibers shown in FIG. 38a may preferably be done starting from the side with the largest overhang to prevent cap tearing. When cured properly, these post designs may preferably show substantially no incidence of collapse at aspect ratios up to about 2:1, as shown in FIG. 39 according to another embodiment.

Testing of Several Embodiments

To test the peel strengths of the anisotropic dry adhesives according to an embodiment of the invention, we used a test system based on the Kendall model of peeling (as expressed in the reference by K. Kendall: "Thin-film peeling—the elastic term," *Journal of Physics D, Applied Physics*, vol. 8, 1975), which allows us to determine how strong the adhesive force of the anisotropic dry adhesive structure is when loaded in multiple orientations.

Figure 40A:
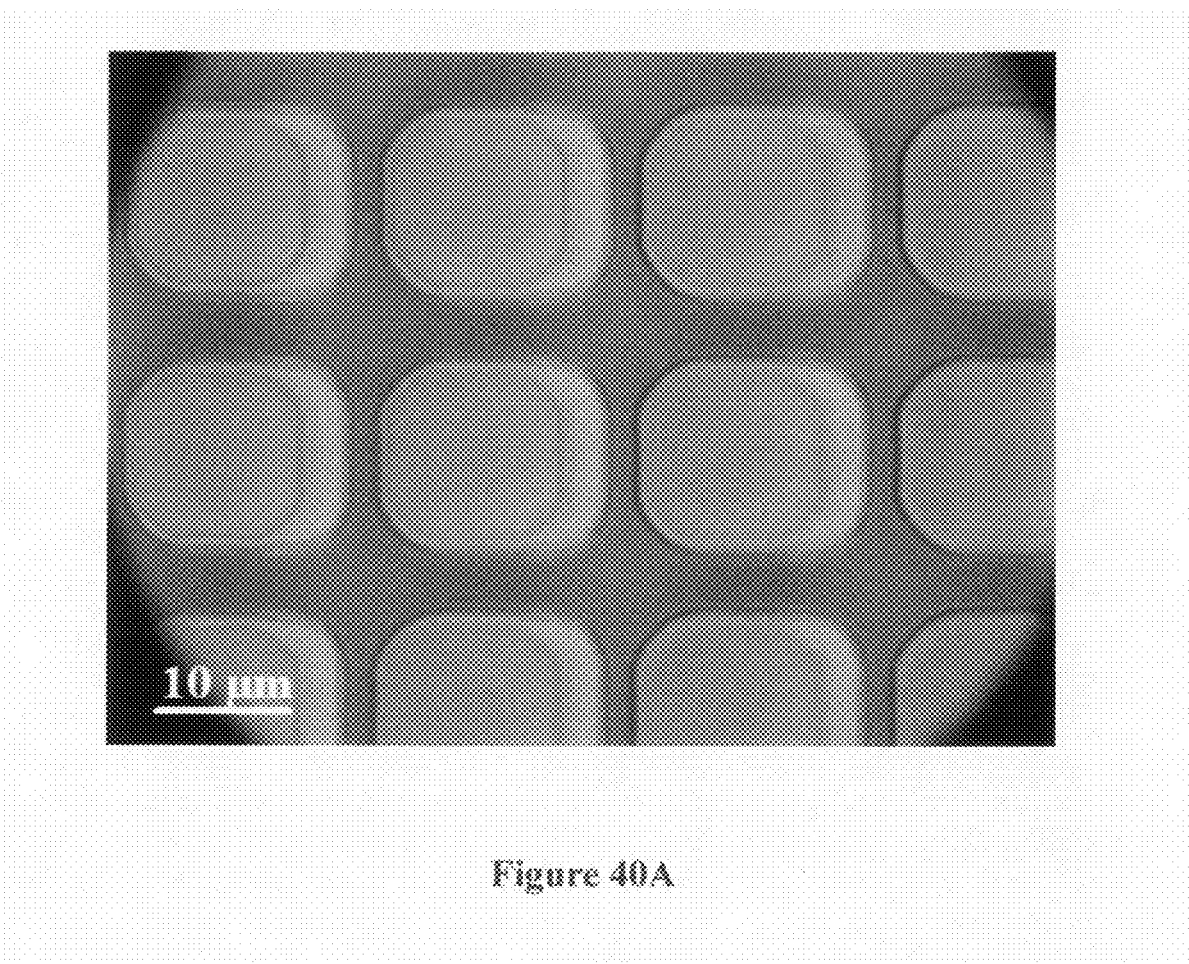
FIG. 40 illustrates an optical microscope image and schematic image of an anisotropic dry adhesive structure according to an embodiment of the present invention.
Figure 40B:
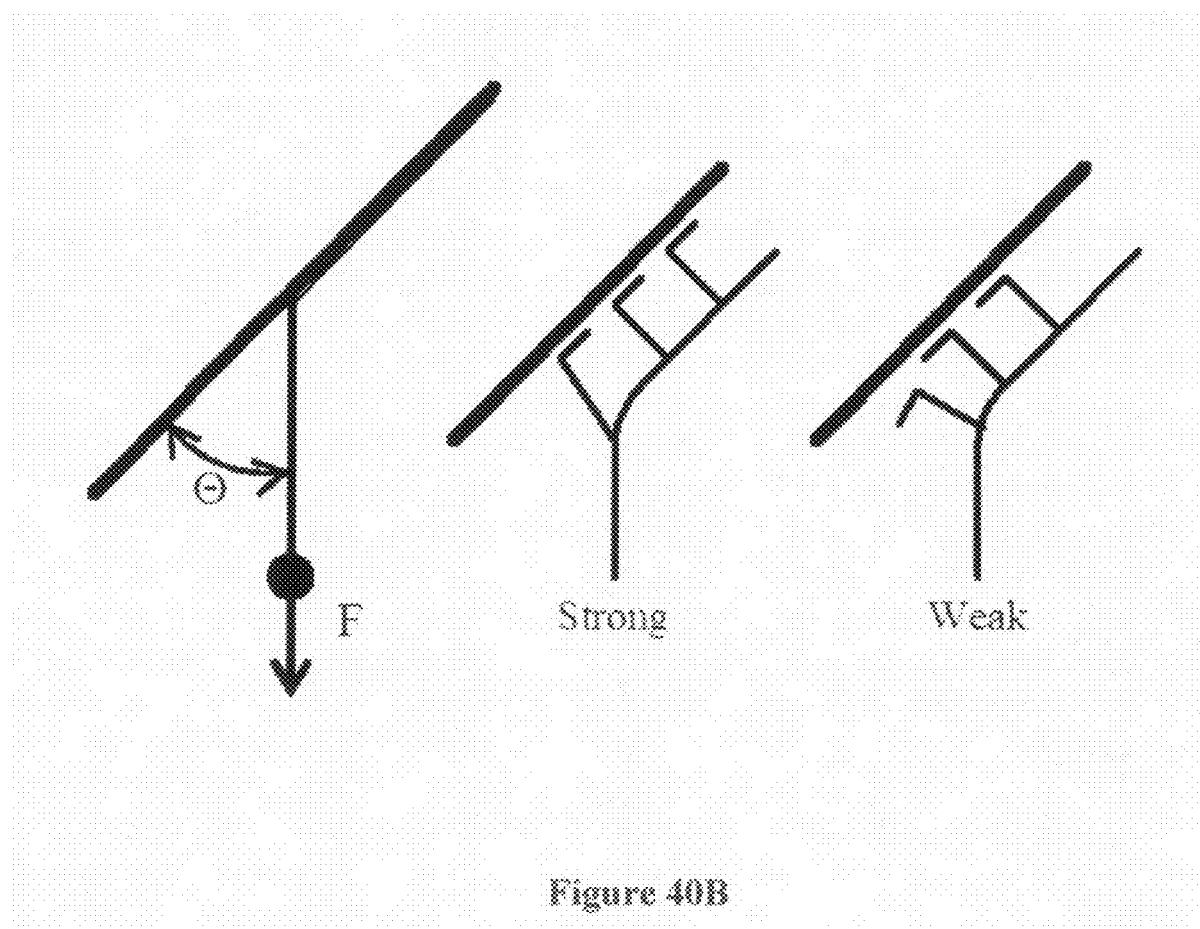

An exemplary silicone dry adhesive sheet used for testing in the present embodiment was 9 cm long, 15 mm wide, and 350 μm thick, however other dimensions and specifications may be used in other embodiments of the invention. The geometry of the cap and schematic of the exemplary test setup is shown in FIGS. 40a and 40b) respectively.

The adhesive strip was attached to a glass slide (previously cleaned in ultrasonic acetone and de-ionized water) mounted to a rotary stage in a vertical orientation. A weight was clipped onto the end of the adhesive and the stage was slowly rotated until the onset of peeling and the equilibrium angle was recorded. The peeling tests were completed 5 times for each weight in each adhesive orientation. The peel strength, R is estimated from the Kendall model of peeling (as described in K. Kendall, "Thin-film peeling—the elastic term," *Journal of Physics D, Applied Physics*, vol. 8, 1975, the contents of which are hereby incorporated by reference) where F is the applied force, b is the width of the adhesive, d is the adhesive thickness, E is Young's modulus, and $\Theta$ is the peeling angle:

$$\left(\frac{F}{b}\right)^2 \frac{1}{2Ed} + \left(\frac{F}{b}\right)(1-\cos\Theta) - R = 0 \qquad (1)$$

Figure 41:
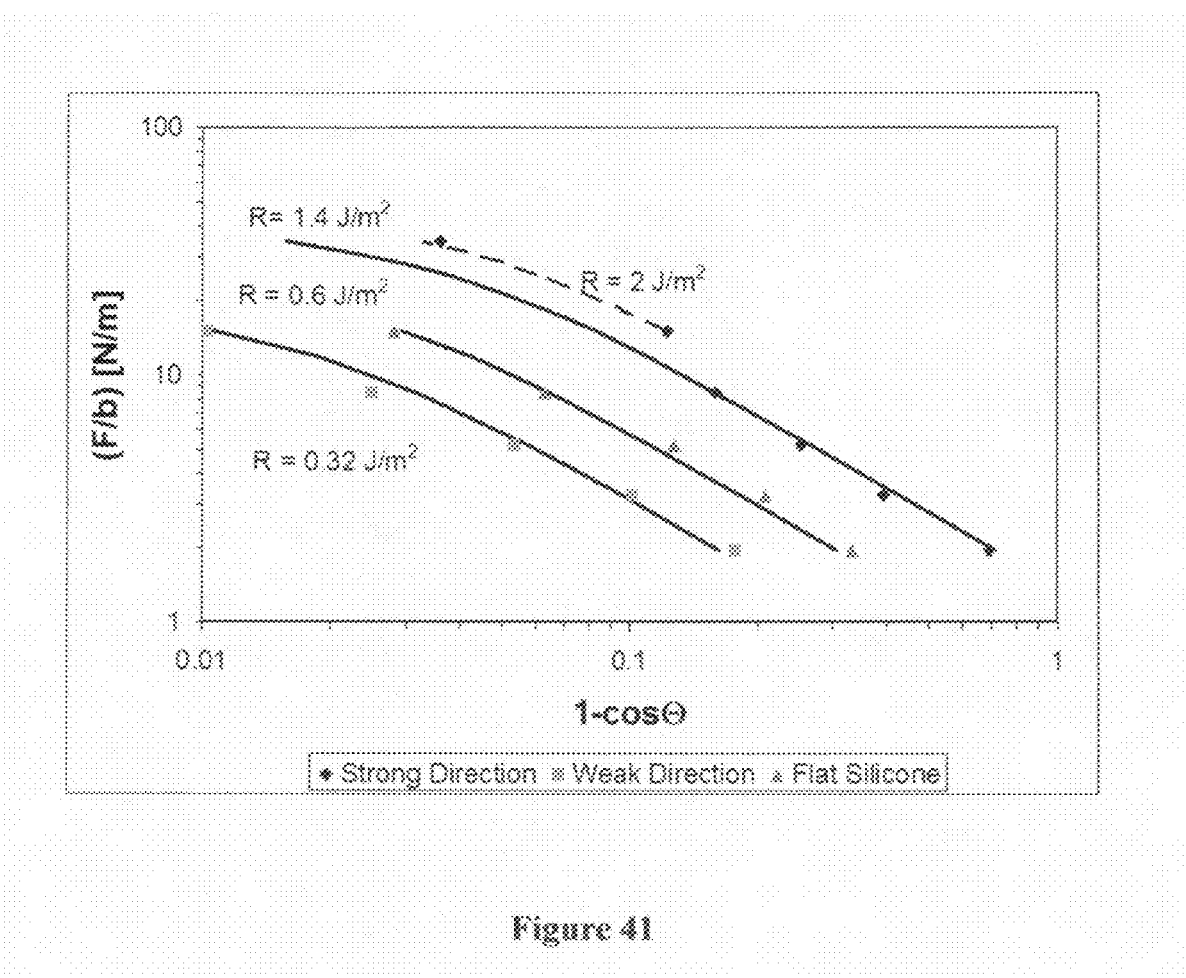
FIG. 41 illustrates a graph of normalized peeling force vs. peeling angle for an anisotropic dry adhesive structure according to an embodiment of the present invention.

The peel strength is found by fitting this model to the experimental data, and was determined for an exemplary adhesive according to one embodiment when loaded in its strong and weak direction, as well as the back side of the exemplary adhesive strip, which provided the peel strength of an exemplary unstructured silicone processed with the same steps. The resulting behavior for the anisotropic behavior along with peel strength is shown in FIG. 41. Young's modulus was estimated to be about 2 MPa.

The theoretical model fits the experimental data obtained for tests of an exemplary embodiment of the adhesive according to the invention quite well, with the exception of the exemplary adhesive loaded in the strong direction with large weights. In this case, the peel strength appears to have improved with the increased load—a desirable result. In one embodiment, such behavior may potentially be due to increased shear forces on each fiber during these large loads shifting the location of maximum force on the fiber to an area closer to the large overhanging cap. As this cap may be more tolerant of flaws and crack initiation, it may result in a stronger (such as ~50% greater) peel strength than when the exemplary sample is loaded lightly. Another very interesting result is that the tested fibers show anisotropic peel strength at all loading values, with lower strength than flat silicone for the weak direction and higher strength than flat silicone for the strong direction. Optimization of the cap overhang and other dimensions of exemplary adhesive embodiments may be determined by further experimentation, for example.

Discussion of Several Embodiments

The fabrication method according to an embodiment of the invention, and as described above, may be capable of producing an exemplary anisotropic adhesive, but the performance may not be the same as an actual gecko. Earlier work on whole toe and individual setae of geckos has demonstrated what is termed to be frictional adhesion, where the normal adhesive force that a gecko produced is related to the shear force applied to the toe or setae. A benefit to this adhesion method is that when the shear load is removed, there will be substantially no normal adhesion and the animal can remove its foot from a surface with ease. Qualitatively, anisotropic adhesives according to embodiments of the present invention as described above may not behave in this manner, as they may remain on smooth surfaces under small perpendicular loads in the absence of shear.

There are several potential reasons for this difference in behavior. Unlike the gecko, our dry adhesives according to certain embodiments of the present invention may be made of a relatively soft material that exhibits significant normal and peel adhesion strength even when unstructured and the minimum adhesive force under pure normal loading may be inherently greater. A second difference between adhesive behaviors is that the gecko foot hairs are angled prior to loading and require shear force to put them all in contact. If the fiber tips of dry adhesives according to certain embodiments of the present invention were tilted, they might also be expected to demonstrate behavior closer to gecko frictional adhesion.

Further improvement to the dry adhesives according to one embodiment of the present invention may involve optimizing the tip size and offset, as well as increasing the fiber heights. If the tip geometry remained the same, we would expect to see greater peel strengths for fibers with higher aspect ratios because they could stretch more prior to losing contact. This would increase the length of the peeling interface and more evenly distribute the force. However, given the dominance of tip geometry at these scales, the aspect ratio of low modulus fibers may be secondary to appropriate cap dimensions with respect to maximum peel strength and anisotropic behavior.

Further Microstructured Material Embodiments

Microfluidics, smart materials, and biomimetic surfaces such as dry adhesives according to embodiments of the present invention may all desirably benefit from the cost reductions and substrate size increases available when using hybrid micromanufacturing technologies adapted to large scale manufacturing, such as roll to roll continuous manufacturing processes, for example. Micro and nano-fabrication has traditionally been based on silicon, glass and other inorganic materials, owing to its history as an offshoot of the microelectronics industry. However, many new microstructured products, such as smart surfaces and materials, cannot be commercially viable when limited by the size of a typical silicon wafer and/or limited by small scale batch processes. The focus of traditional microfabrication and lithography is to reduce the size of minimum features in order to pack more devices on a single chip, but there is very little research on batch microfabrication on very large areas. For many applications, such as microfluidics, feature sizes on the order of 5-10 μm may be acceptable, but device sizes may desirably be several square centimeters at minimum. The production of low-cost microfluidics using polymers promises great savings in costs, reaction times and consumed materials when applied to drug testing, biological analysis and chemical reactions. Unfortunately, large-scale commercialization of these devices is held back in part by existing manufacturing methods which are designed for inorganic materials, and don't take advantage of casting, stamping, direct printing, injection molding and other fabrication options that have made polymers and plastics so ubiquitous for macroscale applications. Polymer MEMS and microfabrication requires a leap in manufacturing technologies to enhance traditional lithography with large-scale substrates and low-cost materials. The growing capability of industrial fabrication technologies to approach the feature sizes previously only achievable by lithography has opened up many new possibilities for producing hybrid micro/macro products using polymers that are beyond the capability of traditional silicon MEMS.

In one embodiment of the invention, large-scale micropatterned smart materials and polymer based Microsystems may be produced, such as by new microfabrication technologies that borrow from other manufacturing industries and modify traditional lithography to manufacture microsystems on industrial scales. Although microfluidics, MEMS and micropatterned surfaces have all been produced using traditional lithography on silicon or glass substrates, part of the limitation in mass producing these products has been the limited substrate sizes—a maximum of 30 cm diameter disks in the case of silicon. While the complexity and power per unit area of integrated circuits has increased dramatically over the last two decades, products like labs-on-chip and MEMS devices cannot be reduced in size as easily while still being effective for chemical synthesis or biological analysis. Fundamentally, integrated circuits design can benefit from further reduction of features and chip size, while biological and chemical applications are presently better served by reducing the cost per area of relatively large chips and dies. Other applications for polymer micromachining, such as self-cleaning superhydrophobic surfaces or biomimetic dry adhesives according to embodiments of the present invention, only require one or two patterned layers, simplifying alignment processes and allowing much larger areas to be patterned in a single step. Polymer micromachining on large substrates, or with newer technologies like roll-to-roll processing can fill a manufacturing niche that neither traditional microfabrication nor industrial manufacturing has properly addressed.

One embodiment of the present invention comprises advanced micro-manufacturing technologies and development of new composites and functional polymer materials for future integration with large-scale manufacturing techniques, such as for applications in polymer based microfluidic systems, flexible sensors, and biomimetic dry adhesives.

In another embodiment, polymer MEMS may be produced such as for use in biological and 'wet' applications, or for direct contact with the ambient environment for long periods of time. An advantage of polymer MEMS and microfabrication according to embodiments of the present invention is the potential for large-scale patterning. By avoiding silicon entirely and using either thin sheets or flexible films of plastic as substrates, large areas of microstructures can be produced such as by combining standard lithography techniques along with advanced soft lithography technologies for applications ranging from MEMS and microfluidics to smart surfaces and intelligent materials.

Manufacturing Embodiments Using Industrial Polymers

Figure 42A:
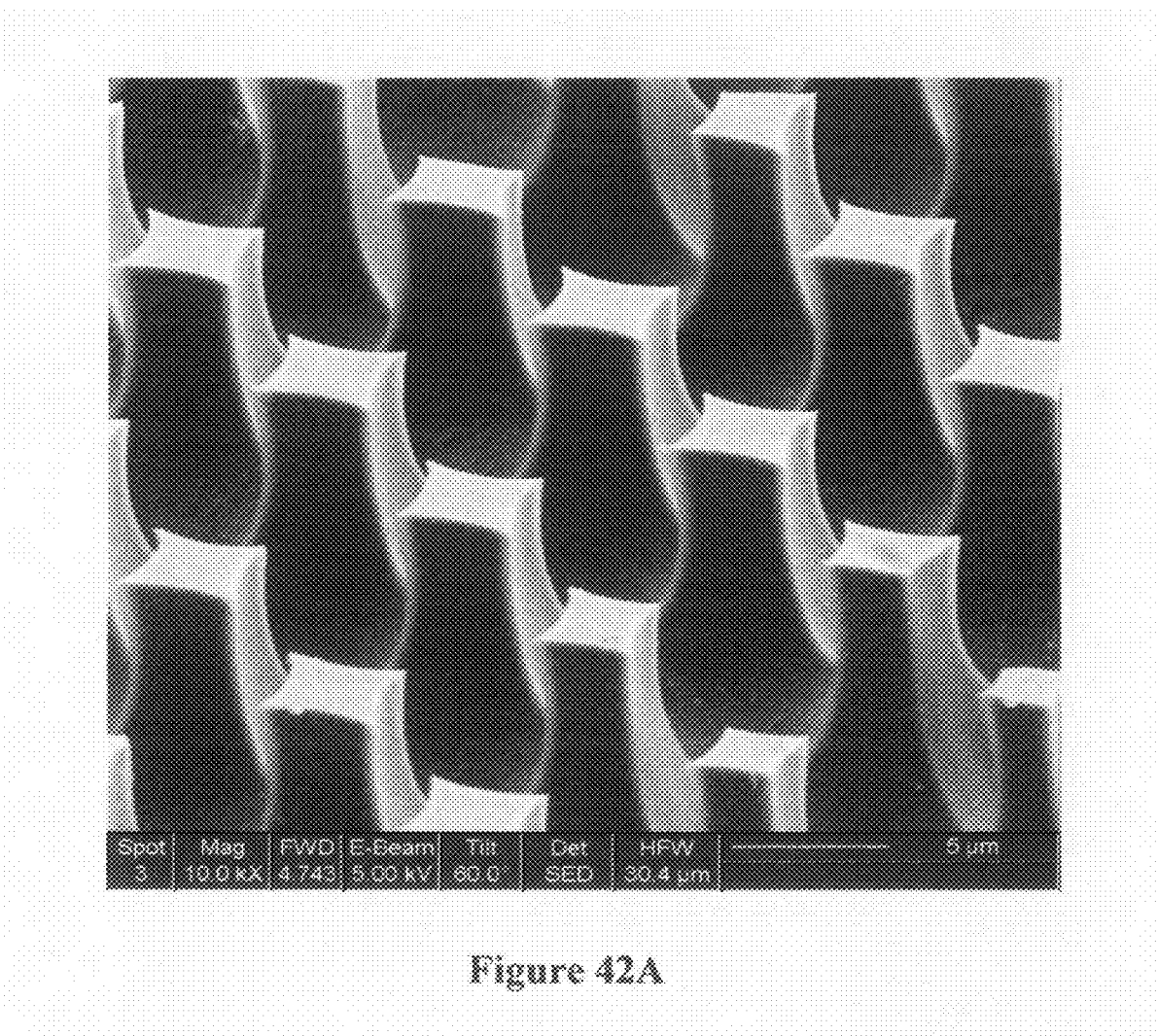
FIG. 42 illustrates SEM images of fiber structures of an acrylic mold substrate according to an embodiment of the present invention.
Figure 42B:
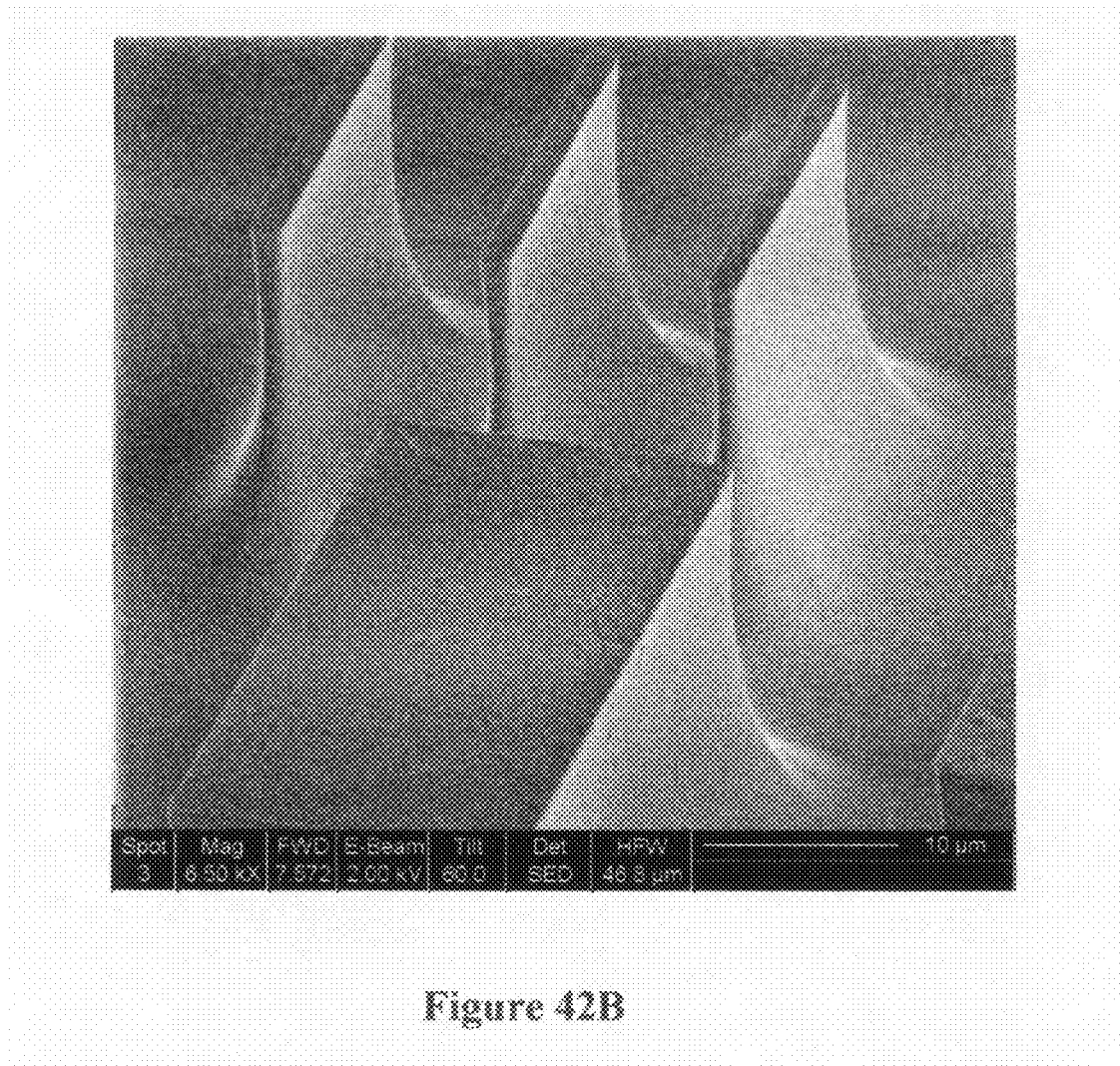
Figure 42C:
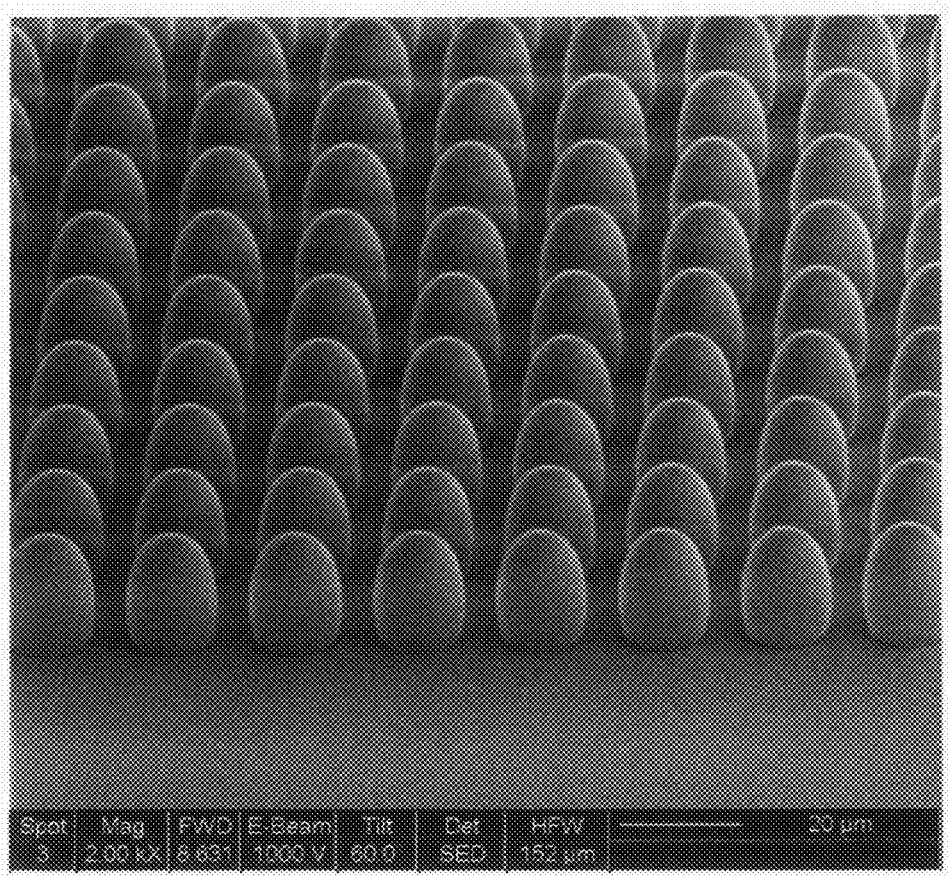

Acrylic composed primarily of polymethylmethacrylate (PMMA) is one of the most widely used MEMS polymers and may be patterned using a variety of methods, including e-beam lithography, x-ray lithography, hot embossing, dry etching and laser ablation, but is substantially insensitive to most standard UV wavelengths used in MEMS photolithography. Recently, novel techniques using an uncollimated 254 nm exposure of commercial acrylic have proven viable for producing microfluidic channels. While the original use for this patterning method was for very thin layers of PMMA, the penetration depth at this wavelength in commercial acrylics can be several hundred micrometers, allowing the definition of deep structures without requiring expensive x-ray sources or dry etching technology. Through modification of commercially available large area 254 nm light sources like those used for DNA crosslinking or water purification, the effects of different additives, molecular weights and developers on the quality, reliability and yield of large area PMMA lithography may be applied to develop bulk polymer micromachining processes. A potential benefit of this technology is to convert low aspect ratio patterning through direct printing or stamping, or lithography into high aspect ratio features over very large areas (such as several square feet). Given the fabrication versatility of PMMA, embodiments of the invention may incorporate colloidal nano-lithography, and laser ablation to produce features ranging from nano to macroscale in a single process. Applications for such processes may include large-scale microfluidic fabrication technology with both high resolution and variable channel depths, and as polymer molds for casting microstructured surfaces in elastomers like polydimethylsiloxane (PDMS), or polyurethanes, such as illustrated in FIG. 42.

While commercial acrylic is a highly attractive material for large-scale micromachining, other polymers like polycarbonate, polystyrene and epoxies may also be implemented as large-scale microstructured materials in further embodiments.

Further Dry Adhesive Embodiments

Further embodiments of the present invention are directed to replicating the function of the feet of geckos with respect to their remarkable climbing capabilities. Hierarchal fibrillar structures on gecko feet split contact between millions of nanoscale fiber tips and climbing surfaces to produce adhesion through van der Waals interactions. The benefits to these adhesives include self-cleaning capabilities, superhydrophobic behavior, anisotropic (direction sensitive) adhesive strength, and long-term stability. One embodiment of the present invention is directed to manufacturing these materials on large scales with high yields, and correctly modeling their behavior for macroscale applications. In one embodiment, testing results on these adhesives indicate the existence of an optimal cap geometry for a given fiber material and size, and the critical importance of understanding peel failure behavior for microscale fibers. Although existing models of dry adhesive behavior work well for individual fibers or small areas under loads, they fail to account for inhomogeneous and tangential loading, or the probability of microscale defects reducing adhesive strength per fiber.

Figure 43A:
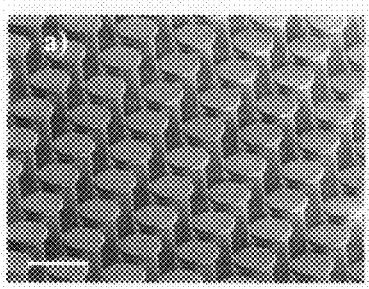
FIG. 43 illustrates SEM images of PDMS dry adhesive structures according to an embodiment of the present invention.
Figure 43B:
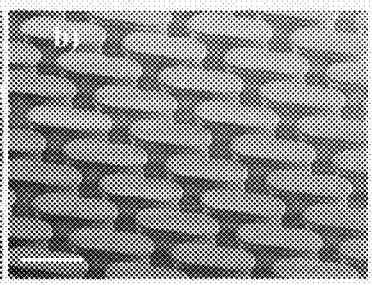
Figure 43C:
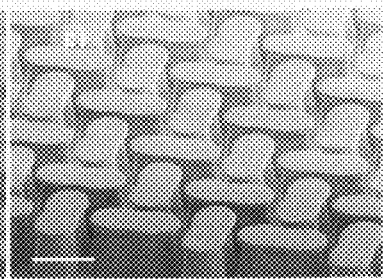

Further embodiments may be directed to varying the adhesive strength by varying fiber geometries, material properties, surface energies and environmental conditions. Yet a further embodiment provides a standardized test procedure for these materials that includes both micro and macroscale testing for peel, normal and shear strengths on smooth surfaces and materials with well-defined roughness. Specific contamination modes, cleaning procedures and long-term adhesion tests may also be provided to determine effects on macroscale adhesion performance, as that will be the most important for any real-world applications of these materials. FIG. 43 illustrates exemplary dry adhesive fiber geometries according to an embodiment of the present invention.

Polymer MEMS Composite Embodiments

A drawback for conventional polymer MEMS is that electronic integration can be quite difficult. Although it is possible to adequately bond metals to some polymers for subsequent wirebonding and electrical packaging, the process is highly dependent on material surface properties, glass transition temperature and polymer thickness. In one embodiment provided, polymer MEMS devices may be provided incorporating nanopowders added to bulk polymers to add electrical and magnetic functionality to spin-coated, cast or injection molded polymer microstructures. In another embodiment, electrically conductive or magnetic composites may be used by themselves or integrated with metallic components for use with active polymer MEMS sensors and actuators and have the potential advantage to be printed or cast in arbitrary shapes and layouts. Nanopowders may be added to bulk polymers to add electrical and/or magnetic functionality to different materials, for example. Further embodiments provide for the manufacturing, testing, and application of novel composite materials to polymer MEMS and to integrate these materials into sensors and actuators embedded in smart skins and biomimetic surfaces, for example.

The above description of exemplary embodiments of the present invention, including what is described in the Abstract, is not intended to be exhaustive or to limit the embodiments of the invention to the precise forms disclosed above. Although specific embodiments and examples are described herein for illustrative purposes and to allow others skilled in the art to comprehend their teachings, various equivalent modifications may be made without departing from the spirit and scope of the disclosure, as will be recognized by those skilled in the relevant art.

What is claimed is:

1. A method of manufacturing a dry adhesive structure comprising overhanging cap and undercut fiber structures, the method comprising:

applying a photoresistive material to a photosensitive mold substrate comprising polymethyl methacrylate;

patterning and developing the photoresistive material to form a mask comprising overhanging cap structures corresponding to the dry adhesive structure, wherein the mask is substantially opaque to UV light;

exposing the mask and mold substrate to UV light to pattern the mold substrate;

developing the mold substrate with the substrate developer to remove an exposed portion of the mold substrate to form undercut fiber structures substantially aligned with and supporting the overhanging cap structures corresponding to the dry adhesive structure;

molding an elastomer rubber material in the mold substrate to form an elastomer rubber negative mold comprising the overhanging cap and undercut fiber structures; and molding a flexible polymer material in the elastomer rubber negative mold to form the dry adhesive structure comprising the overhanging cap and undercut fiber structures.

2. The method according to claim 1 wherein the photoresistive mask comprises SU-8 photoresist material.

3. The method according to claim 1 wherein the UV light is at least partially collimated.

4. The method according to claim 1 wherein the elastomer rubber material comprises a PDMS material.

5. The method according to claim 1 wherein the flexible polymer material comprises at least one material selected from the list comprising: silicones, polyurethanes, siloxanes, polyamides and polyethylenes.

* * * * *